United States Patent
Cramer et al.

(10) Patent No.: US 12,503,674 B2
(45) Date of Patent: Dec. 23, 2025

(54) PROTEASES FOR BEER HAZE REDUCTION

(71) Applicant: INTERNATIONAL N&H DENMARK APS, Kongens Lyngby (DK)

(72) Inventors: Jacob Flyvholm Cramer, Højbjerg (DK); Xiaogang Gu, Shanghai (CN); Chao Huang, Shanghai (CN); Xinyue Tang, Shanghai (CN)

(73) Assignee: INTERNATIONAL N&H DENMARK APS, Kongens Lyngby (DK)

( * ) Notice: Subject to any disclaimer, the term of this patent is extended or adjusted under 35 U.S.C. 154(b) by 0 days.

(21) Appl. No.: 18/971,991

(22) Filed: Dec. 6, 2024

(65) Prior Publication Data

US 2025/0101350 A1    Mar. 27, 2025

Related U.S. Application Data

(63) Continuation of application No. 18/570,916, filed as application No. PCT/US2022/034013 on Jun. 17, 2022.

(30) Foreign Application Priority Data

Jun. 8, 2021  (WO) ................ PCT/CN2021/100928

(51) Int. Cl.
| | | |
|---|---|---|
| *C12C 11/00* | (2006.01) | |
| *A23L 2/84* | (2006.01) | |
| *C12H 1/00* | (2006.01) | |
| *C12N 9/10* | (2006.01) | |
| *C12N 9/34* | (2006.01) | |

(Continued)

(52) U.S. Cl.
CPC .............. *C12C 11/003* (2013.01); *A23L 2/84* (2013.01); *C12H 1/003* (2013.01); *C12N 9/1051* (2013.01); *C12N 9/2428* (2013.01); *C12N 9/2457* (2013.01); *C12N 9/62* (2013.01);

(Continued)

(58) Field of Classification Search
CPC ..... C12C 11/11; C12C 11/003; C12N 9/2457; C12N 9/62; C12N 9/485; C12N 9/2428; C12N 9/88; C12N 9/1051; C12H 1/003; A23L 2/84

See application file for complete search history.

(56) References Cited

U.S. PATENT DOCUMENTS

| | | | |
|---|---|---|---|
| 4,411,914 A | 10/1983 | Devreaux et al. | |
| 4,666,718 A * | 5/1987 | Lowery | C12C 5/00 436/16 |

(Continued)

FOREIGN PATENT DOCUMENTS

| | | |
|---|---|---|
| DE | 263301 A1 | 12/1988 |
| EP | 0022587 A1 | 1/1981 |

(Continued)

OTHER PUBLICATIONS

International Search Report and Written Opinion from PCT Application No. PCT/US2022/034013 dated Jan. 12, 2023, 18 pages.

(Continued)

*Primary Examiner* — Vera Stulii

(57) ABSTRACT

The present invention relates to endoproteases. More particularly, the present invention relates to the use of endoproteases for reduction or elimination of beer haze.

25 Claims, 22 Drawing Sheets

Specification includes a Sequence Listing.

Haze reduction performance of purified AhoPro3 and AnPro shown as OD600 in response to enzyme concentrations of 3 to 190 ppm

(51) Int. Cl.
C12N 9/44 (2006.01)
C12N 9/62 (2006.01)
C12N 9/88 (2006.01)
(52) U.S. Cl.
CPC ........ *C12N 9/88* (2013.01); *C12Y 204/01024* (2013.01); *C12Y 303/01* (2013.01); *C12Y 401/01005* (2013.01)

(56) References Cited

U.S. PATENT DOCUMENTS

| | | |
|---|---|---|
| 5,281,526 A | 1/1994 | Good et al. |
| 6,022,725 A | 2/2000 | Fowler et al. |
| 8,119,171 B2 | 2/2012 | Lopez et al. |

FOREIGN PATENT DOCUMENTS

| | | | |
|---|---|---|---|
| EP | 1122303 A1 | 8/2001 | |
| EP | 1326957 B1 | 5/2004 | |
| EP | 1464234 A1 | 10/2004 | |
| EP | 2041256 B1 | 8/2017 | |
| EP | 2402425 B1 | 4/2021 | |
| WO | 9521240 A2 | 1/1995 | |
| WO | 9815613 A2 | 4/1998 | |
| WO | 200245523 A2 | 6/2002 | |
| WO | 200245524 A2 | 6/2002 | |
| WO | WO-0246381 A2 * | 6/2002 | ............... A23J 3/16 |
| WO | 2003104382 A1 | 12/2003 | |
| WO | 2004050820 A1 | 6/2004 | |
| WO | 2005001036 A2 | 1/2005 | |
| WO | 2005027953 A2 | 3/2005 | |
| WO | 2007101888 A2 | 9/2007 | |
| WO | 2014090803 A1 | 6/2014 | |
| WO | 2015017256 A1 | 2/2015 | |

OTHER PUBLICATIONS

Altschul et al, "Basic Local Alignment Search Tool", J. Mol. Biol., vol. 215, 1990, p. 403-410.
Campbell et al., "Improved transformation efficiency of Aspergillus niger using the homologous niaD gene for nitrate reductase", Curr Genet, vol. 16, 1989, p. 53-56.
Cao et al, "Penicillopepsin-JT2, a recombinant enzyme from Penicillium janthinellum and the contribution of a hydrogen bond in subsite S3 to kcat", Protein Science, vol. 9, 2000, pp. 991-1001.
Harrison et al, "Employing Site-Specific Recombination for Conditional Genetic Analysis in Sinorhizobium meliloti", Applied and Environmental Microbiology, vol. 77, No. 12, Jun. 2011, pp. 3916-3922.
Liu et al. "Improved heterologous gene expression in Trichoderma reesei by cellobiohydrolase I gene (cbh1) promoter optimization," Acta Biochim. Biophys. Sin (Shanghai) 40(2), 2008, pp. 158-165.
Petersen et al, "SignalP 4.0: discriminating signal peptides from transmembrane regions", Nature Methods, vol. 8, 2011, pp. 785-786.
Te'O et al, "Biolistic transformation of Trichoderma reesei using the Bio-Rad seven barrels Hepta Adaptor system", Journal of Microbiological Methods, vol. 51, 2002, pp. 393-399.
Thompson et al., "CLUSTAL W: improving the sensitivity of progressive multiple sequence alignment through sequence weighting, position-specific gap penalties and weight matrix choice", Nucleic Acids Research, vol. 22, No. 22, 1994, p. 4673-4680.
Unitprot, Database Accession No. A0A5N7BI92, Apr. 22, 2020, 1 page.
Unitprot, Database Accession No. A0A5N6VVQ7, Apr. 22, 2020, 1 page.
Bamforth, "Beer Tap into the Art and Science of Brewing", Insight Books, 2009, pp. 161-163, 220, 228, and 233.
Brijwani et al., "Fungal Laccases: Production, Function and Applications in Food Processing", SAGE—Hindawi Access to Research, Enzyme Research, vol. 2010, 10 pages.
Clark et al., "Realistic Haze Specifications for Beer", MBAA TQ, vol. 44, No. 3, 2007, pp. 160-163.
Craig et al., "Clarity assured", The Brewer & Distiller International, vol. 3, Issue 5, May 2007, 4 pages.
Fukal et al., "The Role of Active and Inactivated Papain in Beer Chillproofing", J. Inst. Brew., vol. 90, Jul.-Aug. 1984, pp. 247-249.
Godtfredsen et al., "Maturation of Beerwith a-Acetolactate Decarboxylase" Carlsberg Res. Commun., vol. 47, 1982, pp. 93-102.
Godtfredsen et al., "Application of the Acetolactate Decarboxylase From Lactobacillus Case for Accelerated Maturation of Beer", Carlsberg Res. Commun., vol. 49, 1984, pp. 69-74.
Godtfredsen et al., "Occurrence of a-acetolactate decarboxylases among lactic bacteria and their utilization for maturation of beer", Appl Microbiol Biotechnol, vol. 20, 1984, pp. 23-28.
Hough et al., "Malting and Brewing Science", Second Edition, Chapman & Hall, 1985, 45 pages.
IBD Africa Section Newsletter, 2007, 1 page.
Lea et al., "Fermented Beverage Production", Springer—Science+Business Media, B.V., 1995, 39 pages.
Lewis et al., "Brewing", Second Edition, 2002, 3 pages.
Lopez et al., "Effective Prevention of Chill-Haze in Beer Using an Acid Proline-Specific Endoprotease from Aspergillus niger", J. Agric. Food Chem., vol. 53, 2005, pp. 7944-7949.
Lopez et al., "Prevention of protein-polyphenol haze in beer using a proline-specific protease", 2019, 13 pages.
Masschelein, "The Biochemistry of Maturation", J. Inst. Brew., vol. 92, May-Jun. 1986, pp. 213-219.
Maturex L, Product Sheet, 2002, 5 pages.
Maturex, "Maturex reduces production time for breweries", BioTimes, Mar. 2004, 1 page.
Narziss, "Rapid Fermentation and/or Maturation in German Lager Beers", Feature Article, 1990, pp. 54-62.
"Predictions of Shelf-Life of Beer", 1997, 2 pages.
Rehmanji et al., "A Novel Stabilization of Beer with Polycar Brewbrite", MBAA TQ, vol. 39, No. 1, 2002, pp. 24-28.
Rehmanji et al., "Beer Stabilization Technology—Clearly a Matter of Choice", MBAA TQ, vol. 42, No. 4, 2005, pp. 332-338.
Siebert et al., "Characterization of Amorphous-Particle Haze", American Society of Brewing Chemists, 1981, 11 pages.
Siebert et al., "Effects of Protein-Polyphenol Interactions on Beverage Haze, Stabilization, and Analysis", Journal of Agricultural and Food Chemistry, vol. 47, No. 2, Feb. 1999, 10 pages.
Steiner et al., "Turbidity and Haze Formation in Beer—Insights and Overview", Journal of the Institute of Brewing, 2010, 9 pages.
Whatling et al., "Processes for Producing Beer with a Low Tendency to Form Haze", J. Inst. Brew., vol. 74, 1968, pp. 525-539.
AgroFood Industry hi-tech, News, Mar./Apr. 2005, pp. 55.
File History for U.S. Appl. No. 10/450,022, obtained from USPTO Patent Center system on Jun. 4, 2025, 782 pages.

* cited by examiner

FIG. 1

<SEQ ID NO:1 AbePro2 Precursor Protein; PRT; Aspergillus bertholletius>

MHFLAPLSVVTLLASWPLLGYAIHPPKPVPPPVSRPVSTRSSAVVGEATFDQLLDHHDSS
KGTFSQRYWWSTEYWGGPGSPVVLFTPGEASADGYQGYLTNTTLTGRYAQEIQGAVILI
EHRYWGGSSPYKELTAETLQYLTLEQSILDLTYFAETVSLEFDPSNRSNAPKAPWVLVG
GSYSGALAAWTAAVAPETFWAYHATSAPVEAINDFWQYFDPIRQGMAPNCSRDVSLV
ATHIDRVGKHGSAAEQLALKELFGLGAVEHYDDFAAALPIGPYKWQSNTFVTGYSGFF
AFCDAVENVKAGATVVPGPEGVGLQKALRGYAKWFKSTILPGYCANYGYWTDNQTV
ACFDTYNPSSAIFTDTSVDNAVDRQWQWFLCNEPFFWWQDGAPEGIPTIIPRTVNAAYW
QRQCSLYFPEVNGYTYGSAKGKTAATVNQWTGGWSATRNTSHLLWVNGQYDPWRDS
GVSSIYRPGGPLKSTADEPVQVIPGGFHCSDLYLKDYYANDGVKQVIDNAVAQIKSWVA
EYYN

FIG. 2

<SEQ ID NO:2 AniPro_2 Precursor Protein; PRT; Aspergillus niger>

MQTFGAFLVSFLAASGLAAAARPRLVPKPISRPASSKSAATTGEAYFEQLLDHHNPEKG
TFSQRYWWSTEYWGGPGSPVVLFNPGEVSADGYEGYLTNDTLTGVYAQEIQGAVILIEH
RYWGDSSPYEVLNAETLQYLTLDQSILDMTYFAETVKLQFDNSSRSNAQNAPWVMVG
GSYSGALTAWTESIAPGTFWAYHATSAPVEAIYDFWQYFPIQQGMAQNCSKDVSLVA
EYVDKIGKNGTAKEQQELKELFGLGAVEHYDDFAAVLPNGPYLWQDNDFVTGYSSFFQ
FCDAVEGVEAGAAVTPGPEGVGLEKALANYANWFNSTILPNYCASYGYWTDEWSVAC
FDSYNASSPIFTDTSVGNPVDRQWEWFLCNEPFFWWQDGAPEGTSTIVPRLVSASYWQR
QCPLYFPEVNGYTYGSAKGKNSATVNSWTGGWDMTRNTTRLIWTNGQYDPWRDSGVS
STFRPGGPLVSTANEPVQIIPGGFHCSDLYMEDYYANEGVRKVVDNEVKQIKEWVEEYY
A

FIG. 3

<SEQ ID NO:3 AtrPro1 Precursor Protein; PRT; Aspergillus transmontanensis>
MQFLPPLSIVTLLASWPSLSRAIHPPRPVPPPVSRPVSTQSLAVEGNATFEQLLDHHDSSK
GTFSQRYWWSTEYWGGPGSPVVLFTPGEASADGYEGYLTNNTLTGLYAQEIQGAVILIE
HRYWGDSSPYEELTAETLQYLTLEQSILDLTHFAETVQLEFDTSNSSNAPKAPWVLVGG
SYSGALAAWTAAVAPETFWAYHATSAPVQAIDDFWQYFDPIRHGMAPNCSRDVSLVA
NHIDTVGKNGSAADQFALKELFGLEALEHYDDFAAALPTGPYLWQSNTFVTGYSDFFA
FCDAVENVEAGAAVVPGPEGVGLQKALTGYANWFNSTILPGYCASYGYWTDNRTVAC
FDTHNPSSAIFIDTSVDNAVDRQWQWFLCNEPFFWWQDGAPEGVPTIVPRTINAEYWQR
QCSLYFPEVNGYTYGSAKGKTAASVNSWTGGWSDSKNTSRLLWVNGQYDPWRDSGV
SSTHRPGGPLASTADEPVQIIPGGFHCSDLYIKDYYANAGVKQVVDNAVAQIKSWVAEY
YK

FIG. 4

<SEQ ID NO:4 AhoPro3 Precursor Protein; PRT; Aspergillus homomorphus>
MRFCSPVSVVAVTALWASLTAALRPPRLAPRPVTATTQSAVVESTFEQLIDHNDPSKGT
FSQRYWYSTQYWGGPGSPVVLFTPGEAAADGYGGYLTNRTLTGVYAQQLQGAVVLIE
HRYWGGSSPYANLTAETLQYLTLEQSVLDLTYFAENVQLGFAKNSTSSNAPHVPWVLV
GGSYSGALTAWTEHLAPGTFWAYHATSAPMESIYDFWTYFRPIQEGMAKNCSKDVSLV
AEHVDKVGKLGTKAQQKALKKLFGLEALEHFDDFAAVLPIGPYLWQDNSFATGYSGFF
AFCDAVENVEAGAAVTPGAEGVGLEKALKGYANWFKNKILPDYCASTYGYWSDKYTV
ACFDTYNATSPLFRDTSVRNAVDRQWTWFLCNEPFFWWQDGAPESETSLIPRLVSADY
WQRQCSLYFPEVNGYTYGSAKGKTASTFNAWTDGWFLTGNSTRLIWTNGQYDPWRDA
GVSSIFRPGGPLVSTPNEPVQIIPGGFHCSDLYISDAEVNAGVKKVVINEVAQIKAWVAEF
YA Haze reduction performance of purified AhoPro3 and AnPro shown as OD600 in response to enzyme concentrations of 3 to 190 ppm Haze reduction performance of purified AtrPro1, AbePro2 and AnPro shown as OD600 in response to enzyme concentrations of 3 to 190 ppm Haze reduction performance of purified AniPro_2 and AnPro shown as OD600 in response to enzyme concentrations of 0.625 to 20 ppm

FIG. 8

<SEQ ID NO:5 ApsPro1 Precursor Protein; PRT; Aspergillus pseudocaelatus>

MHFLSRISVVTLLASWPSLSRAIHPPRPVPPPVTRPASTLSSAVEGEATFEQLVDHHDSSK
GTFSQRYWWSTEYWGGPGSPVVLFTPGEASADGYEGYLTNNTLTGLYAQEIQGAVILIE
HRYWGGSSPFEELTAETLQYLTLEQSIQDLTYFAETVQLEFDTSNSSNAPKAPWVLVGG
SYSGALAAWTAAVAPETFWAYHATSAPVQAINDFWQYFDPIRHGMAPNCSRDVSLVA
NHIDSVGKNGSIAEQSALKELFGLGALEHYDDFAAALPIGPYLWQDNTFVTGYSGFFAF
CDAVENVEAGAAVVPGPEGVGLQKALTGYANWFNSTILPGYCANYGYWTDNRTVACF
DTHNSSSAIFTDTSLNNAVDRQWQWFLCNEPFFWWQDGAPEGVPSIVPRTVNAAYWQR
QCSLYFPEVNGYTYGSAKGKTAATVNTWTGGWSETKNTSHLLWVNGQYDPWRDSGV
SSTHRPGGPLASTADEPVQVIPGGFHCSDLYLKDYHANAGVKQVVDNAVAQIKSWVAE
YYK

FIG. 9

<SEQ ID NO:6 AnePro2 Precursor Protein; PRT; Aspergillus neoauricomus>
MRFLSVVRLAALVTSWASIAQAIRPPIPVPEPVPRPVSLQSTSTQGQATFQQLLDHHDPS
KGTFSQRYWWSTEFWGGPGSPVILFTPGEVAADGYQGYLTNKTLTGHYAQEVQAAVV
LVEHRYWGGSSPYKNLTAETLQYLTLEQSILDFTHFAKTVQLQFDNSTRSNAQRAPWVF
VGGSYSGALAAWTEATAPGTFWAYHATSAPVEAIYDFWQYFEPVREGMPQNCSKDVS
LVANYIDGLGKNGTTREKQAVKELFGLGDLEYYDDFAAIFPIGPWSWQSNSFITGYSDF
YQFCDSVENVKAGAPVVPGPEGVGLLKALAGYAKWFNSTALPGYCASYGYWTDERSIS
CFDTHNASSPLFTDTSVANGMDRQWQWFLCNEPFFYWQDGAPEGKTTIVPRTVSAEYW
QRQCPLFFPTVNGHTYGSAKGKNAATVNAYTGGWSRTNTSRLIWTNGQYDPWLDSGV
SSRFRPGGPLESTAAAPVQVIPGGFHCSDLYMTSYAVNDGVKKVVDNEVAQIKAWIGE
YYK

FIG. 10

<SEQ ID NO:7 AalPro2 Precursor Protein; PRT; Aspergillus albertensis>

MHFASSARAVALLASLTHAIRPPRPVPPPVSGPVSAQLSAVGGQATFEQLLDHHDASKG
VFSQRYWWSTEYWGGPGSPVVLFTPGESAADGYEGYLTNNTLTGLYAQEIQGAVVLIE
HRYWGESSPYDQLTAETLQHLTLEQSILDLTYFAENVNLEFDTTNSSNAQDAPWVLVGG
SYSGALAAWTEAVAPGTFWAYHATSAPVQAIYDFWQYFDPIRHGMAPNCSRDVSLVA
NHVDNVGKNGSATQQQALKELFGLGALEHYDDFAAVLPLGPWEWQSNTFVTGYSRFF
AFCDAVENVEAGAAAVPGPEGVGLQKALTGYAKWFKSTILPGYCANYGYWTDKMSV
ACFDTHDKSSPLFTDTSVKNAMDRQWQWFLCNEPFFWWQDGAPEGVPTIVPRTVDAA
YWQRQCSLFFPEVNGFTYGSAKGKTADTVNDWTGGWSDTNNSTHLLWVNGQYDPWL
DSGVSSTYRPGGPLKSTAEAPVLVIPGSFHCSDLNLKNYYANSGVKQVVDSAVAQIKSW
VDEYYK

FIG. 11

<SEQ ID NO:8 AcoPro2 Precursor Protein; PRT; Aspergillus coremiiformis>

MHFASPLRVVAFLASWPLLTHAFRPPRPVPLPVSRPDSTQLLTAGGQATFEQLLDHHDPS
KGTFAQRYWWSTEHWGGPGSPVILFTPGESAADGYGGYLTNNTLTGLYAQEIQGAVILI
EHRYWGDSSPYKELTAETLQYLTLEQSILDLTHFAQTVNLEFDPSNRSTASKAPWVLVG
GSYSGALTAWTEAIAPGTFWAYHATSAPVEAVYDFWQYFDPIRHGMAPNCSRDVSLVA
NYVDGVGRNGSATEKQALKELFGLGALEHYDDFAAVLPAGPYLWQSNTFTTGYSDFFA
FCDAVENVEAGAAIVPGPEGVGLQKALMGYANWFNSTILPGHCADYGYWTDTWSVAC
YDTYDPHGALFADTSVRNAADRQWQWFLCNEPFFWWQDGAPEGVPTIVPRTVDAAY
WQRQCSLFFPEVNGYTYGSAKGKTAATVNDWTGGWFETKNTTRLLWVNGQYDPWRS
SGVSSINRPGGPLQSTPNEPVQVIPGGFHCSDLYMNDYHANPGLKTVVDNAVTQIRSWV
AEYYK

FIG. 12

<SEQ ID NO:9 AwePro2 Precursor Protein; PRT; Aspergillus wentii>
MRFSAVALLASCTWASLATAIRPPKPVPRPVSRPVSRQSSTFEGQATFDQLLDHHHPEKG
TFSQRYWWSTEFWGGPGSPVVLFTPGEESADGYEGYLTNNTLTGVYAQEIQGAVILIEH
RYWGGSSPYENLTAETLQYLTLEQSILDLTYFAKTVKLEFDFNGSSNAQKAPWVLVGGS
YSGALTAWTEAISPGTFWAYHATSAPVEAIYDFWQYFYPIQQGMAQNCSKDVSLVAEYI
DHVGKTGSAKEQQDIKELFGLGALEHYNDFAAVLPIGPYLWQENTFSSGYSDFFQFCDS
VENVEAGAAVVPGPEGVGLEKALKGYAKWFNTTMLPGYCADYGYWKDEWSVACFDT
HNASSPLFTDTSVENQMDRQWQWFLCNEPFFWWQDGAPENVSTIVPRTVDAAYWQRQ
CSLFFPETNGYKYGSAKNKTASTVNDWTDGWFLTKNTTRLIWTNGQYDPWRDSGVSS
AFRPGGPLVSTPNEPVQIIPGGFHCSDLYIKDATANAGVKKVVDTEVAQIKAWVDEYYK

FIG. 13

<SEQ ID NO:10 AbrPro1 Precursor Protein; PRT; Aspergillus brasiliensis>

MRSFSAVAAAALALSWASLAQAARPRLAPKPISRPASSKSAATTGKAYFEQLLDHHNPE
KGTFSQRYWWSTEYWGGPGSPVVLFTPGEVSADGYEGYLTNETLTGVYAQEIQGAVILI
EHRYWGDSSPYDVLNAETLQYLTLDQSILDMTYFAETVKLQFDNSSRSNAQNAPWVM
VGGSYSGALTAWTESIAPGTFWAYHATSAPVEAIYDFWQYFYPIQQGMAQNCSKDVSL
VAEYVDKVGKNGTAKEQQALKEKFGLGALEHYDDFAAVLPNGPYLWQDNDFATGYSS
FFEFCDAIEGVEAGAAVTPGPEGVGLEKALANYANWFNSTILPDYCASYGYWTDEWSV
ACFDSYNASSPLFTDTSVDNAVDRQWEWFLCNEPFFWWQDGAPEGTSTIVPRLVSASY
WQRQCPLYFPEVNGYTYGSAKGKNSATVNSWTGGWDMTRNTTRLIWTNGQYDPWRD
SGVSSTFRPGGPLVSTANEPVQVIPGGFHCSDLYMQDYYVNEGVRKVVNNEVKQIKEW
VEEYYA

FIG. 14

<SEQ ID NO:11 AscPro5 Precursor Protein; PRT; Aspergillus sclerotioniger>

MRSFSAVAAAALAVSWASLAQAARPRLAPKPVSRPASSTSAATTGEAYFEQLVDHHNP
EKGTFSQRYWWSTEYWGGPGSPVVLFTPGEVSADGYEGYLTNETLTGVYAQEIQGAVI
LIEHRYWGDSSPYEVLNAETLQYLTLDQAVLDMTYFAETVKFQFDNSTRSNAQNAPWV
MVGGSYSGALTAWVESVAPGTFWAYHATSAPVEAIYDFWQYFYPISQGMAQNCSKDV
SLVAEHVDKVGKTGTAEEQQKLKELFGLGALEHYDDFAAVLPNGPYLWQDNDFVTGY
SEFFQFCDAVEGVEAGAAVTPGPEGVGLEKALANYANWFNSTMLPNYCASYGYWSDE
WSVACFDSYNASSPLFTDTSVGNAVDRQWEWFLCNEPFFWWQDGAPENVTTIVPRLVS
AEYWQRQCSLYFPETNGYTFGSAQNKTAATVNDWTGGWFETRNTTRLIWTNGQYDPW
RDSGVSSTFRPGGQLVSTANEPVQIIPGGFHCSDLYMEDYYANAGVRKVVDNEVAQIKK
WVAEYYA

FIG. 17

<SEQ ID NO:12 full length MorPro1 DNA; DNA; Magnaporthe oryzae>
ATGCTGTTCCTTTCTTCTCTCCTTCTCCTGGCCCTGTCCGGGGCTCCGGCCTACGCAGTCCGC
GTCGGCAACCTTTTGGAGCCGCCTATGCCCCCGCCCTTTGCCATCGAGGATATCGAGGATAT
AGACCCCAAGCAACTTACCAAGCGTAAGATCAGCAGCGGGTTCTTTGATCAATACATCGACC
ACAGCAATCCTTCATTGGGCACGTTTCGGCAGAAGTTTTGGTGGAGTGATGAGTTCTACAAG
GGTCCAGGCTCTCCTGTGATTCTGTTCAACCCAGGAGAATCAAGGGCCGATATCTACACCGG
CTACCTGACGAACCTTACCGTTCCCGGCATGTATGCGCAGGCTGTTGGTGCCGCCGTCGTCA
TGCTCGAGCACCGCTACTGGGGAGAGTCGTCACCTTTCGCAAACCTCAGCACCAAGAACATG
CAGTATCTGACCCTCAACAACTCCATCTCCGATACAACTCGCTTTGCCCGCCAGGTGAAGCT
GCCTTTTGACACCAGCGGGGCGACCAATGCCCCCAATGCTCCGTGGGTCTTTGTTGGTGGTT
CATACCCTGGTGCCCTTGCCGGATGGGTAGAGAGCGTCGCCCCTGGAACTTTCTGGGCCTAC
CATGCGTCAAGCGCCGTGGTCCAGGATATCGGTGATTACTGGCGCTACTTTAGCCCAATTAA
TGAAGGCATGCCCAAGAACTGCAGCGCCGACATCGGCCGGGTCGTCGAGCACATTGACAAA
GTATTGGGCACTGGATCAGACAGCGACAAGTCTGCCCTGCAGACAGCTTTTGGCCTTGGATC
CCTCGAGCATGATGACTTTGTCGAGACTCTGGCGAACGGCCCATACCTGTGGCAGGGCATTG
ATTTCAGCACTGGCTACTCGGACTTTTTCAAGTTCTGTGACTATGTTGAGGTATGCTCGCTAT
CGCCTATCCTCTTTGTTAAAATTGGCAGGAAACTGTGGCGCAGTAATTTGCTGACTTCATCCT
CTAGAACGTACCCCCGAAAGCAGCGACAAGAGTGCCCCCAGGAGTTGATGGTGTTGGTCTT
GAGAAGGCATTGACGGGCTACCAGGATTGGATCAAGAAGGAATACCTCCCAACCGCCTGCG
ACAGCTTGGGATACCCCAAGGGTGACCTGGGCTGCCTGAGCAGCCACAACTTCTCAGCCCCC
TTCTACCGTGACCAGACAGTATTAAACCCGGGGAACCGGCAGTGGTTTTGGTTTCTTTGCAA
TGAACCGTGAGTGGCGACGGCAGTGGGCTTTGATTTAAACTTACTACTGTCTTCTTTTGTACT
GACACGAGTTTGCCCATCCTTCAGCTTCAAGTTTTGGCAAAACGGCGCCCCCAAGGGCGAGC
CGTCGATTGTTTCGCGTATCATAGGCAGCAAATACTTTGAGAGCCAGTGTGCGTTGTGGTTC
CCCGACGAGCCGCGTGAAGGCGGTGGCGTTTACACGTACGGCATCGCCGAGGGCAAGGATG
TCGCCAGTGTCAACAAATTCACCGGTGGGTGGGACCACACCGACACGAAACGACTTCTTTGG
GTCAACGGCCAGTTTGACCCATGGCTGCACGCTACAGTGTCGTCGCCCTCCCGCCCCGGAGG
TCCCCTTCAATCGACAGACAAGGCACCTGTTCTGGTTATCCCGGGTGGAGTACACTGCACCG
ACTTGATTATACGCAACGGAGACGCCAACGAGGGCGCGCGCAAGGTCCAGAGTCAGGCACG
CGAAATCATCAAGAAATGGGTGTCCGAGTTTCCCAAGAGCGGAAAGAGCCCTTGA

FIG. 18

<SEQ ID NO:13 full length MorPro1 precursor; PRT; Magnaporthe oryzae>
MLFLSSLLLLALSGAPAYAVRVGNLLEPPMPPPFAIEDIEDIDPKQLTKRKISSGFFDQYID
HSNPSLGTFRQKFWWSDEFYKGPGSPVILFNPGESRADIYTGYLTNLTVPGMYAQAVGA
AVVMLEHRYWGESSPFANLSTKNMQYLTLNNSISDTTRFARQVKLPFDTSGATNAPNA
PWVFVGGSYPGALAGWVESVAPGTFWAYHASSAVVQDIGDYWRYFSPINEGMPKNCS
ADIGRVVEHIDKVLGTGSDSDKSALQTAFGLGSLEHDDFVETLANGPYLWQGIDFSTGY
SDFFKFCDYVENVPPKAATRVPPGVDGVGLEKALTGYQDWIKKEYLPTACDSLGYPKG
DLGCLSSHNFSAPFYRDQTVLNPGNRQWFWFLCNEPFKFWQNGAPKGEPSIVSRIIGSKY
FESQCALWFPDEPREGGGVYTYGIAEGKDVASVNKFTGGWDHTDTKRLLWVNGQFDP
WLHATVSSPSRPGGPLQSTDKAPVLVIPGGVHCTDLIIRNGDANEGARKVQSQAREIIKK
WVSEFPKSGKSP

FIG. 19

<SEQ ID NO:14 MorPro1 predicted mature enzyme; PRT; Magnaporthe oryzae>
VRVGNLLEPPMPPPFAIEDIEDIDPKQLTKRKISSGFFDQYIDHSNPSLGTFRQKFWWSDE
FYKGPGSPVILFNPGESRADIYTGYLTNLTVPGMYAQAVGAAVVMLEHRYWGESSPFA
NLSTKNMQYLTLNNSISDTTRFARQVKLPFDTSGATNAPNAPWVFVGGSYPGALAGWV
ESVAPGTFWAYHASSAVVQDIGDYWRYFSPINEGMPKNCSADIGRVVEHIDKVLGTGS
DSDKSALQTAFGLGSLEHDDFVETLANGPYLWQGIDFSTGYSDFFKFCDYVENVPPKAA
TRVPPGVDGVGLEKALTGYQDWIKKEYLPTACDSLGYPKGDLGCLSSHNFSAPFYRDQ
TVLNPGNRQWFWFLCNEPFKFWQNGAPKGEPSIVSRIIGSKYFESQCALWFPDEPREGG
GVYTYGIAEGKDVASVNKFTGGWDHTDTKRLLWVNGQFDPWLHATVSSPSRPGGPLQ
STDKAPVLVIPGGVHCTDLIIRNGDANEGARKVQSQAREIIKKWVSEFPKSGKSP

FIG. 20

<SEQ ID NO:15 Synthesized nucleotide sequence encoding full-length MorPro1; DNA; Artificial sequence>

ATGCTCTTTCTGAGCTCCCTCCTGCTGCTCGCTCTCAGCGGCGCTCCCGCCTACGCCGTT

CGAGTTGGCAACCTCCTGGAGCCTCCCATGCCTCCTCCCTTTGCTATTGAGGACATCGAA

GACATTGACCCTAAGCAGCTCACCAAGCGAAAAATCAGCAGCGGTTTCTTCGACCAGTAC

ATCGACCACTCCAACCCCAGCCTCGGTACTTTCCGCCAAAAGTTTTGGTGGTCCGACGAG

TTCTACAAGGGCCCCGGTTCCCCCGTCATCCTGTTCAACCCTGGCGAAAGCCGCGCTGAT

ATCTACACCGGCTATCTGACTAACCTCACCGTCCCCGGCATGTACGCTCAAGCCGTCGGT

GCTGCCGTTGTCATGCTGGAGCACCGCTATTGGGGCGAGTCCAGCCCCTTCGCCAATCTC

TCCACCAAGAACATGCAGTACCTGACCCTCAACAACAGCATTAGCGACACCACCCGCTTT

GCCCGCCAGGTCAAGCTGCCCTTTGACACCTCCGGCGCCACCAATGCTCCTAATGCCCCC

TGGGTCTTTGTCGGTGGTAGCTATCCTGGTGCCCTGGCCGGTTGGGTCGAGAGCGTTGCT

CCTGGCACCTTCTGGGCCTATCATGCCAGCTCCGCCGTCGTTCAAGATATCGGCGACTAT

TGGCGCTACTTTAGCCCCATCAACGAGGGCATGCCTAAAAACTGCAGCGCCGACATCGGT

CGCGTCGTCGAACACATCGATAAGGTCCTGGGTACCGGCTCCGACAGCGATAAGAGCGCC

CTGCAGACCGCTTTCGGCCTCGGCAGCCTGGAACACGACGACTTCGTCGAGACCCTCGCC

FIG. 20 – cont.

AACGGCCCCTACCTCTGGCAGGGCATCGACTTCAGCACTGGCTACAGCGACTTCTTCAAG
TTCTGCGACTACGTCGAGAATGTCCCTCCCAAGGCCGCCACTCGCGTTCCTCCCGGCGTC
GACGGCGTCGGCCTGGAGAAGGCCCTGACCGGTTACCAGGACTGGATCAAGAAGGAGTAC
CTCCCCACCGCCTGCGATTCCCTCGGCTACCCCAAGGCGATCTCGGTTGCCTCAGCTCC
CACAACTTCTCCGCCCCTTTCTACCGCGATCAGACCGTCCTCAACCCCGGTAATCGCCAG
TGGTTCTGGTTCCTCTGCAACGAGCCCTTCAAGTTCTGGCAAAACGGCGCCCCCAAGGGC
GAGCCCAGCATCGTCAGCCGCATTATTGGCAGCAAGTACTTCGAGTCCCAGTGCGCCCTC
TGGTTTCCCGATGAGCCCCGCGAGGGCGGCGGTGTTTATACTTACGGCATCGCCGAAGGT
AAGGATGTCGCCAGCGTCAATAAGTTTACTGGCGGCTGGGACCATACTGACACCAAACGC
CTCCTGTGGGTTAACGGCCAGTTCGACCCCTGGCTCCACGCCACTGTCAGCAGCCCTAGC
CGACCCGGTGGCCCCTCCAGAGCACTGACAAGGCCCCTGTCCTCGTTATTCCCGGCGGC
GTCCACTGCACCGATCTCATCATCCGCAACGGCGACGCTAACGAAGGCGCTCGCAAGGTT
CAAAGCCAGGCCCGCGAGATCATTAAGAAGTGGGTCAGCGAGTTTCCTAAAAGCGGCAAG
TCCCCCTAA

FIG. 21A
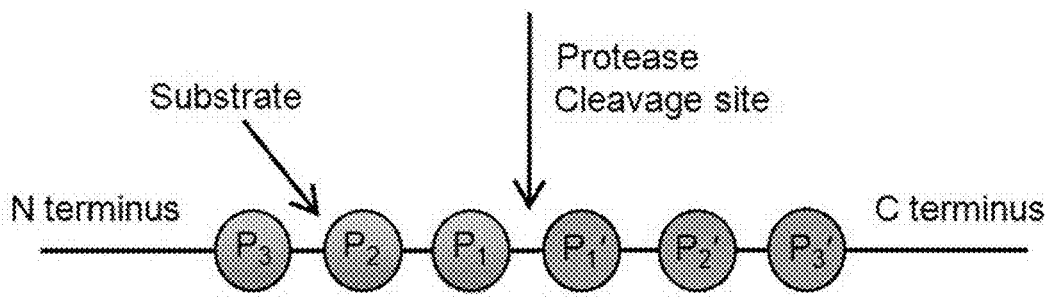
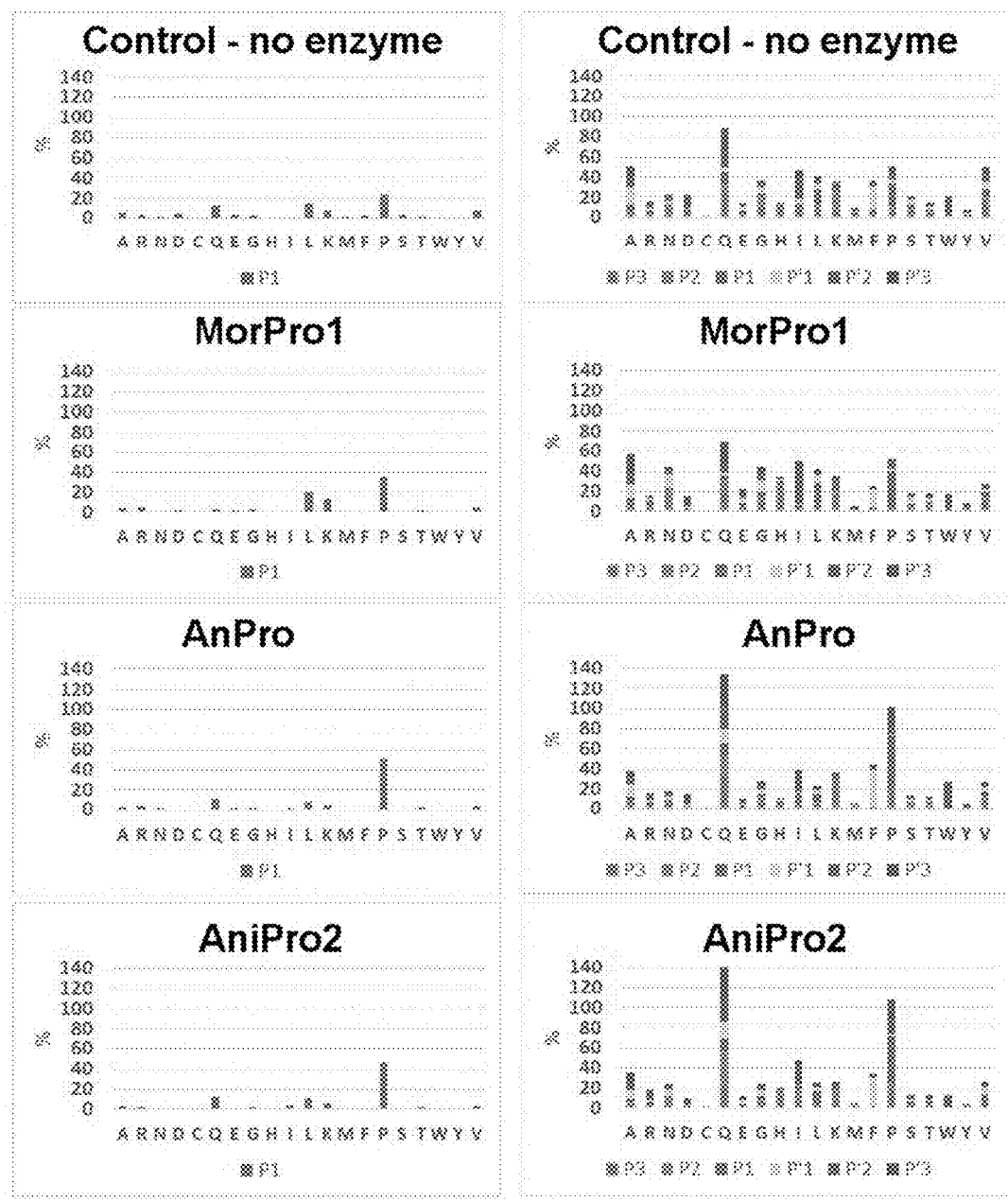
FIG. 21B

FIG. 23

<SEQ ID NO:16 AniPro_2 mature Protein; PRT; Aspergillus niger>

KSAATTGEAYFEQLLDHHNPEKGTFSQRYWWSTEYWGGPGSPVVLFNPGEVSADGYE
GYLTNDTLTGVYAQEIQGAVILIEHRYWGDSSPYEVLNAETLQYLTLDQSILDMTYFAE
TVKLQFDNSSRSNAQNAPWVMVGGSYSGALTAWTESIAPGTFWAYHATSAPVEAIYDF
WQYFYPIQQGMAQNCSKDVSLVAEYVDKIGKNGTAKEQQELKELFGLGAVEHYDDFA
AVLPNGPYLWQDNDFVTGYSSFFQFCDAVEGVEAGAAVTPGPEGVGLEKALANYANW
FNSTILPNYCASYGYWTDEWSVACFDSYNASSPIFTDTSVGNPVDRQWEWFLCNEPFFW
WQDGAPEGTSTIVPRLVSASYWQRQCPLYFPEVNGYTYGSAKGKNSATVNSWTGGWD
MTRNTTRLIWTNGQYDPWRDSGVSSTFRPGGPLVSTANEPVQIIPGGFHCSDLYMEDYY
ANEGVRKVVDNEVKQIKEWVEEYYA

PROTEASES FOR BEER HAZE REDUCTION

CROSS-REFERENCE TO RELATED APPLICATIONS

This application is a continuation of U.S. application Ser. No. 18/570,916, filed Dec. 15, 2023, which is a U.S. National Stage Application under 35 U.S.C. § 371 of International Application No. PCT/US2022/034013, filed Jun. 17, 2022, which claims priority to International Application No. PCT/CN2021/100928, filed Jun. 18, 2021, all of which are hereby incorporated by reference in their entireties.

INCORPORATION BY REFERENCE OF THE SEQUENCE LISTING

The present application is being filed with a Sequence Listing in electronic format. The Sequence Listing is provided as a file entitled NB41925USPCN2_SEQ_Listing.xml, created on Dec. 5, 2024, which is 25,946 bytes in size. The information in the electronic format of the Sequence Listing is incorporated by reference in its entirety.

TECHNICAL FIELD

The present invention relates to endoproteases. More particularly, the present invention relates to the use of endoproteases for reduction or elimination of beer haze, and stabilization of beer foam.

BACKGROUND

Beer-haze, a cloudy appearance in beer, is caused by the aggregation of hydrophobic proteins, e.g., hordeins, from barley, and polyphenols, resulting in a beer with an undesirable cloudy or hazy appearance. The appearance of haze in beer is most often seen when beer is chilled for storage. This phenomenon is sometimes called chill-haze. Haze formation can also occur in wine and fruit juices.

It is known to use acid proteases such as papain to proteolyze the hydrophobic proteins and hence prevent haze formation. However, broad spectrum proteases such as papain have been found to impair beer foam formation. More selective proteases such as proline specific endoproteases have also been employed to reduce beer haze. However, present commercial offerings are overly expensive and do not provide complete beer-haze removal. In this regard, current beer haze proteases are not sufficiently specific to enable complete hydrolysis and require additional steps such as filtration assisted by e.g., PVPP (polyvinylpolypyrrolidone) or silica gel. Hence, there is continuing need for proteases that can be used to prevent chill haze more thoroughly at a reasonable cost, with increased specificity and which do not survive the brewing process.

Furthermore, there is a need for endoproteases that can reduce beer haze, but which do not have an adverse effect on foam formation and stability.

SUMMARY OF THE INVENTION

In accordance with an aspect of the present invention, a method for the reduction or prevention of haze in a beverage is presented having the step of adding an endoprotease to the beverage, wherein the endoprotease is an enzyme having at least 75, 80, 85, 90, 95, 98, 99 or 100% sequence identity to SEQ ID NO:1, SEQ ID NO:2, SEQ ID NO:3, SEQ ID NO:4 or SEQ ID NO:16 or an endoprotease active fragment thereof such as a mature protein.

Optionally, the endoprotease active fragment is a mature protein. Optionally, the beverage contains proteins. Optionally, the beverage contains polyphenols. Optionally, the beverage is a beer. Optionally, the beverage is a wine. Optionally, the beverage is a fruit juice.

Optionally, the endoprotease is added to a wort. Optionally, the endoprotease is added to a beer after haze has been formed. Optionally, the endoprotease is added to a beer before haze has been formed.

Optionally, the beer has an increased relative foam stability and an increased relative haze reduction. Optionally, the increased relative foam stability is above 100, 101, 102, 103, 104, 105, 106, 107, 108, 109 or 110%. Optionally, the increased relative haze reduction is above 73%, 74%, 75%, 76%, 77%, 78%, 79%, 80% as measured by 90° scattering.

Optionally, the endoprotease is present in the wort in an amount of 4 to 300 mg protease/hL wort, optionally 10 to 250 mg protease/hL wort, optionally 20 to 200 mg protease/hL wort, optionally 30 to 150 mg protease/hL wort or optionally 40 to 100 mg protease/hL wort.

Optionally, the method has the further step of adding one or more of an ALDC enzyme, a glucoamylase, a maltogenic alpha-amylase, a pullulanase, a catalase or a transglucosidase.

Optionally, the ALDC enzyme is an acetolactate decarboxylase as set forth in EC 4.1.1.5. Optionally, the glucoamylase is a 1,4-alpha-glucosidase as set forth in EC 3.2.1.3. Optionally, the maltogenic alpha amylase is a glucan 1,4-alpha-maltohydrolase as set forth in EC 3.3.1.133. Optionally, the pullulanase is an alpha-dextrin endo-1,6-alpha-glucosidase, limit dextrinase, amylopectin 6-glucanohydrolase, debranching enzyme as set forth in EC 3.2.1.41. Optionally, the transglucosidase is 1,4-alpha-glucan-branching enzyme, Oligoglucan-branching glucosyltransferse as set forth in EC 2.4.1.24.

In another aspect of the present invention, a method is presented for increasing relative foam stability in a beer having the step of adding an endoprotease to the beverage, wherein the endoprotease is an enzyme having at least 75, 80, 85, 90, 95, 98, 99 or 100% sequence identity to SEQ ID NO:1, SEQ ID NO:2, SEQ ID NO:3, SEQ ID NO:4 or SEQ ID NO:16 or an endoprotease active fragment thereof such as a mature protein.

Optionally, the increased relative foam stability is above 100, 101, 102, 103, 104, 105, 106, 107, 108, 109 or 110%. Optionally, the endoprotease active fragment is a mature protein.

Optionally, the endoprotease is added to a wort. Optionally, the endoprotease is added to a beer after haze has been formed. Optionally, the endoprotease is added to a beer before haze has been formed.

Optionally, the endoprotease is present in the wort in an amount of 4 to 300 mg protease/hL wort, optionally 10 to 250 mg protease/hL wort, optionally 20 to 200 mg protease/hL wort, optionally 30 to 150 mg protease/hL wort or optionally 40 to 100 mg protease/hL wort.

Optionally, the method has the further step of adding one or more of an ALDC enzyme, a glucoamylase, a maltogenic alpha-amylase, a pullulanase, a catalase or a transglucosidase.

Optionally, the ALDC enzyme is an acetolactate decarboxylase as set forth in EC 4.1.1.5. Optionally, the glucoamylase is a 1,4-alpha-glucosidase as set forth in EC 3.2.1.3.

Optionally, the maltogenic alpha amylase is a glucan 1,4-alpha-maltohydrolase as set forth in EC 3.3.1.133. Optionally, the pullulanase is an alpha-dextrin endo-1,6-alpha-glucosidase, limit dextrinase, amylopectin 6-glucano-hydrolase, debranching enzyme as set forth in EC 3.2.1.41. Optionally, the transglucosidase is 1,4-alpha-glucan-branching enzyme, Oligoglucan-branching glucosyltransferse as set forth in EC 2.4.1.24.

Optionally, the beer has an increased relative foam stability and an increased relative haze reduction. Optionally, the increased relative haze reduction is above 73%, 74%, 75%, 76%, 77%, 78%, 79%, 80% as measured by 90° scattering.

In another aspect of the present invention, an isolated polypeptide is presented comprising an endoprotease wherein said endoprotease is an enzyme having at least 75, 80, 85, 90, 95, 98, 99 or 100% sequence identity to SEQ ID NO:1, SEQ ID NO:2, SEQ ID NO:3, SEQ ID NO: 4 or SEQ ID NO:16 or an endoprotease active fragment thereof.

In another aspect of the present invention, an isolated polynucleotide is presented having a nucleic acid sequence which encodes the above polypeptide.

In another aspect of the present invention, a nucleic acid construct is presented having the above polynucleotide operably linked to one or more control sequences that direct the production of the polypeptide in a suitable expression host.

In another aspect of the present invention, a recombinant expression vector is presented having the above nucleic acid construct.

In another aspect of the present invention, a recombinant host cell is presented having the above nucleic acid construct or the above vector.

In another aspect of the present invention, a method for producing the above polypeptide is presented having the step of cultivating of the above recombinant host cell, to produce a supernatant and/or cells having the polypeptide; and recovering the polypeptide.

In another aspect of the present invention, a polypeptide is presented produced by the above method.

In another aspect of the present invention, use of a filtrate obtained from a fermentation broth obtained by the above method in the prevention or reduction of haze in a beverage is presented.

In another aspect of the present invention, a composition having a polypeptide, isolated polynucleotide, nucleic acid construct, recombinant expression vector, or recombinant host cell as described above is presented.

In another aspect of the present invention, use of a polypeptide, isolated polynucleotide, nucleic acid construct, recombinant expression vector, or recombinant host cell as described above for increasing relative foam stability in a beverage is presented.

In another aspect of the present invention, use of a polypeptide, isolated polynucleotide, nucleic acid construct, recombinant expression vector, or recombinant host cell as described above for increasing relative haze reduction in a beverage is presented.

In another aspect of the present invention, a method for reducing haze in a beverage having the step of adding to the beverage a glutamine endoprotease wherein the beverage has a protein or peptide having a glutamine residue which is cut by the protease thereby reducing haze is presented. Optionally, the glutamine endoprotease also cuts at proline residues. Optionally, the beverage is fruit juice, wine, or beer. Optionally, the beverage is beer.

Optionally, the glutamine endoprotease comprises a polypeptide having at least 80, 85, 90, 95, 98, or 99% homology to SEQ ID NO:2 or SEQ ID NO: 16 or an endoprotease active fragment thereof such as a mature protein lacking the signal sequence. Optionally, the glutamine endoprotease comprises a polypeptide according to SEQ ID NO:16.

BRIEF DESCRIPTION OF THE BIOLOGICAL SEQUENCES

SEQ ID NO:1 is the AbePro2 precursor protein.
SEQ ID NO:2 is the AniPro_2 precursor protein.
SEQ ID NO:3 is the AtrPro1 precursor protein.
SEQ ID NO:4 is the AhoPro3 precursor protein.
SEQ ID NO:5 is the ApsPro1 precursor protein.
SEQ ID NO:6 is the AnePro2 precursor protein.
SEQ ID NO:7 is the AalPro2 precursor protein.
SEQ ID NO:8 is the AcoPro2 precursor protein.
SEQ ID NO:9 is the AwePro2 precursor protein.
SEQ ID NO:10 is the AbrPro1 precursor protein.
SEQ ID NO:11 is the AscPro5 precursor protein.
SEQ ID NO: 12 is the full length MorPro1 DNA.
SEQ ID NO:13 is full length MorPro1 precursor.
SEQ ID NO:14 is MorPro1 predicted mature enzyme.
SEQ ID NO:15 is a synthesized nucleotide sequence encoding full-length MorPro1.
SEQ ID NO:16 is AniPro_2 mature protein.

BRIEF DESCRIPTION OF THE DRAWINGS

FIG. 1 is the AbePro2 precursor protein.
FIG. 2 is the AniPro_2 precursor protein.
FIG. 3 is the AtrPro1 precursor protein.
FIG. 4 is the AhoPro3 precursor protein.
FIG. 8 is the ApsPro1 precursor protein.
FIG. 9 is the AnePro2 precursor protein.
FIG. 10 is the AalPro2 precursor protein.
FIG. 11 is the AcoPro2 precursor protein.
FIG. 12 is the AwePro2 precursor protein.
FIG. 13 is the AbrPro1 precursor protein.
FIG. 14 is the AscPro5 precursor protein.
FIG. 17 shows full length MorPro1 DNA.
FIG. 18 shows full length MorPro1 precursor.
FIG. 19 shows MorPro1 predicted mature enzyme.
FIG. 20 shows a synthesized nucleotide sequence encoding full-length MorPro1.
FIG. 21A shows the nomenclature of protease substrate specificity. Amino acid residues in the substrate are numbered outward from the protease cleavage site as: P3, P2, P1, P1', P2', P3' and the cleavage site is highlighted by the black arrow, between P1 and P1'.

FIG. 21B depicts peptides generated from malt beers produced at 1 hL scale with or without endoproteases and the relative amino acid content at the peptide termini positions corresponding to P3'-P3 by protease cleavage. The relative amino acid content of peptides in the P1 position is shown in graphs to the left for control (no enzyme), MorPro1, AnPro and AniPro2. The relative amino acid content at the peptide position corresponding to P3-P3' are shown to the right with graphs displaying the cumulative content of each amino acid at given positions and hereby the detailed protease specificity preferences.

FIG. 23 shows AniPro_2 mature protein.

DETAILED DESCRIPTION OF THE INVENTION

Figure 5:
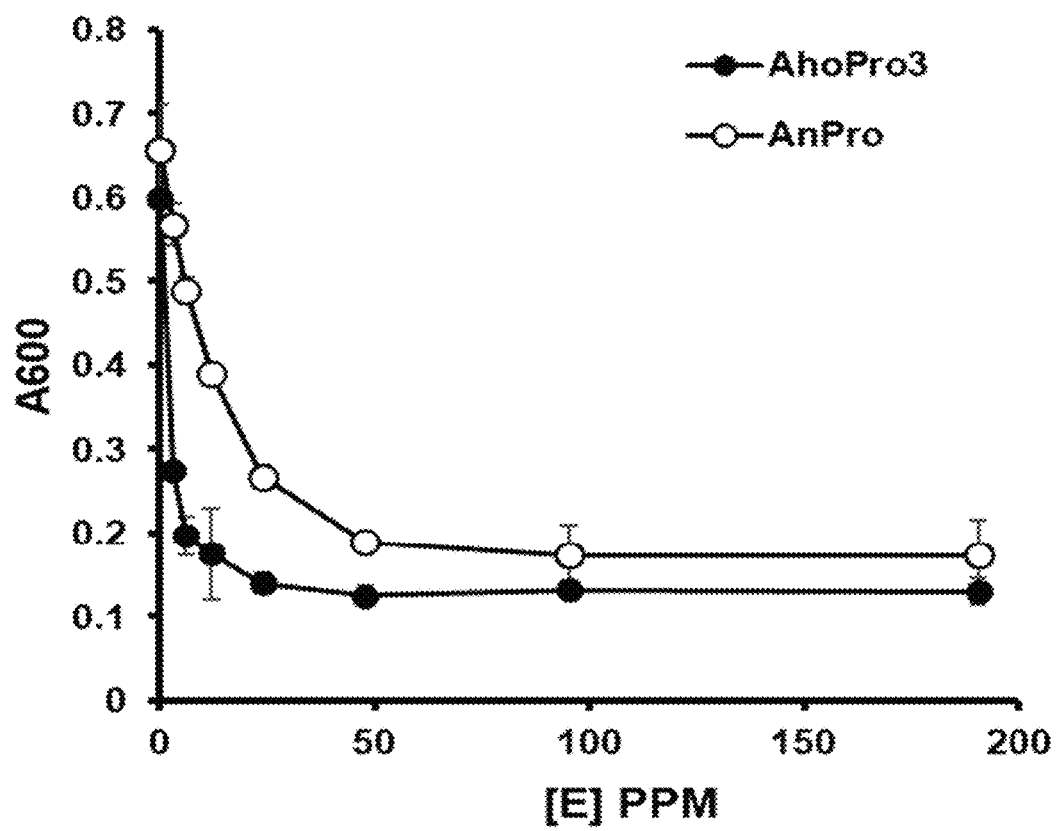
FIG. 5. shows haze reduction performance of purified AhoPro3 and AnPro shown as OD600 in response to enzyme concentrations of 3 to 190 ppm.

The practice of the present teachings will employ, unless otherwise indicated, conventional techniques of molecular biology (including recombinant techniques), microbiology, cell biology, and biochemistry, which are within the skill of the art. Such techniques are explained fully in the literature, for example, *Molecular Cloning: A Laboratory Manual*, second edition (Sambrook et al., 1989); *Oligonucleotide Synthesis* (M. J. Gait, ed., 1984; *Current Protocols in Molecular Biology* (F. M. Ausubel et al., eds., 1994); *PCR: The Polymerase Chain Reaction* (Mullis et al., eds., 1994); *Gene Transfer and Expression: A Laboratory Manual* (Kriegler, 1990), and *The Alcohol Textbook* (Ingledew et al., eds., Fifth Edition, 2009), and *Essentials of Carbohydrate Chemistry and Biochemistry* (Lindhorste, 2007).

Unless defined otherwise herein, all technical and scientific terms used herein have the same meaning as commonly understood by one of ordinary skill in the art to which the present teachings belong. Singleton, et al., *Dictionary of Microbiology and Molecular Biology*, second ed., John Wiley and Sons, New York (1994), and Hale & Markham, *The Harper Collins Dictionary of Biology*, Harper Perennial, NY (1991) provide one of skill with a general dictionary of many of the terms used in this invention. Any methods and materials similar or equivalent to those described herein can be used in the practice or testing of the present teachings.

Numeric ranges provided herein are inclusive of the numbers defining the range.

Definitions and Abbreviations

The terms, "wild-type," "parental," or "reference," with respect to a polypeptide, refer to a naturally-occurring polypeptide that does not include a man-made substitution, insertion, or deletion at one or more amino acid positions. Similarly, the terms "wild-type," "parental," or "reference," with respect to a polynucleotide, refer to a naturally-occurring polynucleotide that does not include a man-made nucleoside change. However, note that a polynucleotide encoding a wild-type, parental, or reference polypeptide is not limited to a naturally-occurring polynucleotide, and encompasses any polynucleotide encoding the wild-type, parental, or reference polypeptide.

The term "variant," with respect to a polypeptide, refers to a polypeptide that differs from a specified wild-type, parental, or reference polypeptide in that it includes one or more naturally-occurring or man-made substitutions, insertions, or deletions of an amino acid. Similarly, the term "variant," with respect to a polynucleotide, refers to a polynucleotide that differs in nucleotide sequence from a specified wild-type, parental, or reference polynucleotide. The identity of the wild-type, parental, or reference polypeptide or polynucleotide will be apparent from context.

The term "recombinant," when used in reference to a subject cell, nucleic acid, protein or vector, indicates that the subject has been modified from its native state. Thus, for example, recombinant cells express genes that are not found within the native (non-recombinant) form of the cell, or express native genes at different levels or under different conditions than found in nature. Recombinant nucleic acids differ from a native sequence by one or more nucleotides and/or are operably linked to heterologous sequences, e.g., a heterologous promoter in an expression vector. Recombinant proteins may differ from a native sequence by one or more amino acids and/or are fused with heterologous sequences. A vector comprising a nucleic acid encoding an endoprotease is a recombinant vector.

The terms "recovered," "isolated," and "separated," refer to a compound, protein (polypeptides), cell, nucleic acid, amino acid, or other specified material or component that is removed from at least one other material or component with which it is naturally associated as found in nature. An "isolated" polypeptides, thereof, includes, but is not limited to, a culture broth containing secreted polypeptide expressed in a heterologous host cell.

The term "purified" refers to material (e.g., an isolated polypeptide or polynucleotide) that is in a relatively pure state, e.g., at least about 90% pure, at least about 95% pure, at least about 100% pure.

The term "amino acid sequence" is synonymous with the terms "polypeptide," "protein," and "peptide," and are used interchangeably. Where such amino acid sequences exhibit activity, they may be referred to as an "enzyme." The conventional one-letter or three-letter codes for amino acid residues are used, with amino acid sequences being presented in the standard amino-to-carboxy terminal orientation (i.e., N→C).

The term "nucleic acid" encompasses DNA, RNA, heteroduplexes, and synthetic molecules capable of encoding a polypeptide. Nucleic acids may be single stranded or double stranded, and may be chemical modifications. The terms "nucleic acid" and "polynucleotide" are used interchangeably. Because the genetic code is degenerate, more than one codon may be used to encode a particular amino acid, and the present compositions and methods encompass nucleotide sequences that encode a particular amino acid sequence. Unless otherwise indicated, nucleic acid sequences are presented in 5'-to-3' orientation.

The terms "transformed," "stably transformed," and "transgenic," used with reference to a cell means that the cell contains a non-native (e.g., heterologous) nucleic acid sequence integrated into its genome or carried as an episome that is maintained through multiple generations.

The term "introduced" in the context of inserting a nucleic acid sequence into a cell, means "transfection", "transformation" or "transduction," as known in the art.

A "host strain" or "host cell" is an organism into which an expression vector, phage, virus, or other DNA construct, including a polynucleotide encoding a polypeptide of interest (e.g., an endoprotease) has been introduced. Exemplary host strains are microorganism cells (e.g., bacteria, filamentous fungi, and yeast) capable of expressing the polypeptide of interest. The term "host cell" includes protoplasts created from cells.

The term "heterologous" with reference to a polynucleotide or protein refers to a polynucleotide or protein that does not naturally occur in a host cell.

The term "endogenous" with reference to a polynucleotide or protein refers to a polynucleotide or protein that occurs naturally in the host cell.

The term "expression" refers to the process by which a polypeptide is produced based on a nucleic acid sequence. The process includes both transcription and translation.

A "vector" refers to a polynucleotide sequence designed to introduce nucleic acids into one or more cell types. Vectors include cloning vectors, expression vectors, shuttle vectors, plasmids, phage particles, cassettes and the like.

An "expression vector" refers to a DNA construct comprising a DNA sequence encoding a polypeptide of interest, which coding sequence is operably linked to a suitable control sequence capable of effecting expression of the DNA in a suitable host. Such control sequences may include a promoter to effect transcription, an optional operator sequence to control transcription, a sequence encoding suitable ribosome binding sites on the mRNA, enhancers and sequences which control termination of transcription and translation.

As used herein, "percent sequence identity" means that a particular sequence has at least a certain percentage of amino acid residues identical to those in a specified reference sequence, when aligned using the CLUSTAL W algorithm with default parameters. See Thompson et al. (1994) *Nucleic Acids Res.* 22:4673-4680. Default parameters for the CLUSTAL W algorithm are:

| | |
|---|---|
| Gap opening penalty: | 10.0 |
| Gap extension penalty: | 0.05 |
| Protein weight matrix: | BLOSUM series |
| DNA weight matrix: | IUB |
| Delay divergent sequences %: | 40 |
| Gap separation distance: | 8 |
| DNA transitions weight: | 0.50 |
| List hydrophilic residues: | GPSNDQEKR |
| Use negative matrix: | OFF |
| Toggle Residue specific penalties: | ON |
| Toggle hydrophilic penalties: | ON |
| Toggle end gap separation penalty | OFF. |

Deletions are counted as non-identical residues, compared to a reference sequence.

Deletions occurring at either terminus are included.

The term "about" refers to ±5% to the referenced value.

As used herein, the term "beer" traditionally refers to an alcoholic beverage derived from malt, which is derived from barley, and optionally adjuncts, such as cereal grains, and flavored with hops. However, "beer" can also be derived from adjuncts such as rice, sorghum, etc. Beer can be made from a variety of grains by essentially the same process. All grain starches are glucose homopolymers in which the glucose residues are linked by either alpha-1,4- or alpha-1,6-bonds, with the former predominating. The process of making fermented malt beverages is commonly referred to as brewing. The principal raw materials used in making these beverages are water, hops and malt. In addition, adjuncts such as common corn grits, refined corn grits, rice, sorghum, refined corn starch, barley, barley starch, dehusked barley, wheat, wheat starch, torrefied cereal, cereal flakes, rye, oats, potato, tapioca, and syrups, such as corn syrup, sugar cane syrup, inverted sugar syrup, barley and/or wheat syrups, and the like may be used as a source of starch or fermentable sugar types. The starch will eventually be converted into dextrins and fermentable sugars. For a number of reasons, the malt, which is produced principally from selected varieties of barley, has the greatest effect on the overall character and quality of the beer. First, the malt is the primary flavoring agent in beer. Second, the malt provides the major portion of the fermentable sugar. Third, the malt provides the proteins, which will contribute to the body and foam character of the beer. Fourth, the malt provides the necessary enzymatic activity during mashing.

The process for making beer is one that is well known in the art, but briefly, it involves five steps: (a) adjunct cooking and/or mashing (b) wort separation and extraction (c) boiling and hopping of wort (d) cooling, fermentation and storage, and (c) maturation, processing and packaging. In the first step, milled or crushed malt is mixed with water and held for a period of time under controlled temperatures to permit the enzymes present in the malt to, for example, convert the starch present in the malt into fermentable sugars. In the second step, the mash is transferred to a "lauter tun" or mash filter where the liquid is separated from the grain residue. This sweet liquid is called "wort" and the left-over grain residue is called "spent grain". The mash is typically subjected to an extraction during mash separation, which involves adding water to the mash in order to recover the residual soluble extract from the spent grain. In the third step, the wort is boiled vigorously. This sterilizes the wort and helps to develop the color, flavor, and odor. Hops are added at some point during the boiling. In the fourth step, the wort is cooled and transferred to a fermenter, which either contains the yeast or to which yeast is added. The yeast converts the sugars by fermentation into alcohol and carbon dioxide gas; at the end of fermentation the fermenter is chilled or the fermenter may be chilled to stop fermentation. The yeast flocculates and is removed. In the last step, the beer is cooled and stored for a period of time, during which the beer clarifies, and its flavor develops, and any material that might impair the appearance, flavor and shelf life of the beer settles out. Prior to packaging, the beer is carbonated and, optionally, filtered and pasteurized. After fermentation, a beverage is obtained which usually contains from about 2% to about 10% alcohol by weight. The non-fermentable carbohydrates are not converted during fermentation and form the majority of the dissolved solids in the final beer. This residue remains because of the inability of malt enzymes to hydrolyze the alpha-1,6-linkages of the starch and fully degrade the non-starch polysaccharides.

As used herein "haze" refers to the appearance of insoluble materials in beverages such as fruit juice, wine and beer. Haze is understood to occur when proteins (typically proline and glutamine rich proteins) interact with polyphenols to form insoluble complexes. Such complexes are well known in beer brewing, particularly where beer is chilled for storage. This phenomenon is sometimes also called chill haze.

The term "glutamine endoprotease" refers to an endoprotease that preferentially cuts a substrate protein or peptide at one or more glutamine residues.

As used herein, "increased relative foam stability" means an increased foam stability of the final beer achieved by the presence of an endoprotease in the fermenting wort as compared to fermenting the same wort without an endoprotease.

Foam stability can be measured by the NIBEM foam stability test as described in example 15. Relative foam stability may be calculated by measuring the NIBEM foam test collapse time (30 mm) from a beer produced by the presence of an endoprotease in the fermenting wort and measuring the NIBEM foam test collapse time (30 mm) of the beer produced by fermenting the same wort but without an endoprotease. The relative foam stability may be calculated as follows: (Collapse time NIBEM 30 mm with PEP enzyme)/(Collapse time NIBEM 30 mm without PEP enzyme)×100%.

An increased relative foam stability above 100, 101, 102, 103, 104, 105, 106, 107, 108, 109, and 110% is preferred.

As used herein "increased relative haze reduction" means an increased haze reduction measured in the final beer achieved by the presence of an endoprotease in the fermenting wort as compared to fermenting the same wort without an endoprotease.

Relative haze reduction can be measured by the EBC TOHA forced haze method as described in example 13. The relative haze reduction may be calculated by measuring the EBC TOHA forced haze 90° EBC scattering from a beer produced by the presence of an endoprotease in the fermenting wort and measuring the EBC TOHA forced haze 90° EBC scattering of the beer produced by fermenting the same wort however without an endoprotease. The relative haze reduction using endoprotease may be calculated against the beer without any PEP enzyme as follows: ($EBC_{Turbidity\ 90°\ no\ enzyme} - EBC_{Turbidity\ 90°\ with\ PEP\ enzyme}$)/$EBC_{Turbidity\ 90°\ no\ enzyme}$×100%. Similarly, the relative haze reduction may be calculated by measuring the EBC TOHA forced haze using 25° EBC scattering from a beer produced by the presence of an endoprotease in the fermenting wort and measuring the EBC TOHA forced haze 25° EBC scattering of the beer produced by fermenting the same wort but without an endoprotease. The relative haze reduction using endoprotease may be calculated against the beer without any PEP enzyme as follows: ($EBC_{Turbidity\ 25°\ no\ enzyme} - EBC_{Turbidity\ 25°\ with\ PEP\ enzyme}$)/$EBC_{Turbidity\ 25°\ no\ enzyme}$×100%.

An increased relative haze reduction (90°) above 67, 68, 69, 70, 71, 72, 73, 74, 75, 76, 77, 78, 79, 80, 81, 82, or 83% is preferred.

The present endoprotease may be "precursor," "immature," or "full-length," in which case they include a signal sequence, or "mature," in which case they lack a signal sequence. Mature forms of the polypeptides are generally the most useful. The present endoprotease polypeptides may also be truncated to remove the N or C-termini, so long as the resulting polypeptides retain endoprotease activity. In addition, endoprotease enzymes may be active fragments derived from a longer amino acid sequence. Active fragments are characterized by retaining some or all of the activity of the full-length enzyme but have deletions from the N-terminus, from the C-terminus or internally or combinations thereof. A mature protein may be considered an active fragment of a precursor, immature or full-length protein.

The present endoprotease may be a "chimeric" or "hybrid" polypeptide, in that it includes at least a portion of a first endoprotease polypeptide, and at least a portion of a second endoprotease polypeptide. The present endoprotease may further include heterologous signal sequence, an epitope to allow tracking or purification, or the like. Exemplary heterologous signal sequences are from *B. licheniformis* amylase (LAT), *B. subtilis* (AmyE or AprE), and *Streptomyces* CelA.

Production of Endoproteases

The present endoprotease can be produced in host cells, for example, by secretion, by surface display, or by intracellular expression. A cultured cell material (e.g., a whole-cell broth) comprising an endoprotease can be obtained following secretion of the endoprotease into the cell medium. Optionally, the endoprotease can be isolated from the host cells, or even isolated from the cell broth, depending on the desired purity of the final endoprotease. Alternatively, an endoprotease can be expressed on the host cell surface.

A gene encoding an endoprotease can be cloned and expressed according to methods well known in the art. Suitable host cells include bacterial, fungal (including yeast and filamentous fungi), and plant cells (including algae). Particularly useful host cells include *Saccharomyces cerevisiae, Saccharomyces pastorianus, Brettanomyces, Aspergillus niger, Aspergillus oryzae* or *Trichoderma reesei*. Other host cells include bacterial cells, e.g., *Bacillus subtilis* or *B. licheniformis*, as well as *Streptomyces, E. Coli*.

In an aspect of the present invention, yeast cells expressing the endoprotease could be used directly in beer production for fermentation. In this aspect of the present invention, exogenous endoprotease would not have to be added. Haze reduction would be provided by the yeast expressed endoprotease.

The host cell further may express a nucleic acid encoding a homologous or heterologous endoprotease, i.e., an endoprotease that is not the same species as the host cell, or one or more other enzymes. The endoprotease may be a variant endoprotease. Additionally, the host may express one or more accessory enzymes, proteins, peptides.

Vectors

A DNA construct comprising a nucleic acid encoding an endoprotease can be constructed to be expressed in a host cell. Because of the well-known degeneracy in the genetic code, variant polynucleotides that encode an identical amino acid sequence can be designed and made with routine skill. It is also well-known in the art to optimize codon use for a particular host cell. Nucleic acids encoding endoprotease can be incorporated into a vector. Vectors can be transferred to a host cell using well-known transformation techniques, such as those disclosed below.

The vector may be any vector that can be transformed into and replicated within a host cell. For example, a vector comprising a nucleic acid encoding an endoprotease can be transformed and replicated in a bacterial host cell as a means of propagating and amplifying the vector. The vector also may be transformed into an expression host, so that the encoding nucleic acids can be expressed as a functional endoprotease. Host cells that serve as expression hosts can include filamentous fungi, for example. The Fungal Genetics Stock Center (FGSC) Catalogue of Strains lists suitable vectors for expression in fungal host cells. See FGSC, Catalogue of Strains, University of Missouri, at www.fgsc.net (last modified Jan. 17, 2007). A representative vector is pJG153, a promoter less Cre expression vector that can be replicated in a bacterial host. See Harrison et al. (June 2011) *Applied Environ. Microbiol.* 77:3916-22. pJG153 can be modified with routine skill to comprise and express a nucleic acid encoding an endoprotease.

A nucleic acid encoding an endoprotease can be operably linked to a suitable promoter, which allows transcription in the host cell. The promoter may be any DNA sequence that shows transcriptional activity in the host cell of choice and may be derived from genes encoding proteins either homologous or heterologous to the host cell. Exemplary promoters for directing the transcription of the DNA sequence encoding an endoprotease, especially in a bacterial host, are the promoter of the lac operon of *E. coli*, the *Streptomyces coelicolor* agarase gene dagA or celA promoters, the promoters of the *Bacillus licheniformis* α-amylase gene (amyL), the promoters of the *Bacillus stearothermophilus* maltogenic amylase gene (amyM), the promoters of the *Bacillus amyloliquefaciens* α-amylase (amyQ), the promoters of the *Bacillus subtilis* xy1A and xy1B genes etc. For transcription in a fungal host, examples of useful promoters are those derived from the gene encoding *Aspergillus oryzae* TAKA amylase, *Rhizomucor miehei* aspartic proteinase, *Aspergillus niger* neutral α-amylase, *A. niger* acid stable α-amylase, *A. niger* glucoamylase, *Rhizomucor miehei* lipase, *A. oryzae* alkaline protease, *A. oryzae* triose phosphate isomerase, or *A. nidulans* acetamidase. When a gene encoding an endoprotease is expressed in a bacterial species such as *E. coli*, a suitable promoter can be selected, for example, from a bacteriophage promoter including a T7 promoter and a phage lambda promoter. Examples of suitable promoters for the expression in a yeast species include but are not limited to the Gal 1 and Gal 10 promoters of *Saccharomyces cerevisiae* and the *Pichia pastoris* AOX1 or AOX2 promoters. cbh1 is an endogenous, inducible promoter from *T. reesei*. See Liu et al. (2008) "Improved heterologous gene expression in *Trichoderma reesei* by cellobiohydrolase I gene (cbh1) promoter optimization," *Acta Biochim. Biophys. Sin* (*Shanghai*) 40(2): 158-65.

The coding sequence can be operably linked to a signal sequence. The DNA encoding the signal sequence may be the DNA sequence naturally associated with the endoprotease gene to be expressed or from a different Genus or species. A signal sequence and a promoter sequence comprising a DNA construct or vector can be introduced into a fungal host cell and can be derived from the same source. For example, the signal sequence is the cbh1 signal sequence that is operably linked to a cbh1 promoter.

An expression vector may also comprise a suitable transcription terminator and, in eukaryotes, polyadenylation sequences operably linked to the DNA sequence encoding a variant endoprotease. Termination and polyadenylation sequences may suitably be derived from the same sources as the promoter.

The vector may further comprise a DNA sequence enabling the vector to replicate in the host cell. Examples of such sequences are the origins of replication of plasmids pUC19, pACYC177, PUB110, pE194, pAMB1, and pIJ702.

The vector may also comprise a selectable marker, e.g., a gene the product of which complements a defect in the isolated host cell, such as the dal genes from *B. subtilis* or *B. licheniformis*, or a gene that confers antibiotic resistance such as, e.g., ampicillin, kanamycin, chloramphenicol or tetracycline resistance. Furthermore, the vector may comprise *Aspergillus* selection markers such as amdS, argB, niaD and xxsC, a marker giving rise to hygromycin resistance, or the selection may be accomplished by co-transformation, such as known in the art.

Transformation and Culture of Host Cells

An isolated cell, either comprising a DNA construct or an expression vector, is advantageously used as a host cell in the recombinant production of an endoprotease. The cell may be transformed with the DNA construct encoding the enzyme, conveniently by integrating the DNA construct (in one or more copies) in the host chromosome. This integration is generally considered to be an advantage, as the DNA sequence is more likely to be stably maintained in the cell. Integration of the DNA constructs into the host chromosome may be performed according to conventional methods, e.g., by homologous or heterologous recombination. Alternatively, the cell may be transformed with an expression vector as described above in connection with the different types of host cells.

A suitable yeast host organism can be selected from the biotechnologically relevant yeasts species such as but not limited to yeast species such as *Pichia* sp., *Hansenula* sp., or *Kluyveromyces, Yarrowinia, Schizosaccharomyces* species or a species of *Saccharomyces*, including *Saccharomyces cerevisiae* or a species belonging to *Schizosaccharomyces* such as, for example, *S. pombe* species. A strain of the methylotrophic yeast species, *Pichia pastoris*, can be used as the host organism. Alternatively, the host organism can be a *Hansenula* species. Suitable host organisms among filamentous fungi include species of *Aspergillus*, e.g., *Aspergillus niger, Aspergillus oryzae, Aspergillus tubigensis, Aspergillus awamori*, or *Aspergillus nidulans*. Alternatively, strains of a *Fusarium* species, e.g., *Fusarium oxysporum* or of a *Rhizomucor* species such as *Rhizomucor miehei* can be used as the host organism. Other suitable strains include *Thermomyces* and *Mucor* species. In addition, *Trichoderma* sp. can be used as a host. A suitable procedure for transformation of *Aspergillus* host cells includes, for example, that described in EP 238023. An endoprotease expressed by a fungal host cell can be glycosylated, i.e., will comprise a glycosyl moiety. The glycosylation pattern can be the same or different as present in the wild type endoprotease. The type and/or degree of glycosylation may impart changes in enzymatic and/or biochemical properties.

It is advantageous to delete genes from expression hosts, where the gene deficiency can be cured by the transformed expression vector. Known methods may be used to obtain a fungal host cell having one or more inactivated genes. Gene inactivation may be accomplished by complete or partial deletion, by insertional inactivation or by any other means that renders a gene nonfunctional for its intended purpose, such that the gene is prevented from expression of a functional protein. Any gene from a *Trichoderma* sp. or other filamentous fungal host that has been cloned can be deleted, for example, cbh1, cbh2, egl1, and egl2 genes. Gene deletion may be accomplished by inserting a form of the desired gene to be inactivated into a plasmid by methods known in the art.

Introduction of a DNA construct or vector into a host cell includes techniques such as transformation; electroporation; nuclear microinjection; transduction; transfection, e.g., lipofection mediated and DEAE-Dextrin mediated transfection; incubation with calcium phosphate DNA precipitate; high velocity bombardment with DNA-coated microprojectiles; and protoplast fusion. General transformation techniques are known in the art. See, e.g., Sambrook et al. (2001), supra. The expression of heterologous protein in *Trichoderma* is described, for example, in U.S. Pat. No. 6,022,725. Reference is also made to Cao et al. (2000) *Science* 9:991-1001 for transformation of *Aspergillus* strains. Genetically stable transformants can be constructed with vector systems whereby the nucleic acid encoding an endoprotease is stably integrated into a host cell chromosome. Transformants are then selected and purified by known techniques.

The preparation of *Trichoderma* sp. for transformation, for example, may involve the preparation of protoplasts from fungal mycelia. See Campbell et al. (1989) *Curr. Genet.* 16:53-56. The mycelia can be obtained from germinated vegetative spores. The mycelia are treated with an enzyme that digests the cell wall, resulting in protoplasts. The protoplasts are protected by the presence of an osmotic stabilizer in the suspending medium. These stabilizers include sorbitol, mannitol, potassium chloride, magnesium sulfate, and the like. Usually, the concentration of these stabilizers varies between 0.8 M and 1.2 M, e.g., a 1.2 M solution of sorbitol can be used in the suspension medium.

Uptake of DNA into the host *Trichoderma* sp. strain depends upon the calcium ion concentration. Generally, between about 10-50 mM $CaCl_2$ is used in an uptake solution. Additional suitable compounds include a buffering system, such as TE buffer (10 mM Tris, pH 7.4; 1 mM EDTA) or 10 mM MOPS, pH 6.0 and polyethylene glycol. The polyethylene glycol is believed to fuse the cell membranes, thus permitting the contents of the medium to be delivered into the cytoplasm of the *Trichoderma* sp. strain. This fusion frequently leaves multiple copies of the plasmid DNA integrated into the host chromosome.

Usually, transformation of *Trichoderma* sp. uses protoplasts or cells that have been subjected to a permeability treatment, typically at a density of $10^5$ to $10^7$/mL, particularly $2\times10^6$/mL. A volume of 100 μL of these protoplasts or cells in an appropriate solution (e.g., 1.2 M sorbitol and 50 mM $CaCl_2$) may be mixed with the desired DNA. Generally, a high concentration of PEG is added to the uptake solution. From 0.1 to 1 volume of 25% PEG 4000 can be added to the protoplast suspension; however, it is useful to add about 0.25 volumes to the protoplast suspension. Additives, such as dimethyl sulfoxide, heparin, spermidine, potassium chloride and the like, may also be added to the uptake solution to facilitate transformation. Similar procedures are available for other fungal host cells. See, e.g., U.S. Pat. No. 6,022,725.

Expression

A method of producing an endoprotease may comprise cultivating a host cell as described above under conditions conducive to the production of the enzyme and recovering the enzyme from the cells and/or culture medium.

The medium used to cultivate the cells may be any conventional medium suitable for growing the host cell in question and obtaining expression of an endoprotease. Suitable media and media components are available from commercial suppliers or may be prepared according to published recipes (e.g., as described in catalogues of the American Type Culture Collection).

An enzyme secreted from the host cells can be used in a whole broth preparation. In the present methods, the preparation of a spent whole fermentation broth of a recombinant microorganism can be achieved using any cultivation method known in the art resulting in the expression of an endoprotease. Fermentation may, therefore, be understood as comprising shake flask cultivation, small- or large-scale fermentation (including continuous, batch, fed-batch, or solid-state fermentations) in laboratory or industrial fermenters performed in a suitable medium and under conditions allowing the endoprotease to be expressed or isolated. The term "spent whole fermentation broth" is defined herein as unfractionated contents of fermentation material that includes culture medium, extracellular proteins (e.g., enzymes), and cellular biomass. It is understood that the term "spent whole fermentation broth" also encompasses cellular biomass that has been lysed or permeabilized using methods well known in the art.

An enzyme secreted from the host cells may conveniently be recovered from the culture medium by well-known procedures, including separating the cells from the medium by centrifugation or filtration, and precipitating proteinaceous components of the medium by means of a salt such as ammonium sulfate, followed by the use of chromatographic procedures such as ion exchange chromatography, affinity chromatography, or the like.

The polynucleotide encoding an endoprotease in a vector can be operably linked to a control sequence that can provide for the expression of the coding sequence by the host cell, i.e., the vector is an expression vector. The control sequences may be modified, for example by the addition of further transcriptional regulatory elements to make the level of transcription directed by the control sequences more responsive to transcriptional modulators. The control sequences may in particular comprise promoters.

Host cells may be cultured under suitable conditions that allow expression of an endoprotease. Expression of the enzymes may be constitutive such that they are continually produced, or inducible, requiring a stimulus to initiate expression. In the case of inducible expression, protein production can be initiated when required by, for example, addition of an inducer substance to the culture medium, for example dexamethasone or IPTG or Sophorose. Polypeptides can also be produced recombinantly in an in vitro cell-free system, such as the TNT™ (Promega) rabbit reticulocyte system.

An expression host also can be cultured in the appropriate medium for the host, under aerobic conditions. Shaking or a combination of agitation and aeration can be provided, with production occurring at the appropriate temperature for that host, e.g., from about 25° C. to about 75° C. (e.g., 30° C. to 45° C.), depending on the needs of the host and production of the desired endoprotease. Culturing can occur from about 12 to about 100 hours or greater (and any hour value there between, e.g., from 24 to 72 hours). Typically, the culture broth is at a pH of about 4.0 to about 8.0, again depending on the culture conditions needed for the host relative to production of an endoprotease.

Methods for Enriching and Purifying endoproteases

Fermentation, separation, and concentration techniques are well known in the art and conventional methods can be used to prepare an endoprotease polypeptide-containing solution.

After fermentation, a fermentation broth is obtained, the microbial cells and various suspended solids, including residual raw fermentation materials, are removed by conventional separation techniques to obtain an endoprotease solution. Filtration, centrifugation, microfiltration, rotary vacuum drum filtration, ultrafiltration, centrifugation followed by ultra-filtration, extraction, or chromatography, or the like, are generally used.

It is desirable to concentrate an endoprotease polypeptide-containing solution to optimize recovery. Use of unconcentrated solutions requires increased incubation time in order to collect the enriched or purified enzyme precipitate.

The enzyme containing solution is concentrated using conventional concentration techniques until the desired enzyme level is obtained. Concentration of the enzyme containing solution may be achieved by any of the techniques discussed herein. Exemplary methods of enrichment and purification include but are not limited to rotary vacuum filtration and/or ultrafiltration.

The enzyme solution is concentrated into a concentrated enzyme solution until the enzyme activity of the concentrated endoprotease polypeptide-containing solution is at a desired level.

Concentration may be performed using, e.g., a precipitation agent, such as a metal halide precipitation agent. Metal halide precipitation agents include but are not limited to alkali metal chlorides, alkali metal bromides and blends of two or more of these metal halides. Exemplary metal halides include sodium chloride, potassium chloride, sodium bromide, potassium bromide and blends of two or more of these metal halides. The metal halide precipitation agent, sodium chloride, can also be used as a preservative.

The metal halide precipitation agent is used in an amount effective to precipitate an endoprotease. The selection of at least an effective amount and an optimum amount of metal halide effective to cause precipitation of the enzyme, as well as the conditions of the precipitation for maximum recovery including incubation time, pH, temperature and concentration of enzyme, will be readily apparent to one of ordinary skill in the art, after routine testing.

Generally, at least about 5% w/v (weight/volume) to about 25% w/v of metal halide is added to the concentrated enzyme solution, and usually at least 8% w/v. Generally, no more than about 25% w/v of metal halide is added to the concentrated enzyme solution and usually no more than about 20% w/v. The optimal concentration of the metal halide precipitation agent will depend, among others, on the nature of the specific endoprotease polypeptide and on its concentration in the concentrated enzyme solution.

Another alternative way to precipitate the enzyme is to use organic compounds. Exemplary organic compound precipitating agents include: 4-hydroxybenzoic acid, alkali metal salts of 4-hydroxybenzoic acid, alkyl esters of 4-hydroxybenzoic acid, and blends of two or more of these organic compounds. The addition of the organic compound precipitation agents can take place prior to, simultaneously with or subsequent to the addition of the metal halide precipitation agent, and the addition of both precipitation agents, organic compound and metal halide, may be carried out sequentially or simultaneously.

Generally, the organic precipitation agents are selected from the group consisting of alkali metal salts of 4-hydroxybenzoic acid, such as sodium or potassium salts, and linear or branched alkyl esters of 4-hydroxybenzoic acid, wherein the alkyl group contains from 1 to 12 carbon atoms, and blends of two or more of these organic compounds. The organic compound precipitation agents can be, for example, linear or branched alkyl esters of 4-hydroxybenzoic acid, wherein the alkyl group contains from 1 to 10 carbon atoms, and blends of two or more of these organic compounds. Exemplary organic compounds are linear alkyl esters of 4-hydroxybenzoic acid, wherein the alkyl group contains from 1 to 6 carbon atoms, and blends of two or more of these organic compounds. Methyl esters of 4-hydroxybenzoic acid, propyl esters of 4-hydroxybenzoic acid, butyl ester of 4-hydroxybenzoic acid, ethyl ester of 4-hydroxybenzoic acid and blends of two or more of these organic compounds can also be used. Additional organic compounds also include but are not limited to 4-hydroxybenzoic acid methyl ester (named methyl PARABEN), 4-hydroxybenzoic acid propyl ester (named propyl PARABEN), which also are both preservative agents. For further descriptions, see, e.g., U.S. Pat. No. 5,281,526.

Addition of the organic compound precipitation agent provides the advantage of high flexibility of the precipitation conditions with respect to pH, temperature, endoprotease concentration, precipitation agent concentration, and time of incubation.

The organic compound precipitation agent is used in an amount effective to improve precipitation of the enzyme by means of the metal halide precipitation agent. The selection of at least an effective amount and an optimum amount of organic compound precipitation agent, as well as the conditions of the precipitation for maximum recovery including incubation time, pH, temperature and concentration of enzyme, will be readily apparent to one of ordinary skill in the art, in light of the present disclosure, after routine testing.

Generally, at least about 0.01% w/v of organic compound precipitation agent is added to the concentrated enzyme solution and usually at least about 0.02% w/v. Generally, no more than about 0.3% w/v of organic compound precipitation agent is added to the concentrated enzyme solution and usually no more than about 0.2% w/v.

The concentrated polypeptide solution, containing the metal halide precipitation agent, and the organic compound precipitation agent, can be adjusted to a pH, which will, of necessity, depend on the enzyme to be enriched or purified. Generally, the pH is adjusted at a level near the isoelectric point of the endoprotease. The pH can be adjusted at a pH in a range from about 2.5 pH units below the isoelectric point (pI) up to about 2.5 pH units above the isoelectric point.

The incubation time necessary to obtain an enriched or purified enzyme precipitate depends on the nature of the specific enzyme, the concentration of enzyme, and the specific precipitation agent(s) and its (their) concentration. Generally, the time effective to precipitate the enzyme is between about 1 to about 30 hours; usually it does not exceed about 25 hours. In the presence of the organic compound precipitation agent, the time of incubation can still be reduced to less about 10 hours and in most cases even about 6 hours.

Generally, the temperature during incubation is between about 4° C. and about 50° C. Usually, the method is carried out at a temperature between about 10° C. and about 45° C. (e.g., between about 20° C. and about 40° C.). The optimal temperature for inducing precipitation varies according to the solution conditions and the enzyme or precipitation agent(s) used.

The overall recovery of enriched or purified enzyme precipitate, and the efficiency with which the process is conducted, is improved by agitating the solution comprising the enzyme, the added metal halide and the added organic compound. The agitation step is done both during addition of the metal halide and the organic compound, and during the subsequent incubation period. Suitable agitation methods include mechanical stirring or shaking, vigorous aeration, or any similar technique.

After the incubation period, the enriched or purified enzyme is then separated from the dissociated pigment and other impurities and collected by conventional separation techniques, such as filtration, centrifugation, microfiltration, rotary vacuum filtration, ultrafiltration, press filtration, cross membrane microfiltration, cross flow membrane microfiltration, or the like. Further enrichment or purification of the enzyme precipitate can be obtained by washing the precipitate with water. For example, the enriched or purified enzyme precipitate is washed with water containing the metal halide precipitation agent, or with water containing the metal halide and the organic compound precipitation agents.

During fermentation, an endoprotease polypeptide accumulates in the culture broth. For the isolation, enrichment, or purification of the desired endoprotease, the culture broth is centrifuged or filtered to eliminate cells, and the resulting cell-free liquid is used for enzyme enrichment or purification. In one embodiment, the cell-free broth is subjected to salting out using ammonium sulfate at about 70% saturation; the 70% saturation-precipitation fraction is then dissolved in a buffer and applied to a column such as a Sephadex G-100 column, and eluted to recover the enzyme-active fraction. For further enrichment or purification, a conventional procedure such as ion exchange chromatography may be used.

Enriched or purified enzymes can be made into a final product that is either liquid (solution, slurry) or solid (granular, powder).

DETAILED DESCRIPTION OF THE PREFERRED EMBODIMENTS

In accordance with an aspect of the present invention, a method for the reduction or prevention of haze in a beverage is presented having the step of adding an endoprotease to the beverage, wherein the endoprotease is an enzyme having at least 75, 80, 85, 90, 95, 98, 99 or 100% sequence identity to SEQ ID NO:1, SEQ ID NO:2, SEQ ID NO:3, SEQ ID NO:4 or SEQ ID NO:16 or an endoprotease active fragment thereof such as a mature protein.

Preferably, the endoprotease active fragment is a mature protein. Preferably, the beverage contains proteins. Preferably, the beverage contains polyphenols. Preferably, the beverage is a beer. Preferably, the beverage is a wine. Preferably, the beverage is a fruit juice.

Preferably, the endoprotease is added to a wort. Preferably, the endoprotease is added to a beer after haze has been formed. Preferably, the endoprotease is added to a beer before haze has been formed.

Preferably, the beer has an increased relative foam stability and an increased relative haze reduction. Preferably, the increased relative foam stability is above 100, 101, 102, 103, 104, 105, 106, 107, 108, 109 or 110%. Preferably, the increased relative haze reduction is above 73%, 74%, 75%, 76%, 77%, 78%, 79%, 80% as measured by 90° scattering.

Preferably, the endoprotease is present in the wort in an amount of 4 to 300 mg protease/hL wort, preferably 10 to 250 mg protease/hL wort, preferably 20 to 200 mg protease/hL wort, preferably 30 to 150 mg protease/hL wort or preferably 40 to 100 mg protease/hL wort.

Preferably, the method has the further step of adding one or more of an ALDC enzyme, a glucoamylase, a maltogenic alpha-amylase, a pullulanase, a catalase or a transglucosidase.

Preferably, the ALDC enzyme is an acetolactate decarboxylase as set forth in EC 4.1.1.5. Preferably, the glucoamylase is a 1,4-alpha-glucosidase as set forth in EC 3.2.1.3. Preferably, the maltogenic alpha amylase is a glucan 1,4-alpha-maltohydrolase as set forth in EC 3.3.1.133. Preferably, the pullulanase is an alpha-dextrin endo-1,6-alpha-glucosidase, limit dextrinase, amylopectin 6-glucanohydrolase, debranching enzyme as set forth in EC 3.2.1.41. Preferably, the transglucosidase is 1,4-alpha-glucan-branching enzyme, Oligoglucan-branching glucosyltransferse as set forth in EC 2.4.1.24.

In another aspect of the present invention, a method is presented for increasing relative foam stability in a beer having the step of adding an endoprotease to the beverage, wherein the endoprotease is an enzyme having at least 75, 80, 85, 90, 95, 98, 99 or 100% sequence identity to SEQ ID NO:1, SEQ ID NO:2, SEQ ID NO:3, SEQ ID NO:4 or SEQ ID NO:16 or an endoprotease active fragment thereof such as a mature protein.

Preferably, the increased relative foam stability is above 100, 101, 102, 103, 104, 105, 106, 107, 108, 109 or 110%. Preferably, the endoprotease active fragment is a mature protein.

Preferably, the endoprotease is added to a wort. Preferably, the endoprotease is added to a beer after haze has been formed. Preferably, the endoprotease is added to a beer before haze has been formed.

Preferably, the endoprotease is present in the wort in an amount of 4 to 300 mg protease/hL wort, preferably 10 to 250 mg protease/hL wort, preferably 20 to 200 mg protease/hL wort, preferably 30 to 150 mg protease/hL wort or preferably 40 to 100 mg protease/hL wort.

Preferably, the method has the further step of adding one or more of an ALDC enzyme, a glucoamylase, a maltogenic alpha-amylase, a pullulanase, a catalase or a transglucosidase.

Preferably, the ALDC enzyme is an acetolactate decarboxylase as set forth in EC 4.1.1.5. Preferably, the glucoamylase is a 1,4-alpha-glucosidase as set forth in EC 3.2.1.3. Preferably, the maltogenic alpha amylase is a glucan 1,4-alpha-maltohydrolase as set forth in EC 3.3.1.133. Preferably, the pullulanase is an alpha-dextrin endo-1,6-alpha-glucosidase, limit dextrinase, amylopectin 6-glucanohydrolase, debranching enzyme as set forth in EC 3.2.1.41. Preferably, the transglucosidase is 1,4-alpha-glucan-branching enzyme, Oligoglucan-branching glucosyltransferse as set forth in EC 2.4.1.24.

Preferably, the beer has an increased relative foam stability and an increased relative haze reduction. Preferably, the increased relative haze reduction is above 73%, 74%, 75%, 76%, 77%, 78%, 79%, 80% as measured by 90° scattering.

In another aspect of the present invention, an isolated polypeptide is presented comprising an endoprotease wherein said endoprotease is an enzyme having at least 75, 80, 85, 90, 95, 98, 99 or 100% sequence identity to SEQ ID NO:1, SEQ ID NO:2, SEQ ID NO:3, SEQ ID NO:4 or SEQ ID NO:16 or an endoprotease active fragment thereof.

In another aspect of the present invention, an isolated polynucleotide is presented having a nucleic acid sequence which encodes the above polypeptide.

In another aspect of the present invention, a nucleic acid construct is presented having the above polynucleotide operably linked to one or more control sequences that direct the production of the polypeptide in a suitable expression host.

In another aspect of the present invention, a recombinant expression vector is presented having the above nucleic acid construct.

In another aspect of the present invention, a recombinant host cell is presented having the above nucleic acid construct or the above vector.

In another aspect of the present invention, a method for producing the above polypeptide of is presented having the step of cultivating of the above recombinant host cell, to produce a supernatant and/or cells having the polypeptide; and recovering the polypeptide.

In another aspect of the present invention, a polypeptide is presented produced by the above method.

In another aspect of the present invention, a use of a filtrate obtained from a fermentation broth obtained by the above method in the prevention or reduction of haze in a beverage is presented.

In another aspect of the present invention, a composition having a polypeptide, isolated polynucleotide, nucleic acid construct, recombinant expression vector, or recombinant host cell as described above is presented.

In another aspect of the present invention, use of a polypeptide, isolated polynucleotide, nucleic acid construct, recombinant expression vector, or recombinant host cell as described above for increasing relative foam stability in a beverage is presented.

In another aspect of the present invention, use of a polypeptide, isolated polynucleotide, nucleic acid construct, recombinant expression vector, or recombinant host cell as described above for increasing relative haze reduction in a beverage is presented.

In another aspect of the present invention, a method for reducing haze in a beverage having the step of adding to the beverage a glutamine endoprotease wherein the beverage has a protein or peptide having a glutamine residue which is cut by the protease thereby reducing haze is presented. Preferably, the glutamine endoprotease also cuts at proline residues. Preferably, the beverage is fruit juice, wine, or beer. More preferably, the beverage is beer.

Preferably, the glutamine endoprotease comprises a polypeptide having at least 80, 85, 90, 95, 98, or 99% homology to SEQ ID NO:2 or SEQ ID NO:16 or an endoprotease active fragment thereof such as a mature protein lacking the signal sequence. More preferably, the glutamine endoprotease comprises a polypeptide according to SEQ ID NO:16.

EXAMPLES

The present disclosure is described in further detail in the following examples, which are not in any way intended to limit the scope of the disclosure as claimed. The attached figures are meant to be considered as integral parts of the specification and description of the disclosure. The following examples are offered to illustrate, but not to limit the claimed disclosure.

Example 1

As an example of a commercial sample of proline-specific endoprotease from *Aspergillus niger* (AnPro), Brewers Clarex™ (5 PPU/g product) from DSM was used. The defined activity of the proline specific endoprotease (PEP) is based on hydrolysis of the synthetic peptide Z-Gly-Pro-pNA at 37° C. in a citrate/disodium phosphate buffer pH 4.6. The reaction product is monitored spectro-photometrically at 405 nm and one unit (1 PPU) is defined as the quantity of enzyme that liberates 1 mmol of p-nitroanilide per minute under these test conditions.

Example 2

Cloning of *Aspergillus Homomorphus* CBS 101889 Protease AhoPro3 (CRC21077-WT)

*Aspergillus homomorphus* CBS 101889 was selected as a potential source of enzymes which may be useful in various industrial applications. One of the genes identified in *Aspergillus homomorphus* CBS 101889, named AhoPro3 (CRC21077-WT), encodes a protein with homology to a protease as determined from a BLAST search (Altschul et al., J Mol Biol, 215: 403-410, 1990). The protein encoded by the AhoPro3 gene is shown in SEQ ID NO:4 (NCBI Reference Sequence: XP_025547970.1). At the N-terminus, the protein has a signal peptide with a length of 22 amino acids as predicted by SignalP version 4.0 (Nordahl Petersen et al. (2011) Nature Methods, 8:785-786). The presence of a signal sequence suggests that AhoPro3 is a secreted enzyme.

Example 3

Cloning of *Aspergillus transmontanensis* CBS 130015 Protease AtrPro1 (CRC21068-WT)

*Aspergillus transmontanensis* CBS 130015 was selected as a potential source of enzymes which may be useful in various industrial applications. One of the genes identified in *Aspergillus transmontanensis* CBS 130015, named AtrPro1 (CRC21068-WT), encodes a protein with homology to a protease as determined from a BLAST search (Altschul et al., J Mol Biol, 215: 403-410, 1990). The protein encoded by the AtrPro1 gene is shown in SEQ ID NO:3 (JGI Reference Sequence: Asptra1_564990). At the N-terminus, the protein has a signal peptide with a length of 22 amino acids as predicted by SignalP version 4.0 (Nordahl Petersen et al. (2011) Nature Methods, 8:785-786). The presence of a signal sequence suggests that AtrPro1 is a secreted enzyme.

Example 4

Cloning of *Aspergillus bertholletius* IBT 29228 Protease AbePro2 (CRC21079-WT)

*Aspergillus bertholletius* IBT 29228 was selected as a potential source of enzymes which may be useful in various industrial applications. One of the genes identified in *Aspergillus bertholletius* IBT 29228, named AbePro2 (CRC21079-WT), encodes a protein with homology to a protease as determined from a BLAST search (Altschul et al., J Mol Biol, 215:403-410, 1990). The protein encoded by the AbePro2 gene is shown in SEQ ID NO:1 (JGI Reference Sequence: Aspber1_278881). At the N-terminus, the protein has a signal peptide with a length of 22 amino acids as predicted by SignalP version 4.0 (Nordahl Petersen et al. (2011) Nature Methods, 8:785-786). The presence of a signal sequence suggests that AbePro2 is a secreted enzyme.

Example 5

Cloning of *Aspergillus niger* ATCC 1015 Protease AniPro_2 (CRC02753-WT)

*Aspergillus niger* ATCC 1015 was selected as a potential source of enzymes which may be useful in various industrial applications. One of the genes identified in *Aspergillus niger* ATCC 1015, named AniPro_2 (CRC02753-WT), encodes a protein with homology to a protease as determined from a BLAST search (Altschul et al., J Mol Biol, 215:403-410, 1990). The protein encoded by the AniPro_2 gene is shown in SEQ ID NO:2 (JGI Reference Sequence: Aspni5_52703). At the N-terminus, the protease protein has a signal peptide with a length of 21 amino acids as predicted by SignalP version 4.0 (Nordahl Petersen et al. (2011) Nature Methods, 8:785-786) and derived from a *Hypocrea jecorina* aspartate protease (uniport id. GOR8T0). The presence of a signal sequence indicates that AniPro_2 is a secreted enzyme.

Example 6

Expression, Fermentation, Purification, and Identification of AhoPro3, AtrPro1, AbePro2 and AniPro_2

DNA sequences encoding AhoPro3, AtrPro1, AbePro2 or AniPro_2, were chemically synthesized and inserted into a *Trichoderma reesei* expression vector pGXT (the same as the pTTTpyr2 vector as described in published PCT Application WO2015/017256, incorporated by reference herein) by Generay (Shanghai, China). The resulting plasmids were labeled as pGXT-AhoPro3, pGXT-AtrPro1, pGXT-AbePro2 or pGXT-AniPro2, respectively.

Each individual expression plasmid was then transformed into a suitable *Trichoderma reesei* strain (described in published PCT application WO 05/001036) using protoplast transformation (Te'o et al. (2002) J. Microbiol. Methods 51:393-99). Transformants were selected on a medium containing acetamide as a sole source of nitrogen. After 5 days of growth on acetamide plates, transformants were collected and subjected to fermentation via the DASGIP (Eppendorf, Juelich, Germany).

To initiate the fermentation of AhoPro3, AtrPro1, AbePro2 or AniPro_2, seed culture was grown in 1 L shake flask, each contained 100 mL defined medium (pH 5.5 before sterilization) that is consisted of 50 g/L glucose monohydrate, 6 g/L glycine, 5 g/L $(NH_4)_2SO_4$, 4.5 g/L $KH_2PO_4$, 1 g/L $CaCl_2 \cdot 2H_2O$, 1 g/L $MgSO_4 \cdot 7H_2O$, 2 g/L Mazu 6000K and 2.5 mL 400×*T. reesei* Trace Metals (400× Trace Metals stock (~pH 1) contains 175 g/L $C_6H_8O_7 \cdot H_2O$, 200 g/L $FcSO_4 \cdot 7H_2O$, 16 g/L $ZnSO_4 \cdot 7H_2O$, 3.2 g/L $CuSO_4 \cdot 5H_2O$, 1.4 g/L $MnSO_4 \cdot H_2O$, and 0.8 g/L $H_3BO_3$). The seed culture was shaken for 48 hours at 250 rpm and 30° C. Following completion of this incubation, 200 mL of seed culture was transferred to the 2-L bioreactor (DASGIP).

The medium for fermentation in the 2-L bioreactor (DASGIP) contains 60 g/L dextrose, 6 g/L glycine, 1 g/L $CaCl_2 \cdot 2H_2O$, 4.5 g/L $KH_2PO_4$, 4 g/L $(NH_4)_2SO_4$, 1 g/L $MgSO_4 \cdot 7H_2O$, 1.2 g/L Mazu 6000K and 2.5 ml 400×*T. reesei* Trace Metals. An induction solution containing 250 g glucose/sophorose per kg was prepared and sterilized.

Following inoculation, batch fermentation was initiated with working volume of 1 L and was controlled at pH 3.5 and 34° C. Dissolved oxygen level was controlled above 35% by adjusting airflow rate, oxygen supply, and agitation during whole fermentation process. At the elapsed fermentation time of 22 hours, the glucose in broth was depleted, and the feed of 250 g (glucose/sophorose)/kg solution was started at this time. Stepwise feed rates of 4 mL feed/hr. and 6 mL feed/hr. were applied in the time intervals of 22-46 hours and 46-72 hours, respectively. Accompanying the start of fed-batch phase, pH was linearly changed to 4.0, and temperature was adjusted to 28° C. Fermentation was completed after 72 hours run, and broth was harvested by centrifugation, filtered, and subsequently concentrated.

To purify AhoPro3, the crude from 1 L Dasgip fermenter was concentrated using a VivaFlow 200 ultra-filtration device (Sartorius Stedium) and added ammonium sulfate to the final concentration of 1 M. The solution was loaded onto a HiPrep™ Phenyl FF column pre-equilibrated with 20 mM NaAc (pH 5.0) supplemented with additional 1 M ammonium sulfate. The target protein was eluted from the column with 0.25 M ammonium sulfate. The resulting active protein fractions were then pooled and concentrated via the 10K Amicon Ultra devices and stored in 40% glycerol at −20° C. until usage.

To purify AtrPro1 and AbePro2, the crude from 1 L Dasgip fermenter was concentrated and added ammonium sulfate to the final concentration of 1 M. The solution was loaded onto a HiPrep™ Phenyl FF 16/10 column pre-equilibrated with 20 mM NaAc (pH5.0) supplemented with additional 1 M ammonium sulfate. The target protein was eluted from the column with 0.5 M ammonium sulfate. The resulting active protein fractions were then pooled, concentrated, and exchanged buffer into 20 mM NaAc (pH 5.0), 150 mM NaCl via the 10K Amicon Ultra devices, then stored in 40% glycerol at −20° C. until usage.

To purify AniPro_2, the crude from 1 L Dasgip fermenter was concentrated and added ammonium sulfate to the final concentration of 1 M. The solution was loaded onto a HiPrep™ Phenyl FF 16/10 column pre-equilibrated with 20 mM NaAc (pH 5.0) supplemented with additional 1 M ammonium sulfate (Buffer A). The target protein was eluted from the column with 0.75 M ammonium sulfate. The corresponding fractions were pooled, concentrated, and exchanged buffer into 20 mM NaPi (pH7.0) (Buffer B), using a VivaFlow 200 ultra-filtration device (Sartorius Stedim). The resulting solution was applied to a HiLoad™ Q FF 16/10 column pre-equilibrated with Buffer B. The target protein was eluted from the column with 0.3 M NaCl. The fractions containing active protein were pooled, concentrated, and exchanged buffer into 20 mM NaAc (pH 5.0), 150 mM NaCl via the 10K Amicon Ultra devices, then stored in 40% glycerol at −20° C. until usage.

Surprisingly, AniPro_2 was found proteolytically modified in the final broth at the end of fermentation as compared to the precursor variant shown in SEQ ID NO:2 and the predicted mature form of this sequence. The variant generated was verified using mass spectrometry as described in detail below. Thus, the final expressed variant was further processed in the N-terminus as compared to the predicted 21 amino acids cleavage by SignalP version 4.0, resulting in a final N-terminal truncation of 36 amino acids corresponding to a mature version of AniPro_2 having the polypeptide sequence of SEQ ID NO:16 as shown in FIG. 23. This mature variant of AniPro_2 has been used in all examples discussed herein.

To derive the exact polypeptide sequence of the mature variant of AniPro_2, the protein band of the protein was cut from an SDS-PAGE gel and digested using three different enzymes (Trypsin, A-Chymotrypsin and Glu-C) to prepare the sample for mass spectrometry analysis. Trypsin hydrolyzes peptide bonds specifically at the carboxyl side of arginine I and lysine (K) residues except when a proline (P) is on the carboxyl side. A-Chymotrypsin hydrolyzes peptide bonds specifically at the carboxyl side of tyrosine (Y), phenylalanine (F), tryptophan (W) and leucine (L) except when a proline (P) is on the carboxyl side. Glu-C preferentially cleaves at the carboxyl side of glutamyl (E) in ammonium bicarbonate buffer pH 8, but also cleaves at the carboxyl side of aspartyl (D) if the hydrolysis is carried out in a phosphate buffer pH 8.

To detect the exact C-terminal, the protein of interest was prepared for analysis using IFF procedure for protein characterization (A2963), with one change using 40% $^{18}$O-water in the digestion buffer. The proteolytic cleavage will hereby incorporate both $^{18}$O-water and $^{16}$O-water in the resulting peptides, which consequently will appear as doublets in MS spectra. The protein C-terminal though will only appear as a single peptide with $^{16}$O-water since it is not cleaved but just the "last peptide" left of the protein. In this way the C-terminal is mapped using MS/MS analysis. To detect the exact protein N-terminal, the intact protein is labeled with acetylation of the N-terminal before proteolytic digestion (IFF A-manual 3448). Guanidination of lysine converts lysine to homoarginine and protects lysine (side chain) from being acetylated. Only the peptide originating from the protein N-terminal will be acetylated and hereby unambiguously identified.

Example 7

Proteolytic Activity of AhoPro3, AtrPro1, AbePro2 and AniPro_2

The proteolytic activity of purified AhoPro3, AtrPro1, AbePro2 or AniPro_2, was measured in 25 mM citrate/phosphate buffer (pH 5), using Ala-Ala-Ala-Pro-paranitroanilide (AAAP-pNA) (synthesized by GL Biochem, Shanghai, China) as the substrate. Prior to the reaction, the enzyme was diluted with water to specific concentrations. The AAAP-pNA substrate was dissolved in 100% Dimethylsulfoxide (DMSO) to a final concentration of 10 mM. To initiate the reaction, 5 µL of substrate was mixed with 85 µL of citrate/phosphate buffer in a non-binding 96-well Microtiter Plate (96-MTP) (Corning Life Sciences, #3641), and after 5 min pre-incubation at 37° C. in a Thermomixer (Eppendorf), 10 µl of properly diluted purified enzyme (or water as the blank) was added. After sealing the 96-MTP, the reaction was carried out in a Thermomixer at 37° C. and 650 rpm for 10 min, and the absorbance of the resulting solution was measured at 405 nm (A405) using a SpectraMax 190. Net A405 was calculated by subtracting the A405 of the blank control from that of enzyme, and then plotted against different protein concentrations. Each value was the mean of duplicate assays. The proteolytic activity is shown as Net A405. The proteolytic assay with AAAP-pNA as the substrate indicates that AhoPro3, AtrPro1, AbePro2 and AniPro_2 are all active proteases.

Example 8 pH Profile of AhoPro3, AtrPro1, AbePro2 and AniPro_2

With AAAP-pNA as the substrate, the pH profile of AhoPro3, AtrPro1, AbcPro2 or AniPro_2 was studied in 25 mM NaAc/Glycine/HEPES buffer with different pH values ranging from 3 to 10. To initiate the assay, 85 µl of NaAc/Glycine/HEPES buffer with a specific pH was first mixed with 5 µl of 10 mM AAAP-pNA in a 96-MTP and pre-incubated at 37° C. for 5 min, followed by the addition of 10 µl of water diluted enzyme (25 ppm for AhoPro3 and AtrPro1; 100 ppm for AbePro2 and AniPro_2) or water (the blank control). The reaction was performed and analyzed as described in Example 7. Enzyme activity as each pH was reported as the relatively activity, where the activity at the optimal pH was set to be 100%. The pH vales tested were 3, 4, 5, 6, 7, 8, 9, and 10. Each value was the mean of triplicate assays. It was determined that AhoPro3, AtrPro1, AbePro2 and AniPro_2 are all acidic proteases.

Example 9

Temperature Profile of AhoPro3, AtrPro1, AbePro2 and AniPro_2

The temperature profile of AhoPro3, AtrPro1, AbePro2 or AniPro_2 was analyzed in 25 mM citrate/phosphate buffer (pH 5) using AAAP-pNA as the substrate. The enzyme sample and AAAP-pNA substrate were prepared as in Example 7. Prior to the reaction, 85 µl of citrate/phosphate buffer and 5 µl of 10 mM AAAP-pNA were mixed in a 200 µl PCR tube, which was then incubated in a Peltier Thermal Cycler (BioRad) at desired temperatures (i.e., 30~80° C.) for 5 min. After the incubation, 10 µl of diluted enzyme (25 ppm for AhoPro3 and AtrPro1; 100 ppm for AbePro2 and AniPro_2) or water (the blank control) was added to the solution, and the reaction was carried out in the Peltier Thermal Cycle for 10 min at different temperatures. Subsequent absorbance measurements were performed as in Example 7. The activity was reported as the relative activity, where the activity at the optimal temperature was set to be 100%. Each value was the mean of triplicate assays. The data suggests that the optimal temperatures for AhoPro3, AtrPro1, AbePro2 and AniPro_2 are 60, 57, 53 and 64° C., respectively.

Example 10

Thermostability of AhoPro3, AtrPro1, AbePro2 and AniPro_2

A thermostability analysis of AhoPro3, AtrPro1, AbePro2 or AniPro_2 was performed using 50 mM acetate/phosphate buffer (pH 4.5) as the incubation buffer, and with AAAP-pNA as the substrate for remaining activity measurement. The purified AhoPro3, AtrPro1, AbePro2 or AniPro_2 (or purified AnPro (Brewer's Clarex™) as the benchmark) was diluted in 1 mL incubation buffer to a final concentration of 1 mg/mL and subsequently incubated at 65° C. for 0, 10, 20, 30, 45 or 60 min. At the end of each incubation period, 100 µL of the enzyme-buffer mixture was transferred to a 96-MTP placed on ice. After the completion of the entire incubation, the enzyme-buffer mixture was further diluted with buffer to reach specific enzyme concentration for downstream activity assay (25 ppm for AhoPro3 and AtrPro1; 100 ppm for AbePro2 and AniPro_2). Activity was measured as in Example 7. The activity was reported as the relative activity, where the activity at 0 min incubation time was set to be 100%; and each value was the mean of triplicate assays. As shown in Table 2, AhoPro3, AtrPro1 and AbePro2 completely lost their activities after 10 min incubation at 65° C., while AniPro_2 can still retain ~64% of its activity after 1 hr. incubation.

TABLE 2

Thermostability of AhoPro3, AtrPro1, AbePro2 or AniPro_2 at 65° C.

| Time (min) | Relative activity (%) | | | | |
|---|---|---|---|---|---|
| | AhoPro3 | AtrPro1 | AbePro2 | AniPro_2 | AnPro |
| 0 | 100.00 | 100.00 | 100.00 | 100.00 | 100.00 |
| 10 | 0.78 | 1.09 | 1.10 | 87.01 | 45.27 |
| 20 | 0.16 | 0.67 | 0.73 | 81.88 | 26.51 |
| 30 | 0.13 | 0.47 | 0.62 | 75.55 | 15.37 |
| 45 | 0.13 | 0.50 | 0.49 | 67.41 | 6.81 |
| 60 | 0.12 | 0.38 | 0.41 | 63.54 | 3.78 |

Example 11

Haze Reduction Performance of AhoPro3, AtrPro1, AbePro2 and AniPro_2

Figure 6:
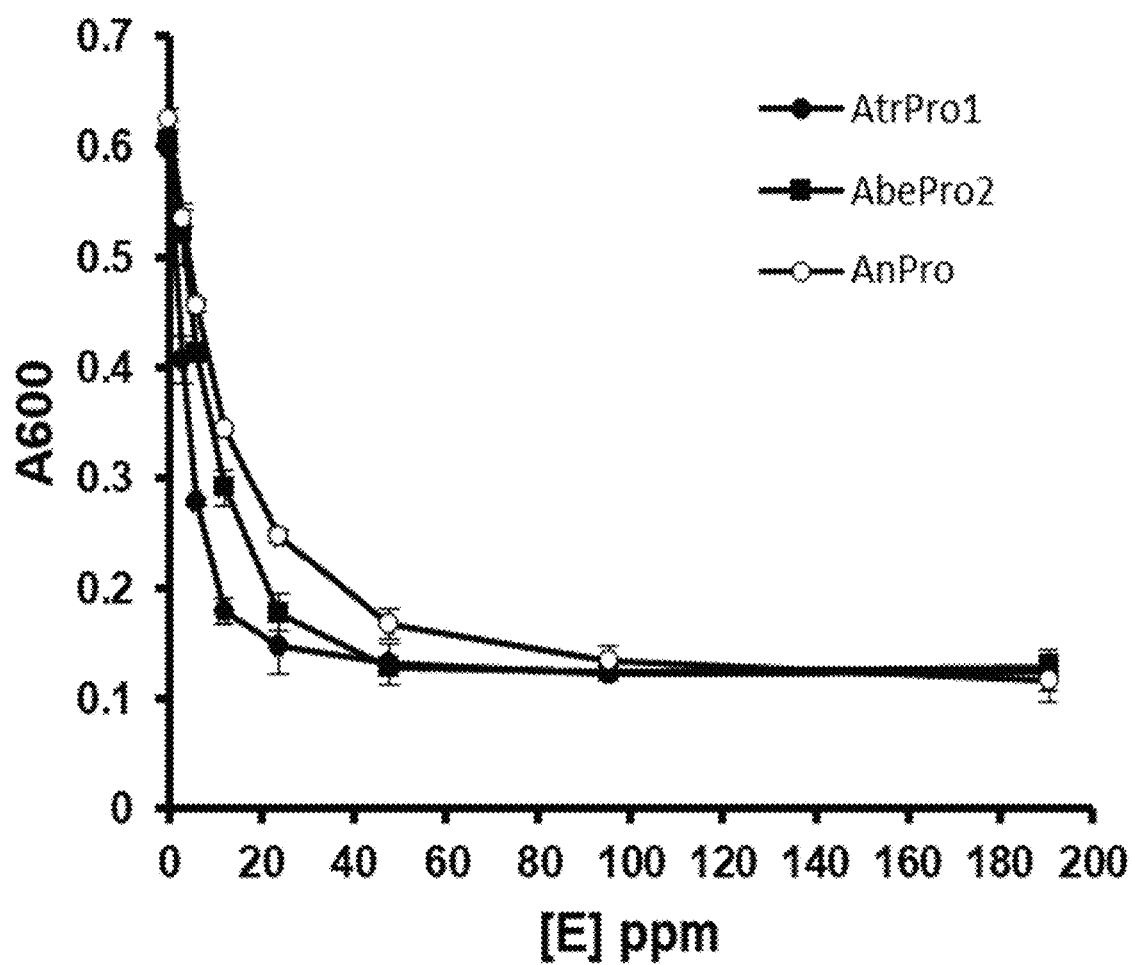
FIG. 6 shows haze reduction performance of purified AtrPro1, AbePro2 and AnPro shown as OD600 in response to enzyme concentrations of 3 to 190 ppm.
Figure 7:
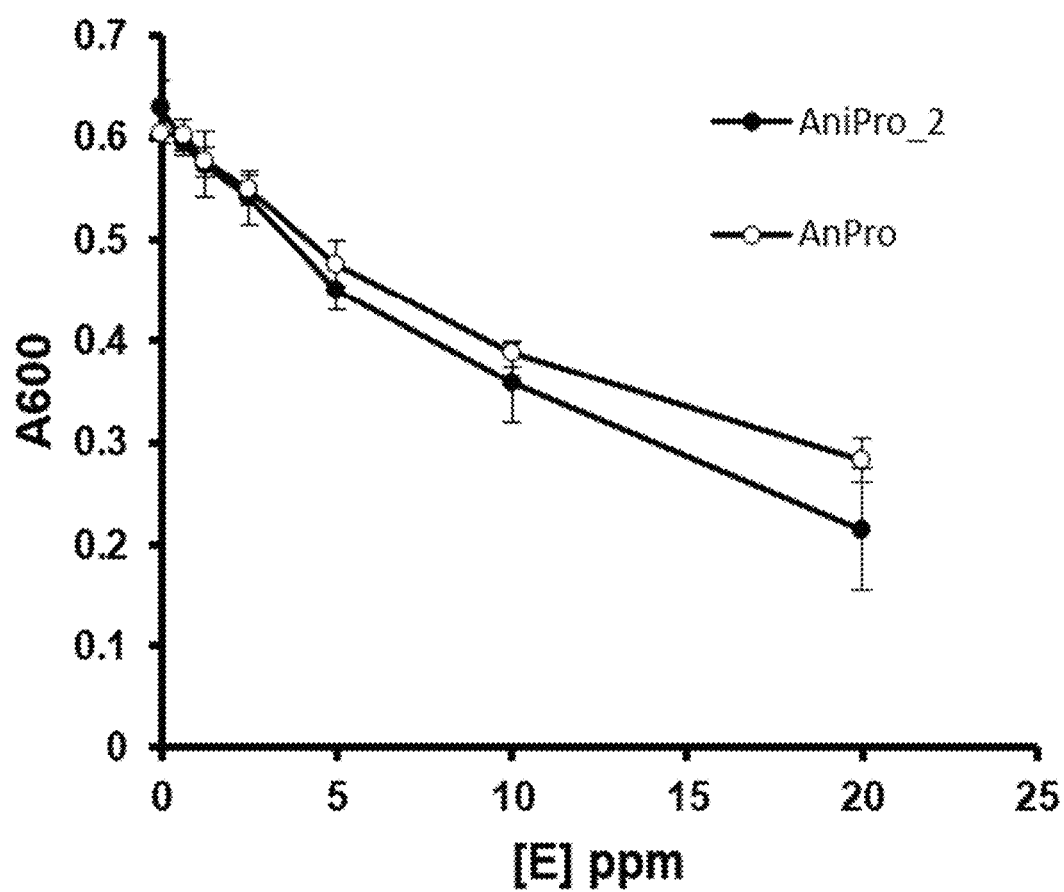
FIG. 7 shows haze reduction performance of purified AniPro_2 and AnPro shown as OD600 in response to enzyme concentrations of 0.625 to 20 ppm.

The haze reduction performance of AhoPro3, AtrPro1, AbePro2 or AniPro_2 was evaluated using the gliadin-catechin assay. Prior to the reaction, the enzyme was diluted with water to specific concentrations. The gliadin substrate (Sigma, Cat. No. G3375) was dissolved in 20 mM acetate/phosphate buffer (pH 4.5) supplemented with additional 0.2% ethanol to a final concentration of 2 mg/mL and the catechin substrate (Sigma, Cat. No. C1251) was dissolved in 20 mM citrate/phosphate buffer (pH 4.5) supplemented with additional 0.2% ethanol to a final concentration of 2 mg/mL. To initiate the assay, 100 µL of gliadin solution was mixed with 5 µL of properly diluted AhoPro3, AtrPro1, AbePro2 or AniPro_2 (or purified AnPro (Brewer's Clarex™) as the benchmark) in a 96-MTP; and after 90 min incubation at 45° C. in a Thermomixer, the resulting 96-MTP was then placed on ice for 5 min, followed by the addition of 100 µl catechin solution. Haze was developed at room temperature for 30 min. The absorbance of the developed haze at 600 nm (A600) was measured using a SpectraMax 190 and subsequently plotted against different enzyme concentrations. Each value was the mean of triplicate assays. As shown in FIGS. 5, 6 and 7, AhoPro3, AtrPro1, AbePro2 or AniPro_2 is more effective in reducing the gliadin-catechin haze, when compared to the benchmark.

Example 12

Protein Determination Methods
Protein Determination by Stain Free Imager Criterion Protein was quantified by SDS-PAGE gel and densitometry using Gel Doc™ EZ imaging system. Reagents used in the assay: Concentrated (2×) Laemmli Sample Buffer (Bio-Rad, well-PCR plate 50 µL diluted enzyme sample were mixed with 50 µL sample buffer containing 2.7 mg DTT. The plate was sealed by Microseal 'B' Film from Bio-Rad and was placed into PCR machine to be heated to 70° C. for 10 minutes. After that the chamber was filled by running buffer, gel cassette was set. Then 10 µL of each sample and standard (0.125-1.00 mg/mL BSA) was loaded on the gel and 5 µL of the markers were loaded. After that the electrophoresis was run at 200 V for 45 min. Following electrophoresis, the gel was rinsed 3 times 5 min in water, then stained in Safe-stain overnight and finally distained in water. Then the gel was transferred to Imager. Image Lab software was used for calculation of intensity of each band. A calibration curve was made using BSA (Thermo Scientific, Catalogue #23208) and the amount of the target protein was determined by the band intensity and calibration curve. The protein quantification method was employed to prepare enzyme samples of used in subsequent Examples. The protease protein concentration of: A purified AhoPro3 sample was determined to 8.1 mg/ml, a purified AbePro2 sample was determined to 2.3 mg/ml, a purified AtrPro1 sample was determined to 8.2 mg/ml, a purified AniPro_2 sample was determined to 2.4 mg/ml and a sample of AnPro was determined to 41 mg/ml.

Example 13

Haze Reduction Performance of Protease From *Aspergillus homomorphus* in Haze Sensitive Beers
Haze Sensitive Beer Substrate For testing the performance of proteases bottled beer was used as substrate. The beer brewed at a 2 hL pilot plant brewery was filtered (no silica or PVPP applied) but unstabilized all malt pilsner type beer with approximately 66% RDF and alcohol content of 4.7% (v/v). Beer filtration was done with a kieselguhr filter having 8 plates and with precoating and body feed as described in table 3. After kieselguhr filtration the beer went through a 1.2 µm membrane filter followed by a 0.45 µm membrane filter.

TABLE 3

Preparation for kieselguhr filtration with a flow of 160 l/hr.

| | Cellulose | Kieselguhr coarse | Kieselguhr fine | Silica Gel | |
|---|---|---|---|---|---|
| 1$^{st}$ precoating | 80 | 400 | | | 8 plates |
| 2$^{nd}$ precoating | | 200 | 200 | 0 | 8 plates |
| Body feed/hl | | 150 | 300 | 0 | 8 plates |
| Pall SeitzSchenk | FH 150 | Super 1200 | Extra 70 | BK 3800 X Silica | |

Incubation and Pasteurization

The enzymes were applied to the bottled beer by opening the capsule adding the enzyme solution and the bottle was re-closed immediately with a new capsule. Control beer samples were prepared similarly with the addition of milliQ water (ddH$_2$O) in the same amount as the enzyme solution. The enzymes were applied in a low and high dosage based on ppm protease as given in table 4 below.

TABLE 4

Protease addition in haze sensitive Beers.

| | Low dose ppm | High dose ppm | Low dose µL sample | High dose µL diluted enzyme |
|---|---|---|---|---|
| AnPro | 0.205 | 0.82 | 21 | 83 |
| AhoPro3 | 0.205 | 0.82 | 21 | 83 |
| No enzyme (reference) | 0 | 0 | 21 (ddH$_2$O) | 83 (ddH$_2$O) |

The beer samples were stored at 14° C. for 5 days for allowing the enzyme to work. Hereafter the samples were pasteurized to approximately 30 PU in a water bath, by heating up the temperature to 63° C. (60 minutes) and holding the temperature at 63° C. for 60 minutes where after the heat supply was turned off and the temperature dropped to room temperature (approximately 20° C.).
Evaluation of Haze Potential in the Beer Samples The prediction of haze development in the beer samples was evaluated by the forced haze method based on the EBC Analytica method 9.30 "Prediction of shelf-life of beer", in the following referred to as the EBC TOHA forced haze method. Instrument calibration was performed according to instruction given by supplier and the result of the haze measurement was expressed in EBC units.
Forced Haze, EBC TOHA Method The turbidity of beer was measured using Sigrist Labscat2. The turbidity (S90/S0 EBC) was measured at a 90° scatter angle to detect the presence of small particles and turbidity measured at 25° scatter angle was included as additional information on larger particles. Before subjecting the bottled samples to an alternating cooling and heating cycle, the turbidity was measured at 20° C., termed Blind Value.

The samples were then placed in a thermostatic water bath (Julabo, Germany), and the temperature was decreased to 0° C. and kept for 24 hours. The turbidity was measured at 0° C. and was termed Initial Total Haze.

The beer samples were replaced in the thermostatic water bath and the temperature was increased to 60° C. which was kept for 48 hours followed by a decrease in temperature to 0° C. which was kept for 24 hours. The turbidity was measured at 0° C. and was termed Final Total Haze. The results are shown in table 5.

It clearly seen from both the measured Initial and Final Total Haze that both endoproteases greatly reduced turbidity of the beer as compared to the references without protease. It's also clear that both the low and high dose respectively, resulted in surprisingly significant increased turbidity reduction at the Final Total Haze of AhoPro3 as compared to AnPro. This was observed for turbidity measured at both 90° and 25° scattering (small and larger particles).

TABLE 5

The turbidity (EBC 90° and 25°) of beer with and without protease added. Forced Haze was measured according to EBC TOHA method and Blind value, Initial Total haze and Final Total haze are shown. Standard deviation was determined from 2 determinations.

| | 20° C. Day 0 Blind Value | | | |
|---|---|---|---|---|
| | Average 90° EBC | Std. 90° EBC | Average 25° EBC | Std. 25° EBC |
| No enzyme (21 µL) | 3.00 | 0.06 | 0.53 | 0.01 |
| No enzyme (83 µL) | 2.88 | 0.00 | 0.51 | 0.01 |

TABLE 5-continued

The turbidity (EBC 90° and 25°) of beer with and without protease added. Forced Haze was measured according to EBC TOHA method and Blind value, Initial Total haze and Final Total haze are shown. Standard deviation was determined from 2 determinations.

| | | | | |
|---|---|---|---|---|
| AnPro Low Dose | 2.95 | 0.02 | 0.49 | 0.01 |
| AnPro_High dose | 2.88 | 0.01 | 0.49 | 0.00 |
| AhoPro3_Low dose | 2.87 | 0.00 | 0.50 | 0.01 |
| AhoPro3_High dose | 3.05 | 0.03 | 0.53 | 0.02 |

0° C. Day 1 Initial Total Haze

| | Average 90° EBC | Std. 90 EBC | Average 25° EBC | Std. 25° EBC |
|---|---|---|---|---|
| No enzyme (21 µL) | 6.16 | 0.04 | 5.62 | 0.02 |
| No enzyme (83 µL) | 5.51 | 0.01 | 5.60 | 0.02 |
| AnPro_Low Dose | 4.38 | 0.01 | 0.79 | 0.02 |
| AnPro_High dose | 4.47 | 0.04 | 0.83 | 0.01 |
| AhoPro3_Low dose | 4.22 | 0.09 | 0.77 | 0.00 |
| AhoPro3_High dose | 4.73 | 0.02 | 0.87 | 0.01 |

0° C. End 5 Days Final Total Haze

| | Average 90° EBC | Std. 90° EBC | Average 25° EBC | Std. 25° EBC |
|---|---|---|---|---|
| No enzyme (21 µL) | 9.22 | 0.08 | 8.79 | 0.03 |
| No enzyme (83 µL) | 8.78 | 0.01 | 8.32 | 0.00 |
| AnPro_Low Dose | 5.34 | 0.05 | 1.07 | 0.04 |
| AnPro_High dose | 5.66 | 0.07 | 1.16 | 0.01 |
| AhoPro3_Low dose | 5.25 | 0.04 | 1.04 | 0.02 |
| AhoPro3_High dose | 5.26 | 0.04 | 1.10 | 0.03 |

Example 14

Haze Formation in Beer Produced With Various Endoproteases During Beer Fermentation At a 2 hL semi-industrial pilot Brewery pure malt wort was produced with the same mashing protocol. A Pilsner malt (Fuglsang, Denmark. Batch 21.08.2020) was used and milled before mashing-in with standard settings and applied at an initial 2.8:1 water to Grist ratio. CaCl$_2$ content in water was adjusted to 40 ppm and pH adjusted to 5.5 with 90% lactic acid. LAMINEX® MaxFlow 4G (Dupont Nutrition Bioscience, Denmark) was added at a dosage of 0.10 kg/t malt. The following mashing protocol was applied: Mashing in at 63° C. for 25 minutes; kept at 63° C. for 45 minutes; increased to 72° C. for 9 minutes (1° C./minute); kept at 72° C. for 20 minutes; increased to 78° C. for 6 minutes (1° C./minute) and kept at 78° C. for 10 minutes in mashing off. An iodine negative test was performed at 72° C. of the wort to ensure iodine negative. Water was added during transfer of mash from mash kettle to lauter tun to leave a final Water to Grist ratio of 3.2:1.

Conditions used during lautering with regard to water added, volume collected and speed of flow for the HGB is shown in table 6 below.

TABLE 6

Lautering conditions.

| | water added, L | Volume L | Speed |
|---|---|---|---|
| Re-circulation | 0 | 0 | 80 |
| First wort | 0 | 120 | 80 |
| 1st sparging | 30 | 150 | 80 |
| 2nd sparging | 30 | 180 | 90 |

TABLE 6-continued

Lautering conditions.

| | water added, L | Volume L | Speed |
|---|---|---|---|
| 3rd sparging | 30 | 210 | 100 |
| 4th sparging | 25 | 240 | 120 |

Wort boiling: Wort was boiled for 80 minutes with 10% evaporation per hour to reach 16.0° P. Hops were added to reach 20 BU in final brewed beer consisting of 50% CO$_2$ extracted hops (St. Johann, Hallertauer Germany) and 50% hops with standard polyphenol content (P90 hops) (St. Johann, Hallertauer Germany). At end of boiling wort pH was adjusted to 5.2 with 90% lactic acid. The wort was split into two fermenters of 100 L and 0.10 ppm Zn$^{2+}$ was added as ZnCl$_2$ to the whirlpool. Original Extract (OE) of the wort samples after mashing was measured using an Anton Paar (DMA 5000) according to Dupont Standard Instruction Brewing, 23.8580-B09 and shown to be similar for all experiments. In addition, the content of Free Alpha-Amino Nitrogen (mg/liter) was measured in the wort following Dupont Standard Instruction Brewing, 23.8580-B15 and was similar for all experiments.

Fermentation: All experiments were done at a standard oxygen concentration of 13-16 ppm in the wort. Pitching wort pH was adjusted to 5.00±0.05 with acetic acid. Brewer's yeast was used. Pitching rate: 25-30 mill. cells/ml. The fermentation was followed by a cold maturation/stabilization and subsequent filtration. The temperature was set for 12° C. in main fermentation, 15° C. for maturation, cool to 1° C. when end fermented. The enzymes were applied in based on mg protease (Pro) per hL as given in table 7 below.

TABLE 7

Enzyme addition in fermentation tank.

| | Dosage mg Pro/hL |
|---|---|
| AnPro | 82 |
| AniPro_2 | 82 |
| AhoPro3 | 57 |
| MorPro1 (low) | 82 |
| MorPro1 (high) | 164 |
| No enzyme | — |

Beer filtration: 8 plates were applied and flow of 160 l/hr. maintained with the following amounts of filter aids used as given in table 8. A yeast cell count was done before filtration.

TABLE 8

Preparation for kieselguhr filtration with a flow of 160 l/hr.

| | Cellulose | Kieselguhr coarse | Kieselguhr fine | Silica Gel | |
|---|---|---|---|---|---|
| 1$^{st}$ precoating | 80 | 400 | | | 8 plates |
| 2$^{nd}$ precoating | | 200 | 200 | 0 | 8 plates |
| body feel/hl | | 150 | 300 | 0 | 8 plates |
| Pall SeitzSchenk | FH 1500 | Super 1200 | Extra 70 | BK 3800 X Silica | |

The complete amount of filtered beer was bottled in 33 cL bottles and all bottles were pasteurized at 62° C. for 20 minutes (appr. 30 PU). The turbidity of beer samples was measured using Sigrist Labscat2. The turbidity (S90/S0

EBC) was measured at a 90° scatter angle to detect the presence of small particles and turbidity measured at 25° scatter angle was included as additional information on larger particles. Before subjecting the bottled samples to an alternating cooling and heating cycle, the turbidity was measured at 20° C., termed Blind Value.

The samples were then placed in a thermostatic water bath (Julabo, Germany), and the temperature was decreased to 0° C. and kept for 24 hours. The turbidity was measured at 0° C. and was termed Initial Total Haze. The beer samples were replaced in the thermostatic water bath and the temperature was increased to 60° C. which was kept for 48 hours followed by a decrease in temperature to 0° C. which was kept for 24 hours. The turbidity was measured at 0° C. and was termed Final Total Haze. The results are shown in table 9.

TABLE 9

The turbidity (EBC 90° and 25°) of beer produced with various proteases added. Forced Haze was measured according to EBC TOHA method and Blind value, Initial Total haze and Final Total haze are shown. Standard deviation (Std.) was determined from 2 determinations.

| | 20° C. Day 0 Blind Value | | | |
|---|---|---|---|---|
| | Average 90° EBC | Std. 90° EBC | Average 25° EBC | Std. 25° EBC |
| AnPro | 0.70 | 0.01 | 0.14 | 0.01 |
| AniPro_2 | 0.56 | 0.01 | 0.18 | 0.02 |
| AhoPro3 | 0.65 | 0.01 | 0.16 | 0.01 |
| MorPro1 (low) | 1.41 | 0.03 | 0.43 | 0.02 |
| MorPro1 (high) | 0.46 | 0.02 | 0.17 | 0.03 |
| no enzyme | 1.39 | 0.02 | 0.27 | 0.01 |
| | 0° C. Day 1 Initial Total Haze | | | |
| | Average 90° EBC | Std. 90° EBC | Average 25° EBC | Std. 25° EBC |
| AnPro | 1.49 | 0.02 | 1.20 | 0.02 |
| AniPro_2 | 0.81 | 0.04 | 0.26 | 0.05 |
| AhoPro3 | 0.89 | 0.01 | 0.25 | 0.01 |
| MorPro1 (low) | 2.18 | 0.06 | 0.72 | 0.05 |
| MorPro1 (high) | 1.75 | 0.03 | 1.30 | 0.07 |
| no enzyme | 3.27 | 0.03 | 7.24 | 0.05 |
| | 0° C. End 5 Days Final Total Haze | | | |
| | Average 90° EBC | Std. 90° EBC | Average 25° EBC | Std. 25° EBC |
| AnPro | 4.49 | 0.03 | 4.95 | 0.11 |
| AniPro_2 | 1.89 | 0.04 | 0.77 | 0.04 |
| AhoPro3 | 1.63 | 0.06 | 0.53 | 0.13 |
| MorPro1 (low) | 5.20 | 0.10 | 1.71 | 0.08 |
| c | 6.17 | 0.12 | 3.65 | 0.11 |
| no enzyme | 13.78 | 0.60 | 30.91 | 0.83 |

It is clearly seen from all turbidity measurements: Blind, Initial and Final Total Haze that all proteases greatly reduced turbidity of the beer as compared to the beer reference without protease. It's also clear that addition of AhoPro3 and AniPro_2, both resulted in significant increased reduction of turbidity as determined by all haze values (including Final Total Haze) and compared to AnPro. This was observed for turbidity measured at both 90° and 25° scattering (small and larger particles).

The relative haze reduction may be calculated against the beer without any enzyme as follows: $(EBC_{Turbidity\ 90/25°\ no\ enzyme} - EBC_{Turbidity\ 90/25°\ with\ enzyme})/EBC_{Turbidity\ 90/25°\ no\ enzyme} \times 100\%$ and is shown in table 10 below for AnPro, AhoPro3 and AniPro_2. It is observed that both AhoPro3 and AniPro_2 enable a superior relative haze reduction as compared to AnPro and MorPro1 above 37 to 67% (measured by 90° EBC) and above 84 to 94% (measured by 25° EBC).

TABLE 10

The relative haze reduction calculated against no enzyme addition on turbidity (EBC 90° and 25°) and given in percent.

| | Relative Haze reduction against no enzyme and given in % | |
|---|---|---|
| | 90° EBC | 25° EBC |
| AnPro | 67 | 84 |
| MorPro1 (low) | 44 | 88 |
| MorPro1 (high) | 37 | 94 |
| AhoPro3 | 88 | 98 |
| AniPro_2 | 86 | 98 |

In addition, accelerated aging of beer samples in bottles was performed by storage at elevated temperature according to MEBAK—Analytica (Method 2.14.2.1. Forciermethode, in Mitteleuropäische Brautechnische Analysen Methoden), commonly utilized in the brewing industry. The turbidity (S90/S0 EBC) was measured at a 90° scatter angle to detect the presence of small particles and turbidity measured at 25° scatter angle was included as additional information on larger particles using Sigrist Labscat2. Before subjecting the bottled samples to an alternating cooling and heating cycle, the turbidity was measured at 20° C., termed Blind Value.

The samples were then placed in a thermostatic water bath (Julabo, Germany), and the temperature was increased to 40° C. and kept for 24 hours and followingly decreased to 0° C. and kept for 24 hours. The turbidity was measured at 0° C. and was termed Total Haze. This cycle was repeated and Δ Haze was calculated as Haze after cycle (n), e.g. (Total haze)-(Blind value).

The results are shown in table 11. It's clearly seen from all turbidity measurements: Blind and Total Haze by cycle 1 and 2, that all proteases greatly reduced turbidity of the beer as compared to the beer reference without protease. Again, it's also clear that addition of either AhoPro3 or AniPro_2. surprisingly resulted in significant higher turbidity reduction as measured by all haze values including Final Total Haze and compared to AnPro.

TABLE 11

The turbidity (EBC 90° and 25°) of beer produced with various protease added. Forced Haze was measured according to MEBAK method and Blind value and Total haze are calculated from cycle 1 and 2. Standard deviation (Std.) was determined from 2 determinations.

| | Day 0-20° C. Blind Value | | | |
|---|---|---|---|---|
| | Average 90° EBC | Std. 90° EBC | Average 25° EBC | Std. 25° EBC |
| AnPro | 0.68 | 0.02 | 0.13 | 0.01 |
| AniPro_2 | 0.55 | 0.01 | 0.13 | 0.01 |
| AhoPro3 | 0.65 | 0.03 | 0.14 | 0.00 |
| no enzyme | 1.38 | 0.03 | 0.25 | 0.00 |

TABLE 11-continued

The turbidity (EBC 90° and 25°) of beer produced with various protease added. Forced Haze was measured according to MEBAK method and Blind value and Total haze are calculated from cycle 1 and 2. Standard deviation (Std.) was determined from 2 determinations.

| | Day 2-0° C. ☐haze - cycle 1 | | | |
|---|---|---|---|---|
| | Average 90° EBC | Std. 90 EBC | Average 25° EBC | Std. 25° EBC |
| AnPro | 2.47 | 0.38 | 3.23 | 0.53 |
| AniPro_2 | 0.97 | 0.04 | 0.30 | 0.05 |
| AhoPro3 | 1.20 | 0.09 | 0.40 | 0.04 |
| no enzyme | 11.25 | 0.47 | 27.62 | 1.16 |

| | Day 4-0° C. ☐haze - cycle 2 | | | |
|---|---|---|---|---|
| | Average 90° EBC | Std. 90° EBC | Average 25° EBC | Std. 25° EBC |
| AnPro | 2.53 | 0.58 | 3.24 | 1.00 |
| AniPro_2 | 0.99 | 0.01 | 0.28 | 0.00 |
| AhoPro3 | 1.17 | 0.16 | 0.32 | 0.08 |
| no enzyme | 9.33 | 0.60 | 23.08 | 1.74 |

Like the EBC TOHA test the relative haze reduction may be calculated against the beer without any enzyme from MEBAK test (cycle 2 value) as follows: $(EBC_{Turbidity\ 90/25°\ no\ enzyme} - EBC_{Turbidity\ 90/25°\ with\ enzyme})/EBC_{Turbidity\ 90/25°\ no\ enzyme} \times 100\%$ and is shown in table 12 below for AnPro, AhoPro3 and AniPro_2. It is observed that both AhoPro3 and AniPro_2 enable a superior relative haze reduction as compared to AnPro above 73% (measured by 90° EBC) and above 86% (measured by 90° EBC).

TABLE 12

The relative haze reduction calculated against no enzyme addition on turbidity (EBC 90° and 25°) and given in percent.

| | Relative Haze reduction vs. no enzyme and given in % | |
|---|---|---|
| | 90° EBC | 25° EBC |
| AnPro | 73 | 86 |
| AhoPro3 | 89 | 99 |
| AniPro_2 | 87 | 99 |

Example 15

Foam Stability in Beer Produced With Endoprotease During Fermentation

Beer was produced at a semi-industrial pilot brewery, as described in example 14 with the addition of proteases: AnPro, AniPro_2 and AhoPro3 in the start of the beer fermentation process as described in example 14. Proteases may most unwanted potentially degrade various foam stabilizing proteins during the production of the beer depending on the substrate specificity of the given protease. Thus, foam stability of the beers produced with proteases: AnPro, AhoPro3 were compared to similar beer without addition of any enzyme during fermentation. Foam stability of beers where determination using the NIBEM-T meter (using Haffmans Nibem Foam Stability Tester from Pentair) and according to the EBC Analytica method 9.42.1 "Foam stability of beer using the NIBEM-T meter—2004".

Bottled beer was attemperated to 20° C.±0.5° C. in a water bath. The beer was dispensed through a foam flashing device in which beer was forced under carbon dioxide pressure at approximately 2 bar through an orifice to a thoroughly cleaned standard glass with inside diameter 60±1.2 mm, inside height 120±1.9 mm. This produced a standard glass of beer/foam.

The standard glass of beer/foam was placed under the needle electrode system of the calibrated NIBEM-T meter, so the reference position corresponded to a brim-full glass.

The electrode moved down until one of the four outer needles was touching the surface of the foam. As the foam collapsed the contact was broken and the electrode system moved down until one of the four outer needles again was touching the foam surface. When the foam had collapsed to below the reference position, the timing started and the time for the foam to collapse a further set distance of 30 mm was measured. The collapse time, in seconds, was determined and is shown in table 13 below. It's clear that the beer foam stability was improved by addition of the AhoPro3 or AniPro_2 when compared to AnPro, showing similar stability as no enzyme control beer. Surprisingly, the foam stability was significant improved by addition of the AhoPro3 or AniPro_2 when compared to no enzyme control beer.

TABLE 13

The NIBEM foam stability of beer produced with various proteases added.

| | Nibem Beer Foam stability | | | | | |
|---|---|---|---|---|---|---|
| | 1. measurement (sec.) | temp. (° C.) | 2. measurement (sec.) | temp. (° C.) | Foam stability Average (sec.) | Std |
| AnPro | 221 | 23 | 215 | 22 | 218 | 4.2 |
| AniPro_2 | 227 | 22 | 221 | 23 | 224 | 3.0 |
| AhoPro3 | 228 | 23 | 222 | 23 | 225 | 4.2 |
| no enzyme | 218 | 23 | 219 | 23 | 219 | 0.7 |

The relative foam stability may be calculated against the beer without any enzyme from NIBEM foam test (30 mm) as follows: (Collapse time$_{NIBEM\ 30\ mm\ with\ enzyme}$)/(Collapse time$_{NIBEM\ 30\ mm\ without\ enzyme}$)×100% and is shown in table 14 below for AnPro, AhoPro3 and AniPro_2. It is observed that both AhoPro3 and AniPro_2 enable an increased foam stabilization as compared to AnPro and above 99.5%.

TABLE 14

The relative foam stability (NIBEM-30 mm) calculated against no enzyme addition and given in percent.

| | Relative Foam stability vs. no enzyme and given in % |
|---|---|
| AnPro | 99.5 |
| AhoPro3 | 102.7 |
| AniPro_2 | 102.3 |

Example 16

Haze Reduction Performance of Protease From *Aspergillus bertholletius, Aspergillus transmontanensis* and *Aspergillus niger* in Haze Sensitive Beers.

Testing the performance of proteases was performed as described in example 13 using bottled haze sensitive beers.

The enzymes were applied to the bottled beer by opening the capsule adding the enzyme solution and the bottle was re-closed immediately with a new capsule. Control beer samples were prepared similarly with the addition of milliQ water (ddH$_2$O) in the same amount as the enzyme solution. The enzymes from *Aspergillus bertholletius* (AbePro2), *Aspergillus transmontanensis* (AtrPro1), *Aspergillus niger* (AniPro_2) or AnPro were applied in a low and high dosage based on ppm protease as given in table 15 below.

TABLE 15

Enzyme addition in haze sensitive Beers.

| | Low dose ppm | High dose ppm | Low dose μL sample | High dose μL diluted enzyme |
|---|---|---|---|---|
| AnPro | 0.205 | 0.82 | 21 | 83 |
| AniPro_2 | 0.205 | 0.82 | 17 | 68 |
| AbePro2 | 0.205 | 0.82 | 29 | 119 |
| AtrPro1 | 0.205 | 0.82 | 21 | 83 |
| No enzyme (reference) | 0 | 0 | 21 (ddH$_2$O) | ddH$_2$O |

The beer samples were stored at 14° C. for 5 days for allowing the enzyme to work. Hereafter the samples were pasteurized to approximately 30 PU in a water bath, by heating up the temperature to 63° C. (60 minutes) and holding the temperature at 63° C. for 60 minutes where after the heat supply was turned off and the temperature dropped to approximately 20° C. Evaluation of haze potential in the beers after enzyme treatment were done according to the EBC TOHA method described in example 13. The results are shown in table 16.

TABLE 16

The turbidity (EBC 90° and 25°) of beer with and without protease added. Forced Haze was measured according to EBC TOHA method and Blind value, Initial Total haze and Final Total haze are shown. Standard deviation (Std.) was determined from 2 determinations.

| | 20° C. Day 0 Blind Value | | | |
|---|---|---|---|---|
| | Average 90° EBC | Std. 90° EBC | Average 25° EBC | Std. 25° EBC |
| No enzyme (21 μL) | 3.00 | 0.06 | 0.53 | 0.01 |
| No enzyme (83 μL) | 2.88 | 0.00 | 0.51 | 0.01 |
| AnPro_Low Dose | 2.95 | 0.02 | 0.49 | 0.01 |
| AnPro_High dose | 2.88 | 0.01 | 0.49 | 0.00 |
| AniPro_2_Low Dose | 3.00 | 0.05 | 0.61 | 0.03 |
| AniPro_2_High dose | 3.03 | 0.03 | 0.56 | 0.01 |
| AbePro2_Low dose | 3.04 | 0.02 | 0.53 | 0.01 |
| AbePro2_High dose | 3.12 | 0.01 | 0.54 | 0.00 |
| AtrPro1_Low dose | 2.83 | 0.02 | 0.50 | 0.01 |
| AtrPro1_High dose | 2.83 | 0.02 | 0.49 | 0.01 |

| | 0° C. Day 1 Initial Total Haze | | | |
|---|---|---|---|---|
| | Average 90° EBC | Std. 90° EBC | Average 25° EBC | Std. 25° EBC |
| No enzyme (21 μL) | 6.16 | 0.04 | 5.62 | 0.02 |
| No enzyme (83 μL) | 5.51 | 0.01 | 5.60 | 0.02 |
| AnPro_Low Dose | 4.38 | 0.01 | 0.79 | 0.02 |
| AnPro_High dose | 4.47 | 0.04 | 0.83 | 0.01 |
| AniPro_2_Low Dose | 4.60 | 0.13 | 0.96 | 0.05 |
| AniPro_2_High dose | 4.87 | 0.07 | 1.01 | 0.06 |
| AbePro2_Low dose | 4.53 | 0.02 | 0.84 | 0.02 |
| AbePro2_High dose | 4.80 | 0.02 | 0.91 | 0.02 |
| AtrPro1_Low dose | 4.67 | 0.03 | 1.49 | 0.02 |
| AtrPro1_High dose | 4.21 | 0.01 | 0.79 | 0.02 |

| | 0° C. End 5 Days Final Total Haze | | | |
|---|---|---|---|---|
| | Average 90° EBC | Std. 90° EBC | Average 25° EBC | Std. 25° EBC |
| No enzyme (21 μL) | 9.22 | 0.08 | 8.79 | 0.03 |
| No enzyme (83 μL) | 8.78 | 0.01 | 8.32 | 0.00 |
| AnPro_Low Dose | 5.34 | 0.06 | 1.07 | 0.04 |
| AnPro_High dose | 5.66 | 0.07 | 1.16 | 0.01 |
| AniPro_2_Low Dose | 5.45 | 0.10 | 1.54 | 0.16 |
| AniPro_2_High dose | 5.65 | 0.07 | 1.38 | 0.02 |
| AbePro2_Low dose | 5.52 | 0.02 | 1.11 | 0.01 |
| AbePro2_High dose | 5.45 | 0.00 | 1.22 | 0.06 |
| AtrPro1_Low dose | 6.61 | 0.04 | 3.54 | 0.04 |
| AtrPro1_High dose | 5.07 | 0.04 | 1.02 | 0.03 |

It clearly seen from both the measured Initial and Final Total Haze that all proteases greatly reduced turbidity of the beer as compared to the references without protease. It's also clear that proteases from *Aspergillus bertholletius, Aspergillus transmontanensis* and *Aspergillus niger* (AniPro_2) at the high dose, all resulted in surprisingly significant increased turbidity reduction at the Final Total Haze, as compared to AnPro. This was observed for turbidity measured at 90° scattering (small particles).

Example 17

Foam Stability Over Shelf-Life in Beer Produced with Endoprotease During Fermentation Beer was produced at a semi-industrial pilot brewery, as described in example 14 with the addition of the proteases: AnPro and AniPro2 in the start of the beer fermentation process as described in example 14 using a dosage of 20.5 mg protease/hL wort. Proteases may potentially affect various foam stabilizing proteins during the production of the beer depending on the substrate specificity of the given protease. Thus, foam stability of the beers produced with proteases: AnPro and AniPro2 were compared to similar beer without addition of any enzyme during fermentation. Foam stability of beers were tested over the shelf-life of the beer (stored at 12-14° C. for up to 9 months) and determined using the NIBEM-T meter (using Haffmans Nibem Foam Stability Tester from Pentair) and according to the EBC Analytica method 9.42.1 "Foam stability of beer using the NIBEM-T meter—2004". The results are shown in table 17.

It's clear that the beer foam stability was improved by addition of AniPro_2 when compared to AnPro, showing similar stability as no enzyme control beer. Surprisingly, the foam stability was significant improved by addition of the AniPro_2 when compared to no enzyme control beer, as observed after 1 months of storage of the beer and even more clear after 9 months of storage.

TABLE 17

The NIBEM foam stability (measured at 19-22 C. °) of beer produced with various proteases added after 0-9 months.

0 month
Nibem Beer Foam stability

| | 1. measurement (sec.) | 2. measurement (sec.) | Foam stability Average (sec.) | Std |
|---|---|---|---|---|
| AnPro | 236 | 234 | 235 | 1 |
| AniPro_2 | 238 | 235 | 236.5 | 1.5 |
| no enzyme | 235 | 236 | 235.5 | 0.5 |

1 month
Nibem Beer Foam stability

| | 1. measurement (sec.) | 2. measurement (sec.) | Foam stability Average (sec.) | Std |
|---|---|---|---|---|
| AnPro | 224 | 226 | 225 | 1 |
| AniPro_2 | 234 | 232 | 233 | 1 |
| no enzyme | 231 | 233 | 232 | 1 |

2 months
Nibem Beer Foam stability

| | 1. measurement (sec.) | 2. measurement (sec.) | Foam stability Average (sec.) | Std |
|---|---|---|---|---|
| AnPro | 221 | 222 | 221.5 | 0.5 |
| AniPro_2 | 232 | 233 | 232.5 | 0.5 |
| enzyme | 221 | 220 | 220.5 | 0.5 |

9 months
Nibem Beer Foam stability

| | 1. measurement (sec.) | 2. measurement (sec.) | Foam stability Average (sec.) | Std |
|---|---|---|---|---|
| AnPro | 216 | 217 | 216.5 | 0.5 |
| AniPro_2 | 234 | 229 | 231.5 | 2.5 |
| no enzyme | 216 | 217 | 216.5 | 0.5 |

The relative foam stability was be calculated after 9 months against the beer without any enzyme from NIBEM foam test (30 mm) as follows: (Collapse time$_{NIBEM\ 30\ mm\ with\ enzyme}$)/(Collapse time$_{NIBEM\ 30\ mm\ without\ enzyme}$)×100% and is shown in table 18 below for AnPro and AniPro_2. It can be observed that AniPro_2 enable an increased foam stabilization as compared to AnPro and above 100.0%. Thus, the addition of AniPro_2 surprisingly increases stability of foam.

TABLE 18

The relative foam stability (NIBEM-30 mm) calculated against no enzyme addition and given in percent.

| | Relative Foam stability vs. no enzyme and given in % |
|---|---|
| AnPro | 100.0 |
| AniPro_2 | 106.9 |

Example 18

Cloning of *Aspergillus pseudocaelatus* CBS 117616 Protease ApsPro1 (CRC21071-WT)

*Aspergillus pseudocaclatus* CBS 117616 was selected as a potential source of enzymes which may be useful in various industrial applications. One of the genes identified in *Aspergillus pseudocaclatus* CBS 117616, named ApsPro1 (CRC21071-WT), encodes a protein with homology to a protease as determined from a BLAST search (Altschul et al., J Mol Biol, 215: 403-410, 1990). The protein encoded by the ApsPro1 gene is shown in SEQ ID NO:5 (JGI Reference Sequence: Asppsec1_294119). At the N-terminus, the protein has a signal peptide with a length of 22 amino acids as predicted by SignalP version 4.0 (Nordahl Petersen et al. (2011) Nature Methods, 8:785-786). The presence of a signal sequence suggests that ApsPro1 is a secreted enzyme.

Example 19

Cloning of *Aspergillus neoauricomus* CBS 112787 Protease AnePro2 (CRC21072-WT)

*Aspergillus neoauricomus* CBS 112787 was selected as a potential source of enzymes which may be useful in various industrial applications. One of the genes identified in *Aspergillus neoauricomus* CBS 112787, named AnePro2 (CRC21072-WT), encodes a protein with homology to a protease as determined from a BLAST search (Altschul et al., J Mol Biol, 215:403-410, 1990). The protein encoded by the AnePro2 gene is shown in SEQ ID NO:6 (JGI Reference Sequence: Aspneoa1_131875). At the N-terminus, the protein has a signal peptide with a length of 22 amino acids as predicted by SignalP version 4.0 (Nordahl Petersen et al. (2011) Nature Methods, 8:785-786). The presence of a signal sequence suggests that AnePro2 is a secreted enzyme.

Example 20

Cloning of *Aspergillus albertensis* protease AalPro2 (CRC21076-WT)

*Aspergillus albertensis* was selected as a potential source of enzymes which may be useful in various industrial applications. One of the genes identified in *Aspergillus albertensis*, named AalPro2 (CRC21076-WT), encodes a protein with homology to a protease as determined from a BLAST search (Altschul et al., J Mol Biol, 215: 403-410, 1990). The protein encoded by the ApsPro1 gene is shown in SEQ ID NO:7 (JGI Reference Sequence: Aspalbe1_152875). At the N-terminus, the protein has a signal peptide with a length of 19 amino acids as predicted by SignalP version 4.0 (Nordahl Petersen et al. (2011) Nature Methods, 8:785-786). The presence of a signal sequence suggests that AalPro2 is a secreted enzyme.

Example 21

Cloning of *Aspergillus coremiiformis* CBS 553.77 Protease AcoPro2 (CRC21078-WT)

*Aspergillus coremiiformis* CBS 553.77 was selected as a potential source of enzymes which may be useful in various industrial applications. One of the genes identified in *Aspergillus coremiiformis* CBS 553.77, named AcoPro2 (CRC21078-WT), encodes a protein with homology to a protease as determined from a BLAST search (Altschul et al., J Mol Biol, 215:403-410, 1990). The protein encoded by the AcoPro2 gene is shown in SEQ ID NO:8 (JGI Reference Sequence: Aspcor1_141732). At the N-terminus, the protein has a signal peptide with a length of 22 amino acids as predicted by SignalP version 4.0 (Nordahl Petersen et al. (2011) Nature Methods, 8:785-786). The presence of a signal sequence suggests that AcoPro2 is a secreted enzyme.

Example 23

Cloning of *Aspergillus wentii* Protease AwePro2 (CRC21080-WT)

*Aspergillus wentii* was selected as a potential source of enzymes which may be useful in various industrial applications. One of the genes identified in *Aspergillus wentii*, named AwePro2 (CRC21080-WT), encodes a protein with homology to a protease as determined from a BLAST search (Altschul et al., J Mol Biol, 215: 403-410, 1990). The protein encoded by the AwePro2 gene is shown in SEQ ID NO:9 (JGI Reference Sequence: Aspwe1_188244). At the N-terminus, the protein has a signal peptide with a length of 20 amino acids as predicted by SignalP version 4.0 (Nordahl Petersen et al. (2011) Nature Methods, 8:785-786). The presence of a signal sequence suggests that AwePro2 is a secreted enzyme.

Example 24

Cloning of *Aspergillus brasiliensis* Protease AbrPro1 (CRC21202-WT)

*Aspergillus brasiliensis* was selected as a potential source of enzymes which may be useful in various industrial applications. One of the genes identified in *Aspergillus brasiliensis*, named AbrPro1 (CRC21202-WT), encodes a protein with homology to a protease as determined from a BLAST search (Altschul et al., J Mol Biol, 215: 403-410, 1990). The protein encoded by the AbrPro1 gene is shown in SEQ ID NO:10 (JGI Reference Sequence: Aspbr1_41430). At the N-terminus, the protein has a signal peptide with a length of 22 amino acids as predicted by SignalP version 4.0 (Nordahl Petersen et al. (2011) Nature Methods, 8:785-786). The presence of a signal sequence suggests that AbrPro1 is a secreted enzyme.

Example 25

Cloning of *Aspergillus sclerotioniger* CBS115572 Protease AscPro5 (CRC21204-WT)

*Aspergillus sclerotioniger* CBS115572 was selected as a potential source of enzymes which may be useful in various industrial applications. One of the genes identified in *Aspergillus sclerotioniger* CBS115572, named AscPro5 (CRC21204-WT), encodes a protein with homology to a protease as determined from a BLAST search (Altschul et al., J Mol Biol, 215: 403-410, 1990). The protein encoded by the AscPro5 gene is shown in SEQ ID NO:11 (JGI Reference Sequence: Aspscl1_500682). At the N-terminus, the protein has a signal peptide with a length of 22 amino acids as predicted by SignalP version 4.0 (Nordahl Petersen et al. (2011) Nature Methods, 8:785-786). The presence of a signal sequence suggests that AscPro5 is a secreted enzyme.

Example 26

Expression, Fermentation and Purification of ApsPro1, AnePro2, AalPro2, AcoPro2, AwePro2, AbrPro1 and AscPro5

DNA sequences encoding ApsPro1, AnePro2, AalPro2, AcoPro2, AwePro2, AbrPro1 or AscPro5, were chemically synthesized and inserted into a *Trichoderma reesei* expression vector pGXT (the same as the pTTTpyr2 vector as described in published PCT Application WO2015/017256, incorporated by reference herein) by Generay (Shanghai, China). The resulting plasmids were labeled as pGXT-ApsPro1, pGXT-AnePro2, pGXT-AalPro2, pGXT-AcoPro2, pGXT-AwePro2, pGXT-AbrPro1 or pGXT-AscPro5, respectively.

Each individual expression plasmid was then transformed into a suitable *Trichoderma reesei* strain (described in published PCT application WO 05/001036) using protoplast transformation (Te'o et al. (2002) J. Microbiol. Methods 51:393-99). Transformants were selected on a medium containing acetamide as a sole source of nitrogen. After 5 days of growth on acetamide plates, transformants were collected and subjected to fermentation via the DASGIP (Eppendorf, Juelich, Germany).

To initiate the fermentation of ApsPro1, AnePro2, AalPro2, AcoPro2, AwePro2, AbrPro1 or AscPro5, seed culture was grown in 1 L shake flask, each contained 100 mL defined medium (pH 5.5 before sterilization) that is consisted of 50 g/L glucose monohydrate, 6 g/L glycine, 5 g/L $(NH_4)_2SO_4$, 4.5 g/L $KH_2PO_4$, 1 g/L $CaCl_2·2H_2O$, 1 g/L $MgSO_4·7H_2O$, 2 g/L Mazu 6000K and 2.5 mL 400× *T. reesei* Trace Metals (400× Trace Metals stock (~pH 1) contains 175 g/L $C_6H_8O_7·H_2O$, 200 g/L $FeSO_4·7H_2O$, 16 g/L $ZnSO_4·7H_2O$, 3.2 g/L $CuSO_4·5H_2O$, 1.4 g/L $MnSO_4·H_2O$, and 0.8 g/L $H_3BO_3$). The seed culture was shaken for 48 hours at 250 rpm and 30° C. Following completion of this incubation, 200 mL of seed culture was transferred to the 2-L bioreactor (DASGIP).

The medium for fermentation in the 2-L bioreactor (DASGIP) contains 60 g/L dextrose, 6 g/L glycine, 1 g/L $CaCl_2·2H_2O$, 4.5 g/L $KH_2PO_4$, 4 g/L $(NH_4)_2SO_4$, 1 g/L $MgSO_4·7H_2O$, 1.2 g/L Mazu 6000K and 2.5 ml 400× *T. reesei* Trace Metals. An induction solution containing 250 g glucose/sophorose per kg was prepared and sterilized.

Following inoculation, batch fermentation was initiated with working volume of 1 L and was controlled at pH 3.5 and 34° C. Dissolved oxygen level was controlled above 35% by adjusting airflow rate, oxygen supply, and agitation during whole fermentation process. At the elapsed fermentation time of 22 hours, the glucose in broth was depleted, and the feed of 250 g (glucose/sophorose)/kg solution was started at this time. Stepwise feed rates of 4 mL feed/hr. and 6 mL feed/hr. were applied in the time intervals of 22-46 hours and 46-72 hours, respectively. Accompanying the start of fed-batch phase, pH was linearly changed to 4.0, and temperature was adjusted to 28° C. Fermentation was completed after 72 hours run, and broth was harvested by centrifugation, filtered, and subsequently concentrated.

To purify ApsPro1, AncPro2, AalPro2, AcoPro2, AwePro2, AbrPro1 and AscPro5, the crude from 1 L Dasgip fermenter was concentrated and added ammonium sulfate to the final concentration of 1 M. The solution was loaded onto a HiPrep™ Phenyl FF 16/10 column pre-equilibrated with 20 mM NaAc (pH 5.0) supplemented with additional 1 M ammonium sulfate. The target protein was eluted from the column with 0.5 M ammonium sulfate. The resulting active protein fractions were then pooled, concentrated, and exchanged buffer into 20 mM NaAc (pH 5.0), 150 mM NaCl via the 10K Amicon Ultra devices, then stored in 40% glycerol at −20° C. until usage.

Example 27

Haze Reduction Performance of ApsPro1, AnePro2, AalPro2, AcoPro2, AwePro2, AbrPro1 and AscPro5

Figure 15:
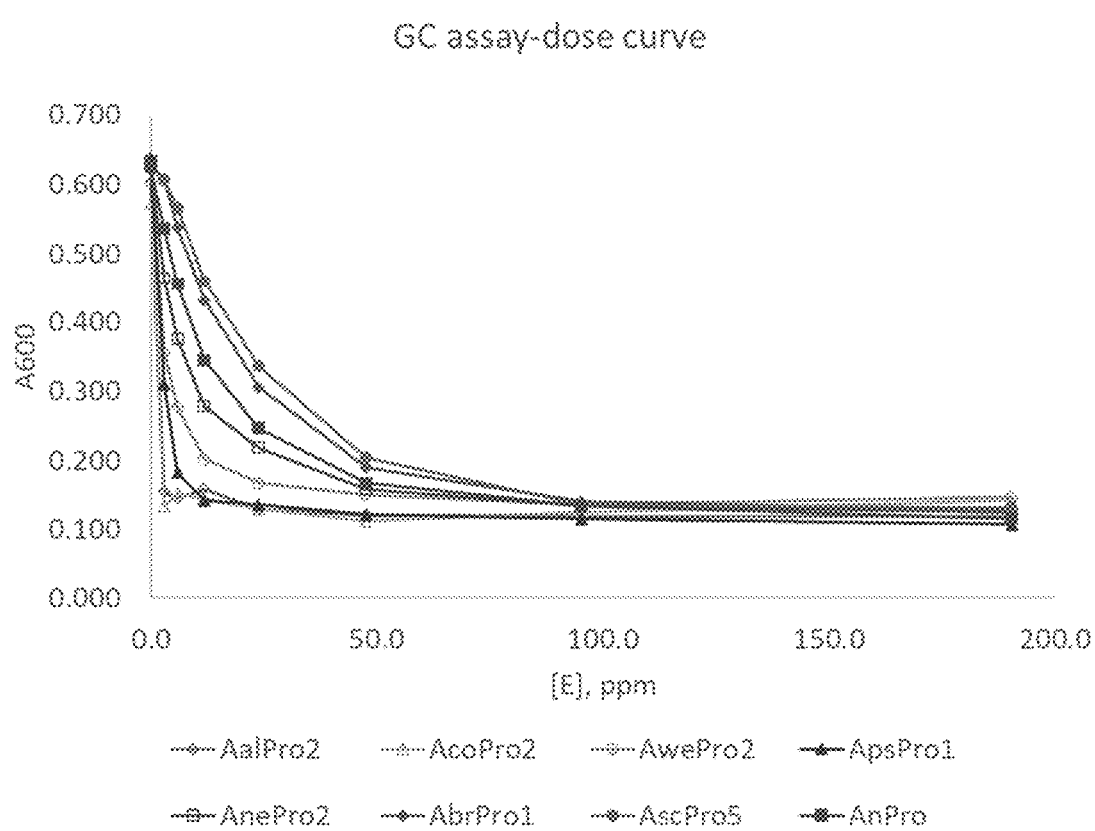
FIG. 15 shows the haze reduction performance of purified ApsPro1, AnePro2, AalPro2, AcoPro2, AwePro2, AbrPro1, AscPro5 and AnPro shown as A600 in response to enzyme concentrations of 3 to 200 ppm.

The haze reduction performance of ApsPro1, AnePro2, AalPro2, AcoPro2, AwePro2, AbrPro1 and AscPro5 was evaluated using the gliadin-catechin assay. Prior to the reaction, the enzyme was diluted with water to specific concentrations. The gliadin substrate (Sigma, Cat. No. G3375) was dissolved in 20 mM acetate/phosphate buffer (pH 4.5) supplemented with additional 0.2% ethanol to a final concentration of 2 mg/mL and the catechin substrate (Sigma, Cat. No. C1251) was dissolved in 20 mM citrate/phosphate buffer (pH 4.5) supplemented with additional 0.2% ethanol to a final concentration of 2 mg/mL. To initiate the assay, 100 µL of gliadin solution was mixed with 5 µL of properly diluted ApsPro1, AnePro2, AalPro2, AcoPro2, AwePro2, AbrPro1 and AscPro5 (or purified AnPro (Brewer's Clarex™) as the benchmark) in a 96-MTP; and after 90 min incubation at 45° C. in a Thermomixer, the resulting 96-MTP was then placed on ice for 5 min, followed by the addition of 100 µl catechin solution. Haze was developed at room temperature for 30 min. The absorbance of the developed haze at 600 nm ($A_{600}$) was measured using a SpectraMax 190 and subsequently plotted against different enzyme concentrations. Each value was the mean of triplicate assays. As shown in FIG. 15, ApsPro1, AnePro2, AalPro2, AcoPro2 and AwePro2 are all more effective in reducing the gliadin-catechin haze, when compared to the benchmark, AnPro.

Example 28

Figure 16:
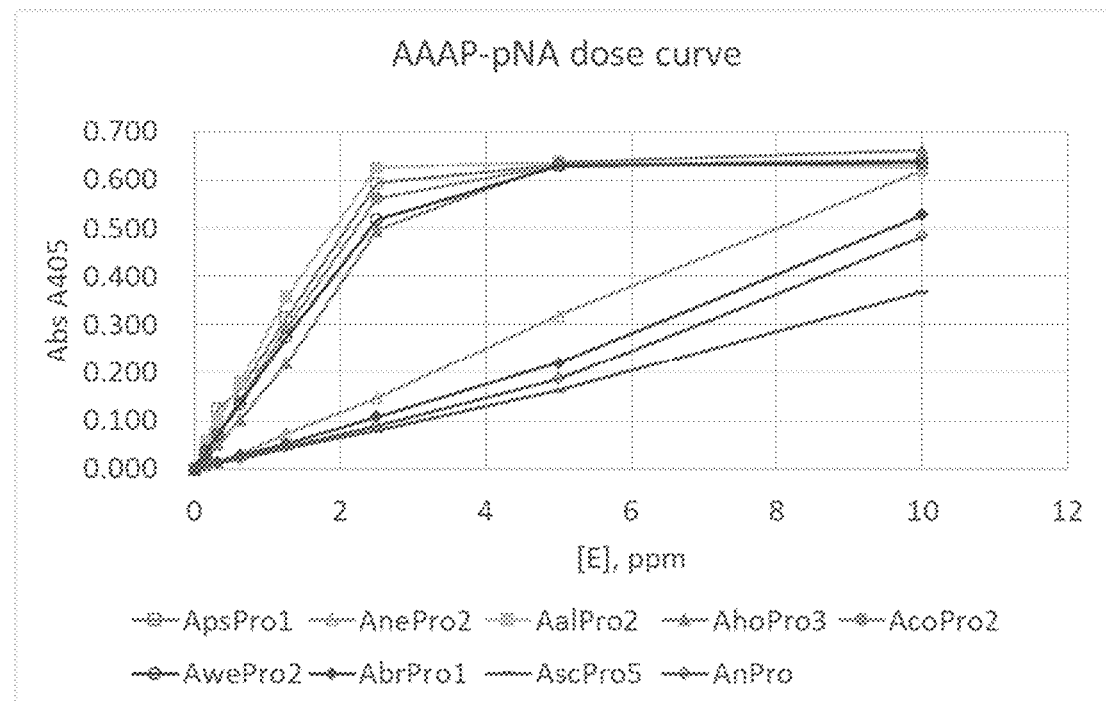
FIG. 16 shows the proteolytic activity of AhoPro3, ApsPro1, AncPro2, AalPro2, AcoPro2, AwePro2, AbrPro1, AscPro5 and AnPro shown as A405 in response to enzyme concentrations of 0 to 10 ppm.

Proteolytic Activity of AhoPro3, ApsPro1, AnePro2, AalPro2, AcoPro2, AwePro2, AbrPro1, AscPro5 and AnPro The proteolytic activity of purified AhoPro3, ApsPro1, AnePro2, AalPro2, AcoPro2, AwePro2, AbrPro1, AscPro5 and AnPro was measured in 25 mM citrate/phosphate buffer (pH 5), using Ala-Ala-Ala-Pro-paranitroanilide (AAAP-pNA) (synthesized by GL Biochem, Shanghai, China) as the substrate. Prior to the reaction, the enzyme was diluted with water to specific concentrations. The AAAP-pNA substrate was dissolved in 100% Dimethylsulfoxide (DMSO) to a final concentration of 10 mM. To initiate the reaction, 5 µL of substrate was mixed with 85 µL of citrate/phosphate buffer in a non-binding 96-well Microtiter Plate (96-MTP) (Corning Life Sciences, #3641), and after 5 min pre-incubation at 37° C. in a Thermomixer (Eppendorf), 10 µl of properly diluted purified enzyme (or water as the blank) was added. After sealing the 96-MTP, the reaction was carried out in a Thermomixer at 37° C. and 650 rpm for 10 min, and the absorbance of the resulting solution was measured at 405 nm ($A_{405}$) using a SpectraMax 190. Net $A_{405}$ was calculated by subtracting the $A_{405}$ of the blank control from that of enzyme, and then plotted against different protein concentrations. Each value was the mean of duplicate assays. The proteolytic activity is shown as Net $A_{405}$. As shown in FIG. 16, ApsPro1, AhoPro3, AncPro2, AalPro2, AcoPro2, AbrPro1 and AwePro2 are all more effective proteases on the proline specific substrate (AAAP-pNA), when compared to the benchmark, AnPro. The proteolytic assay with AAAP-pNA as the substrate indicates that ApsPro1, AhoPro3, AnePro2, AalPro2, AcoPro2, AbrPro1 and AwePro2 are all highly active proteases.

Example 29

Cloning of MorPro1

A fungal strain (*Magnaporthe oryzae* 70-15) was selected as potential sources of enzymes which may be useful in various industrial applications. A BLAST search (Altschul et al., J Mol Biol, 215: 403-410, 1990) led to the identification of genes that encode proteins with homology to a fungal protease: MorPro1 from *Magnaporthe oryzae* 70-15.

The nucleic acid sequence of full-length MorPro1 gene, as identified from NCBI database (NCBI Reference Sequence: NC_017851.1 from 2214046 to 2215835; complement), is provided in SEQ ID NO: 12. The corresponding full-length protein encoded by the MorPro1 gene is shown in SEQ ID NO: 13 (NCBI Reference Sequence: XP_003716615.1). MorPro1 has an N-terminal signal peptide as predicted by SignalP version 4.0 (Nordahl Petersen et al. (2011) Nature Methods, 8:785-786), suggested that it is a secreted enzyme. The corresponding, predicted, mature enzyme sequence for MorPro1 is provided in SEQ ID NO:14.

Example 30

Expression of MorPro1

The DNA sequence encoding full-length MorPro1 (SEQ ID NO: 12) was chemically synthesized and inserted into the *Trichoderma reesei* expression vector pTrex3gM (described in U.S. Published Application 2011/0136197 A1) by Generay (Shanghai, China). The synthesized nucleotide sequences for full-length MorPro1, is set forth as SEQ ID NO: 15. The pTrex3gM expression vector contained the *T. reesei* cbhI-derived promoter (cbhI) and cbhI terminator regions allowing for a strong inducible expression of the gene of interest. The *A. nidulans* amdS selective marker confer growth of transformants on acetamide as a sole nitrogen source. The resulting plasmid was labeled pGX256 (Trex3gM-MorPro1) and the expression plasmid was then transformed into a quad deleted *Trichoderma reesei* strain (described in WO 05/001036) using biolistic method (Te'o V S et al., J Microbiol Methods, 51:393-9, 2002). Transformants were selected on a medium containing acetamide as a sole source of nitrogen (acetamide 0.6 g/L; cesium chloride 1.68 g/L; glucose 20 g/L; potassium dihydrogen phosphate 15 g/L; magnesium sulfate heptahydrate 0.6 g/L; calcium chloride dihydrate 0.6 g/L; iron (II) sulfate 5 mg/L; zinc sulfate 1.4 mg/L; cobalt (II) chloride 1 mg/L; manganese (II) sulfate 1.6 mg/L; agar 20 g/L; pH 4.25). Transformed colonies (about 50-100) appeared in about 1 week. After growth on acetamide plates, transformants were picked and transferred individually to acetamide agar plates. After 5 days of growth on acetamide plates, transformants displaying stable morphology were inoculated into 200 µL Glucose/Sophorose defined media in 96-well microtiter plates. The microtiter plate was incubated in an oxygen growth chamber at 28° C. for 5 days. Supernatants from these cultures were used to confirm the protein expression by SDS-PAGE analysis. The stable strain with the highest protein expression was selected and subjected to fermentation in a 250 mL shake flask with Glucose/Sophorose defined media.

Example 31

Peptide Analysis on Beer Produced with Endoprotease from During Fermentation and Protease Specificity Analysis Beer was produced at a semi-industrial pilot brewery, as described in example 14 with the addition of the proteases: AnPro, AniPro2, AhoPro and MorPro1 in the start of the beer fermentation process as described in example 14 using the dosages shown in table 7. The beer brewed at a 2 hL pilot plant brewery was filtered (no silica or PVPP applied) but un-stabilized all malt pilsner type beer with approximately 66% RDF and alcohol content of 4.7% (v/v). Beer filtration was done with a kieselguhr filter as described in example 13. 15 ml of the final beer was centrifuged in 10 kDa spin filters (Vivaspin 20, Sartorius) and 100 µl of the filtrate was added to a desalting column (Oasis HLB 1 cc (10 mg) Extraction Cartridges, Material no 186000383, Waters, USA). Prior to loading the desalting column, it was activated with 0.5 mL MeOH, conditioned with 0.5 mL 0.1% TFA. Sample was loaded 0.5 mL 0.1% TFA and 100 µl sample (slow loading over approx. 1 min.) and washed with two times 0.5 mL 0.1% TFA. Elution was performed with 0.5 mL 50% ACN, 0.1% TFA and the elution faction was collected and was freeze dried overnight. The dried sample was sent for MS analysis as described below.

LC-MS Data Acquisition

Nano LC-MS/MS analyses were performed using an UltiMate™ 3000 RSLCnano System (Thermo Fisher Scientific, MA, USA) interfaced to a Q Exactive™ HF Hybrid Quadrupole-Orbitrap™ Mass Spectrometer (Thermo Fisher Scientific, MA, USA). Samples were dissolved in 0.1% TFA and loaded onto a 20 mm nano Viper Trap Column (Acclaim™ PepMap™ 100 C18, 3 µm particle size and an id. 0.075 mm) connected to a 250 mm analytical column (PepSep, ReproSil 1.9 µm C18 beads, pore diameter 120 Å and an id. 0.075 mm). Separation was performed at a flow rate of 300 nL/min using a 20 min gradient of 2-41% Solvent B (100% ACN, 0.1% FA) into the Nanospray Flex Ion Source (Thermo Scientific). The Q Exactive HF instrument was operated in a data-dependent MS/MS using HCD fragmentation. The peptide masses were measured by the Orbitrap (MS scans were obtained with a resolution of 60,000 at m/z 200). The top 7 most intense ions were selected and subjected to fragmentation. Ions were isolated by the quadrupole using a 2.0 Da with isolation window. Fragment spectra were recorded in the Orbitrap with a resolution 60,000. Dynamic exclusion was enabled with an exclusion duration of 10 s, and an exclusion mass tolerance width of ±10 ppm relative to masses on the list.

Peptide Data Analysis

The LC-MS/MS data was processed (smoothing, background subtraction, and centroiding) using Proteome Discoverer (Version 2.4, Thermo Scientific). The processed LC-MS/MS data was submitted to database searching against a SwissProt database with GreenPlants as taxonomy using an in-house Mascot server. No Specificity was chosen as enzyme. Oxidation of methionine was set as variable modification. The MS/MS results were searched with a peptide ion mass tolerance of ±10 ppm and a fragment ion mass tolerance of ±0.2 Da. Percolator (Kall, Canterbury et al. 2007) was used for calculating FDR. Only peptides that were identified as rank 1 peptides and with a confidence value of 1% (q<0.01) were considered for further analysis. Peptides were relatively quantified using the build in quant module. Total sum of abundances was scaled to same level and used for calculation.

Peptides from beers were analyzed and the relative amino acid content at the peptide termini positions corresponding to P3'-P3 by protease cleavage. The relative amino acid content in the corresponding P1 position of peptides is shown in FIG. 21 for MorPro1, AnPro and AniPro_2. The relative amino acid content at the peptide position corresponding to P3-P3' are shown to the right with graphs displaying the cumulative content of each amino acid at given positions and hereby the detailed protease specificity preferences. The relative amino acid content in peptides in beer made with MorPro1, AnPro and AniPro_2 for position to P3'-P3 by protease cleavage are shown in table 19 to 21. the corresponding P1 position of peptides. It is clear that the relative content of both proline in the P1 position is very high and support the action of the proteases being proline specific. Highest proline (P) specificity is found for AnPro (52%) followed by AniPro_2 (47%) and MorPro1 (36%).

Figure 22:
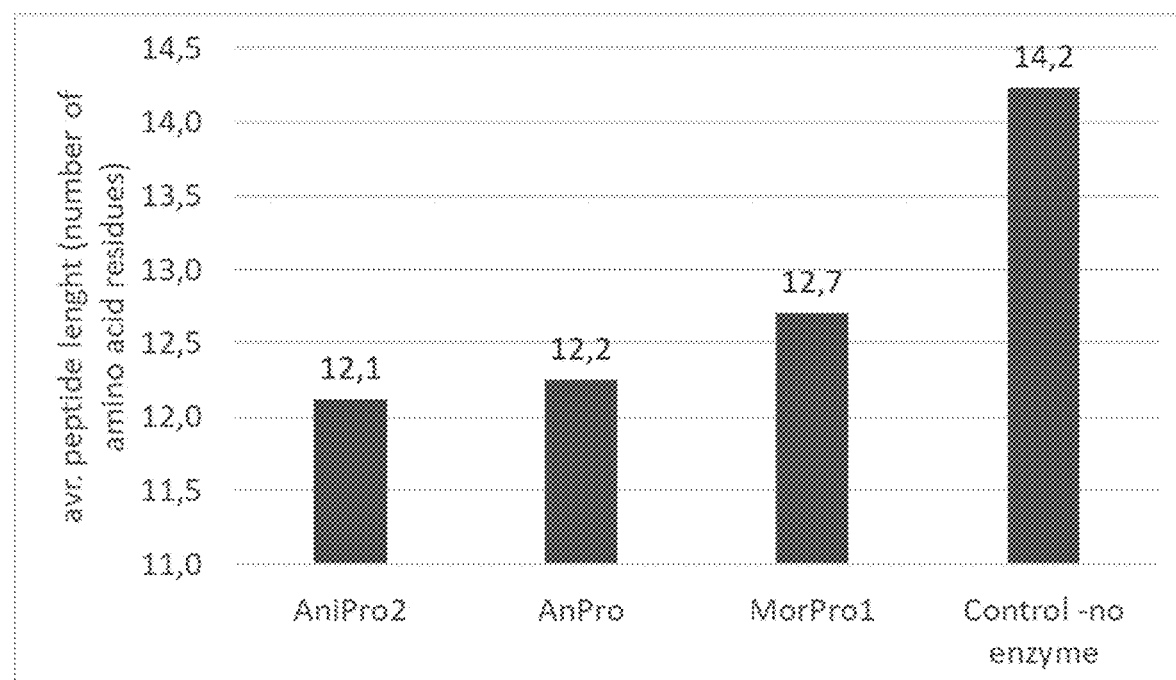
FIG. 22 shows peptides from malt beers produced at 1 hL scale with or without endoproteases was analyzed by LC-MS and the average peptide length (number of amino acid residues) was calculated from more than 300 unique peptides identified as described in example 31. Average peptide length is calculated for beer produced with AniPro2, AnPro, MorPro1 and Control (no enzyme).

However, relative high glutamine (Q) specificity in P1 is surprisingly also observed for AniPro_2 (12%) and AnPro (11%) whereas MorPro1 only display (3%). The same high preference for proline (P) and glutamine (Q) is observed by the relative sum of content for position to P3'-P3, where AniPro_2 has 141% Q and 108% P, AnPro has 134% Q and 101% P and MorPro1 has 53% Q and 70% P. This clearly suggest AniPro_2 being the most specific glutamine and proline specific endoprotease followed by AnPro and MorPro1. This also support and explain the superior haze reduction performance of AniPro_2. The increased glutamine and proline specificity may enable more efficient degradation of haze sensitive proteins in malt- or wheat-based beers known to have a high content of proline and glutamine. The average peptide length (number of amino acid residues) of peptides identified in beer produced with protease was calculated from more than 300 unique peptides identified and the results are shown in FIG. 22. The observed average peptide length is calculated for beer produced with AniPro2 (12.1 residues), AnPro (12.2 residues), MorPro1 (12.7 residues) and Control (14.2 residues). This is clearly supporting a more efficient degradation of isolated protein in the beer leading to shorter peptides in beers produced with proteases having increased glutamine and proline specificity. The average shortest peptides were found in beer produced with AniPro2 followed by beers produced by AnPro and MorPro1 and Control having the longest average peptide length. Thus, proteases with increased glutamine and proline specificity generate shorter peptides in beers and hereby a more efficient degradation of haze sensitive proteins in malt-based beers.

TABLE 19

Peptide analysis from malt beers produced at 1 hL scale with endoproteases was analyzed and the relative amino acid (AA) content at the peptide termini positions corresponding to P3'-P3 by protease cleavage.

| AA | MorPro1 | | | | | | |
|----|----|----|----|----|----|----|----|
|    | P3 | P2 | P1 | P'1 | P'2 | P'3 | SUM |
| A | 6 | 4 | 4 | 14 | 9 | 21 | 58 |
| R | 3 | 4 | 5 | 2 | 1 | 2 | 16 |
| N | 2 | 20 | 1 | 14 | 3 | 4 | 44 |
| D | 2 | 0 | 2 | 1 | 2 | 9 | 15 |
| C | 0 | 0 | 0 | 0 | 0 | 0 | 1 |
| Q | 21 | 11 | 3 | 4 | 9 | 22 | 70 |
| E | 2 | 3 | 2 | 5 | 1 | 8 | 22 |
| G | 6 | 9 | 3 | 12 | 6 | 7 | 44 |
| H | 27 | 2 | 1 | 2 | 1 | 0 | 34 |
| I | 4 | 1 | 0 | 1 | 38 | 5 | 50 |
| L | 4 | 5 | 20 | 7 | 0 | 6 | 42 |
| K | 2 | 18 | 13 | 0 | 0 | 1 | 35 |
| M | 2 | 0 | 1 | 0 | 1 | 0 | 4 |
| F | 0 | 3 | 1 | 18 | 1 | 2 | 25 |
| P | 3 | 2 | 36 | 2 | 6 | 4 | 53 |
| S | 2 | 4 | 1 | 8 | 2 | 2 | 18 |
| T | 1 | 6 | 2 | 4 | 1 | 4 | 18 |
| W | 0 | 0 | 0 | 0 | 16 | 0 | 17 |
| Y | 3 | 2 | 1 | 1 | 0 | 0 | 7 |
| V | 10 | 4 | 5 | 4 | 1 | 3 | 27 |

The relative amino acid content in peptides in beer made with MorPro1 is shown for position to P3'-P3 by protease cleavage.
The sum of relative amino acid content from P3' to P3 for each amino acid is given as SUM.

TABLE 20

Peptide analysis from malt beers produced at 1 hL scale with endoproteases was analyzed and the relative amino acid (AA) content at the peptide termini positions corresponding to P3'-P3 by protease cleavage.

AnPro

| AA | P3 | P2 | P1 | P'1 | P'2 | P'3 | SUM |
|---|---|---|---|---|---|---|---|
| A | 4 | 4 | 3 | 13 | 6 | 7 | 38 |
| R | 2 | 2 | 3 | 2 | 6 | 2 | 16 |
| N | 2 | 5 | 2 | 4 | 2 | 3 | 18 |
| D | 2 | 0 | 1 | 2 | 1 | 9 | 14 |
| C | 0 | 0 | 1 | 0 | 0 | 0 | 1 |
| Q | 30 | 24 | 11 | 14 | 22 | 33 | 134 |
| E | 1 | 1 | 1 | 3 | 1 | 2 | 10 |
| G | 4 | 9 | 2 | 5 | 4 | 4 | 28 |
| H | 5 | 2 | 0 | 2 | 0 | 1 | 11 |
| I | 9 | 5 | 2 | 2 | 17 | 5 | 39 |
| L | 2 | 5 | 8 | 4 | 0 | 3 | 22 |
| K | 1 | 29 | 4 | 0 | 0 | 1 | 36 |
| M | 3 | 0 | 0 | 1 | 0 | 0 | 5 |
| F | 0 | 1 | 1 | 38 | 1 | 4 | 44 |
| P | 20 | 2 | 52 | 1 | 7 | 20 | 101 |
| S | 2 | 4 | 1 | 3 | 2 | 2 | 14 |
| T | 2 | 3 | 2 | 2 | 1 | 2 | 12 |
| W | 0 | 0 | 0 | 0 | 26 | 0 | 27 |
| Y | 1 | 1 | 1 | 1 | 0 | 0 | 4 |
| V | 10 | 3 | 4 | 5 | 2 | 3 | 26 |

The relative amino acid content in peptides in beer made with AnPro is shown for position to P3'-P3 by protease cleavage.
The sum of relative amino acid content from P3' to P3 for each amino acid is given as SUM.

TABLE 21

Peptide analysis from malt beers produced at 1 hL scale with endoproteases was analyzed and the relative amino acid (AA) content at the peptide termini positions corresponding to P3'-P3 by protease cleavage.

AniPro2

| AA | P3 | P2 | P1 | P'1 | P'2 | P'3 | SUM |
|---|---|---|---|---|---|---|---|
| A | 3 | 3 | 3 | 10 | 6 | 10 | 35 |
| R | 1 | 2 | 2 | 1 | 9 | 1 | 18 |
| N | 1 | 10 | 1 | 7 | 2 | 3 | 24 |
| D | 1 | 0 | 1 | 1 | 1 | 6 | 10 |
| C | 0 | 0 | 1 | 0 | 0 | 0 | 1 |
| Q | 25 | 31 | 12 | 17 | 24 | 31 | 141 |
| E | 1 | 3 | 1 | 4 | 1 | 4 | 13 |
| G | 4 | 6 | 2 | 6 | 3 | 3 | 25 |
| H | 15 | 1 | 1 | 2 | 0 | 1 | 19 |
| I | 11 | 8 | 4 | 1 | 20 | 5 | 48 |
| L | 3 | 3 | 11 | 4 | 0 | 4 | 25 |
| K | 1 | 17 | 6 | 0 | 1 | 1 | 26 |
| M | 3 | 0 | 0 | 1 | 0 | 0 | 4 |
| F | 0 | 1 | 1 | 29 | 1 | 3 | 34 |
| P | 21 | 4 | 47 | 2 | 14 | 21 | 108 |
| S | 1 | 4 | 1 | 4 | 3 | 1 | 13 |
| T | 1 | 3 | 2 | 2 | 1 | 3 | 13 |
| W | 0 | 0 | 1 | 0 | 12 | 0 | 14 |
| Y | 1 | 0 | 1 | 1 | 0 | 0 | 3 |
| V | 7 | 3 | 3 | 8 | 2 | 3 | 26 |

The relative amino acid content in peptides in beer made with AniPro2 is shown for position to P3'-P3 by protease cleavage.
The sum of relative amino acid content from P3' to P3 for each amino acid is given as SUM.

SEQUENCE LISTING

```
Sequence total quantity: 16
SEQ ID NO: 1           moltype = AA  length = 527
FEATURE                Location/Qualifiers
source                 1..527
                       mol_type = protein
                       organism = Aspergillus bertholletius
SEQUENCE: 1
MHFLAPLSVV TLLASWPLLG YAIHPPKPVP PPVSRPVSTR SSAVVGEATF DQLLDHHDSS   60
KGTFSQRYWW STEYWGGPGS PVVLFTPGEA SADGYQGYLT NTTLTGRYAQ EIQGAVILIE  120
HRYWGGSSPY KELTAETLQY LTLEQSILDL TYFAETVSLE FDPSNRSNAP KAPWVLVGGS  180
YSGALAAWTA AVAPETFWAY HATSAPVEAI NDFWQYFDPI RQGMAPNCSR DVSLVATHID  240
RVGKHGSAAE QLALKELFGL GAVEHYDDFA AALPIGPYKW QSNTFVTGYS GFFAFCDAVE  300
NVKAGATVVP GPEGVGLQKA LRGYAKWFKS TILPGYCANY GYWTDNQTVA CFDTYNPSSA  360
IFTDTSVDNA VDRQWQWFLC NEPFFWWQDG APEGIPTIIP RTVNAAYWQR QCSLYFPEVN  420
GYTYGSAKGK TAATVNQWTG GWSATRNTSH LLWVNGQYDP WRDSGVSSIY RPGGPLKSTA  480
DEPVQVIPGG FHCSDLYLKD YYANDGVKQV IDNAVAQIKS WVAEYYN                527

SEQ ID NO: 2           moltype = AA  length = 524
FEATURE                Location/Qualifiers
source                 1..524
                       mol_type = protein
                       organism = Aspergillus niger
SEQUENCE: 2
MQTFGAFLVS FLAASGLAAA ARPRLVPKPI SRPASSKSAA TTGEAYFEQL LDHHNPEKGT   60
FSQRYWWSTE YWGGPGSPVV LFNPGEVSAD GYEGYLTNDT LTGVYAQEIQ GAVILIEHRY  120
WGDSSPYEVL NAETLQYLTL DQSILDMTYF AETVKLQFDN SSRSNAQNAP WVMVGGSYSG  180
ALTAWTESIA PGTFWAYHAT SAPVEAIYDF WQYFYPIQQG MAQNCSKDVS LVAEYVDKIG  240
KNGTAKEQQE LKELFGLGAV EHYDDFAAVL PNGPYLWQDN DFVTGYSSFF QFCDAVEGVE  300
AGAAVTPGPE GVGLEKALAN YANWFNSTIL PNYCASYGYW TDEWSVACFD SYNASSPIFT  360
DTSVGNPVDR QWEWFLCNEP FFWWQDGAPE GTSTIVPRLV SASYWQRQCP LYFPEVNGYT  420
YGSAKGKNSA TVNSWTGGWD MTRNTTRLIW TNGQYDPWRD SGVSSTFRPG GPLVSTANEP  480
VQIIPGGFHC SDLYMEDYYA NEGVRKVVDN EVKQIKEWVE EYYA                    524

SEQ ID NO: 3           moltype = AA  length = 527
FEATURE                Location/Qualifiers
source                 1..527
                       mol_type = protein
                       organism = Aspergillus transmontanensis
```

```
SEQUENCE: 3
MQFLPPLSIV TLLASWPSLS RAIHPPRPVP PPVSRPVSTQ SLAVEGNATF EQLLDHHDSS   60
KGTFSQRYWW STEYWGGPGS PVVLFTPGEA SADGYEYLT NNTLTGLYAQ EIQGAVILIE   120
HRYWGDSSPY EELTAETLQY LTLEQSILDL THFAETVQLE FDTSNSSNAP KAPWVLVGGS  180
YSGALAAWTA AVAPETFWAY HATSAPVQAI DDFWQYFDPI RHGMAPNCSR DVSLVANHID  240
TVGKNGSAAD QFALKELFGL EALEHYDDFA AALPTGPYLW QSNTFVTGYS DFFAFCDAVE  300
NVEAGAAVVP GPEGVGLQKA LTGYANWFNS TILPGYCASY GYWTDNRTVA CFDTHNPSSA  360
IFIDTSVDNA VDRQWQWFLC NEPFFWWQDG APEGVPTIVP RTINAEYWQR QCSLYFPEVN  420
GYTYGSAKGK TAASVNSWTG GWSDSKNTSR LLWVNGQYDP WRDSGVSSTH RPGGPLASTA  480
DEPVQIIPGG FHCSDLYIKD YYANAGVKQV VDNAVAQIKS WVAEYYK              527

SEQ ID NO: 4            moltype = AA  length = 525
FEATURE                 Location/Qualifiers
source                  1..525
                        mol_type = protein
                        organism = Aspergillus homomorphus
SEQUENCE: 4
MRFCSPVSVV AVTALWASLT AALRPPRLAP RPVTATTQSA VVESTFEQLI DHNDPSKGTF   60
SQRYWYSTQY WGGPGSPVVL FTPGEAAADG YGGYLTNRTL TGVYAQQLQG AVVLIEHRYW  120
GGSSPYANLT AETLQYLTLE QSVLDLTYFA ENVQLGFAKN STSSNAPHVP WVLVGGSYSG  180
ALTAWTEHLA PGTFWAYHAT SAPMESIYDF WTYFRPIQEG MAKNCSKDVS LVAEHVDKVG  240
KLGTKAQQKA LKKLFGLEAL EHFDDFAAVL PIGPYLWQDN SFATGYSGFF AFCDAVENVE  300
AGAAVTPGAE GVGLEKALKG YANWPKNKIL PDYCASTYGY WSDKYTVACF DTYNATSPLF  360
RDTSVRNAVD RQWTWFLCNE PFFWWQDGAP ESETSLIPRL VSADYWQRQC SLYFPEVNGY  420
TYGSAKGKTA STFNAWTDGW FLTGNSTRLI WTNGQYDPWR DAGVSSIFRP GGPLVSTPNE  480
PVQIIPGGFH CSDLYISDAE VNAGVKKVVI NEVAQIKAWV AEFYA                525

SEQ ID NO: 5            moltype = AA  length = 524
FEATURE                 Location/Qualifiers
source                  1..524
                        mol_type = protein
                        organism = Aspergillus pseudocaelatus
SEQUENCE: 5
MHFLSRISVV TLLASWPSLS RAIHPPRPVP PPVTRPASTL SSAVEGEATF EQLVDHHDSS   60
KGTFSQRYWW STEYWGGPGS PVVLFTPGEA SADGYEYLT NNTLTGLYAQ EIQGAVILIE   120
HRYWGGSSPF EELTAETLQY LTLEQSIQDL TYFAETVQLE FDTSNSSNAP KAPWVLVGGS  180
YSGALAAWTA AVAPETFWAY HATSAPVQAI NDFWQYFDPI RHGMAPNCSR DVSLVANHID  240
SVGKNGSIAE QSALKELFGL GALEHYDDFA AALPIGPYLW QDNTFVTGYS GFFAFCDAVE  300
NVEAGAAVVP GPEGVGLQKA LTGYANWFNS TILPGYCANY GYWTDNRTVA CFDTHNSSSA  360
IFTDTSLNNA VDRQWQWFLC NEPFFWWQDG APEGVPSIVP RTVNAAYWQR QCSLYFPEVN  420
GYTYGSAKGK TAATVNTWTG GWSETKNTSH LLWVNGQYDP WRDSGVSSTH RPGGPLASTA  480
DEPVQVIPGG FHCSDLYLKD YHANAGVKQV VDNAVAQIKS WVAE                 524

SEQ ID NO: 6            moltype = AA  length = 526
FEATURE                 Location/Qualifiers
source                  1..526
                        mol_type = protein
                        organism = Aspergillus neoauricomus
SEQUENCE: 6
MRFLSVVRLA ALVTSWASIA QAIRPPIPVP EPVPRPVSLQ STSTQGQATF QQLLDHHDPS   60
KGTFSQRYWW STEFWGGPGS PVILFTPGEV AADGYQGYLT NKTLTGHYAQ EVQAAVVLVE   120
HRYWGGSSPY KNLTAETLQY LTLEQSILDF THFAKTVQLQ FDNSTRSNAQ RAPWVFVGGS  180
YSGALAAWTE ATAPGTFWAY HATSAPVEAI YDFWQYFEPV REGMPQNCSK DVSLVANYID  240
GLGKNGTTRE KQAVKELFGL GDLEYYDDFA AIFPIGPWSW QSNSFITGYS DFYQFCDSVE  300
NVKAGAPVVP GPEGVGLLKA LAGYAKWFNS TALPGYCASY GYWTDERSIS CFDTHNASSP  360
LFTDTSVANG MDRQWQWFLC NEPFFYWQDG APEGKTTIVP RTVSAEYWQR QCPLFFPTVN  420
GHTYGSAKGK NAATVNAYTG GWSRTNTSRL IWTNGQYDPW LDSGVSSRFR PGGPLESTAA  480
APVQVIPGGF HCSDLYMTSY AVNDGVKKVV DNEVAQIKAW IGEYYK               526

SEQ ID NO: 7            moltype = AA  length = 524
FEATURE                 Location/Qualifiers
source                  1..524
                        mol_type = protein
                        organism = Aspergillus albertensis
SEQUENCE: 7
MHFASSARAV ALLASLTHAI RPPRPVPPPV SGPVSAQLSA VGGQATFEQL LDHHDASKGV   60
FSQRYWWSTE YWGGPGSPVV LFTPGESAAD GYEYLTNNT LTGLYAQEIQ GAVVLIEHRY   120
WGESSPYDQL TAETLQHLTL EQSILDLTYF AENVNLEFDT TNSSNAQDAP WVLVGGSYSG  180
ALAAWTEAVA PGTFWAYHAT SAPVQAIYDF WQYFDPIRHG MAPNCSRDVS LVANHVDNVG  240
KNGSATQQQA LKELFGLGAL EHYDDFAAVL PLGPWEWQSN TFVTGYSRFF AFCDAVENVE  300
AGAAVPGPE GVGLQKALTG YAKWFKSTIL PGYCANYGAW TDKMSVACFD THDKSSPLFT  360
DTSVKNAMDR QWQWFLCNEP FFWWQDGAPE GVPTIVPRTV DAAYWQRQCS LFFPEVNGFT  420
YGSAKGKTAD TVNDWTGGWS DTNNSTHLLW VNGQYDPWLD SGVSSTYRPG GPLKSTAEAP  480
VLVIPGSFHC SDLNLKNYYA NSGVKQVVDS AVAQIKSWVD EYYK                 524

SEQ ID NO: 8            moltype = AA  length = 527
FEATURE                 Location/Qualifiers
```

```
source                       1..527
                             mol_type = protein
                             organism = Aspergillus coremiiformis
SEQUENCE: 8
MHFASPLRVV AFLASWPLLT HAFRPPRPVP LPVSRPDSTQ LLTAGGQATF EQLLDHHDPS    60
KGTFAQRYWW STEHWGGPGS PVILFTPGES AADGYGGYLT NNTLTGLYAQ EIQGAVILIE   120
HRYWGDSSPY KELTAETLQY LTLEQSILDL THFAQTVNLE FDPSNRSTAS KAPWVLVGGS   180
YSGALTAWTE AIAPGTFWAY HATSAPVEAV YDFWQYFDPI RHGMAPNCSR DVSLVANYVD   240
GVGRNGSATE KQALKELFGL GALEHYDDFA AVLPAGPYLQ QSNTFTTGYS DPFFAFCDAVE   300
NVEAGAAIVP GPEGVGLQKA LMGYANWFNS TILPGHCADY GYWTDTWSVA CYDTYDPHGA   360
LFADTSVRNA ADRQWQWFLC NEPFFWWQDG APEGVPTIVP RTVDAAYWQR QCSLFFPEVN   420
GYTYGSAKGK TAATVNDWTG GWFETKNTTR LLWVNGQYDP WRSSGVSSIN RPGGPLQSTP   480
NEPVQVIPGG FHCSDLYMND YHANPGLKTV VDNAVTQIRS WVAEYYK                527

SEQ ID NO: 9                 moltype = AA  length = 525
FEATURE                      Location/Qualifiers
source                       1..525
                             mol_type = protein
                             organism = Aspergillus wentii
SEQUENCE: 9
MRFSAVALLA SCTWASLATA IRPPKPVPRP VSRPVSRQSS TFEGQATFDQ LLDHHHPEKG    60
TFSQRYWWST EFWGGPGSPV VLFTPGEESA DGYEGYLTNN TLTGVYAQEI LLDVYAQEI   120
YWGGSSPYEN LTAETLQYLT LEQSILDLTY FAKTVKLEFD FNGSSNAQKA PWVLVGGSYS   180
GALTAWTEAI SPGTFWAYHA TSAPVEAIYD FWQYFYPIQQ GMAQNCSKDV SLVAEYIDHV   240
GKTGSAKEQQ DIKELFGLGA LEHYNDFAAV LPIGPYLWQE NTFSSGYSDF FQFCDSVENV   300
EAGAAVVPGP EGVGLEKALK GYAKWFNTTM LPGYCADYGY WKDEWSVACF DTHNASSPLF   360
TDTSVENQMD RQWQWFLCNE PFFWWQDGAP ENVSTIVPRT VDAAYWQRQC SLFFPETNGY   420
KYGSAKNKTA STVNDWTDGW FLTKNTTRLI WTNGQYDPWR DSGVSSAFRP GGPLVSTPNE   480
PVQIIPGGFH CSDLYIKDAT ANAGVKKVVD TEVAQIKAWV DEYYK                  525

SEQ ID NO: 10                moltype = AA  length = 526
FEATURE                      Location/Qualifiers
source                       1..526
                             mol_type = protein
                             organism = Aspergillus brasiliensis
SEQUENCE: 10
MRSFSAVAAA ALALSWASLA QAARPRLAPK PISRPASSKS AATTGKAYFE QLLDHHNPEK    60
GTFSQRYWWS TEYWGGPGSP VVLFTPGEVS ADGYEGYLTN ETLTGVYAQE IQGAVILIEH   120
RYWGDSSPYD VLNAETLQYL TLDQSILDMT YFAETVKLQF DNSSRSNAQN APWVMVGGSY   180
SGALTAWTES IAPGTFWAYH ATSAPVEAIY DFWQYFYPIQ QGMAQNCSKD VSLVAEYVDK   240
VGKNGTAKEQ QALKEKFGLG ALEHYDDFAA VLPNGPYLWQ DNDFATGYSS FFEFCDAIEG   300
VEAGAAVTPG PEGVGLEKAL ANYANWFNST ILPDYCASYG YWTDEWSVAC FDSYNASSPL   360
FTDTSVDNAV DRQWEWFLCN EPFFWWQDGA PEGTSTIVPR LVSASYWQRQ CPLYFPEVNG   420
YTYGSAKGKN SATVNSWTGG WDMTRNTTRL IWTNGQYDPW RDSGVSSTFR PGGPLVSTAN   480
EPVQVIPGGF HCSDLYMQDY YVNEGVRKVV NNEVKQIKEW VEEYYA                 526

SEQ ID NO: 11                moltype = AA  length = 526
FEATURE                      Location/Qualifiers
source                       1..526
                             mol_type = protein
                             organism = Aspergillus sclerotioniger
SEQUENCE: 11
MRSFSAVAAA ALAVSWASLA QAARPRLAPK PVSRPASSTS AATTGEAYFE QLVDHHNPEK    60
GTFSQRYWWS TEYWGGPGSP VVLFTPGEVS ADGYEGYLTN ETLTGVYAQE IQGAVILIEH   120
RYWGDSSPYE VLNAETLQYL TLDQAVLDMT YFAETVKFQF DNSTRSNAQN APWVMVGGSY   180
SGALTAWVES VAPGTFWAYH ATSAPVEAIY DFWQYFYPIS QGMAQNCSKD VSLVAEHVDK   240
VGKTGTAEEQ QKLKELFGLG ALEHYDDFAA VLPNGPYLWQ DNDFVTGYSE FFQFCDAVEG   300
VEAGAAVTPG PEGVGLEKAL ANYANWFNST MLPNYCASYG YWSDEWSVAC FDSYNASSPL   360
FTDTSVGNAV DRQWEWFLCN EPFFWWQDGA PENVTTIVPR CSLYFPETNG               420
YTFGSAQNKT AATVNDWTGG WFETRNTTRL IWTNGQYDPW RDSGVSSTFR PGGQLVSTAN   480
EPVQIIPGGF HCSDLYMEDY YANAGVRKVV DNEVAQIKKW VAEYYA                  526

SEQ ID NO: 12                moltype = DNA  length = 1790
FEATURE                      Location/Qualifiers
source                       1..1790
                             mol_type = other DNA
                             organism = Magnaporthe oryzae
SEQUENCE: 12
atgctgttcc tttcttctct ccttctcctg gccctgtccg gggctccggc ctacgcagtc    60
cgcgtcggca acctttttgga gccgcctatg ccccgccct tgccatcga ggatatcgag   120
gatatagacc ccaagcaact taccaagcgt aagatcagca gcgggttctt tgatcaatac   180
atcgaccaca gcaatcctttc attgggcacg tttcggcaga agttttggtg gagtgatgag   240
ttctacaagg gtcaggctc tcctgtgatt ctgttcaacc caggagaatc aagggccgat   300
atctacgga gctacctgac gaaccttacc gttcccggca tgtatgcgca ggctgttggt   360
gccgccgtcg tcatgctcga gcaccgctac tggggagagt cgtcaccttt cgcaaacctc   420
agcaccaaga acatgcagta tctgaccctc aacaactcca tctccgatac aactcgctt   480
gcccgccagg tgaagctgcc ttttgacacc agcggggcga ccaatgcccc caatgctccg   540
tgggtctttt tggtggttc ataccctggt gcccttgccg gatgggtaga gagcgtcgcc   600
cctggaactt tctgggccta ccatgcgtca agcgccgtgg tccaggatat cggtgattac   660
```

```
tggcgctact ttagcccaat taatgaaggc atgcccaaga actgcagcgc cgacatcggc    720
cgggtcgtcg agcacattga caaagtattg ggcactggat cagacagcga caagtctgcc    780
ctgcagacag cttttggcct tggatccctc gagcatgatg actttgtcga gactctggcg    840
aacgccccat acctgtggca gggcattgat ttcagcactg gctactcgga cttttttcaag   900
ttctgtgact atgttgaggt atgctcgcta tcgcctatcc tctttgttaa aattggcagg    960
aaactgtggc gcagtaattt gctgacttca tcctctagaa cgtacccccg aaagcagcga   1020
caagagtgcc cccaggagtt gatggtgttg gtcttgagaa ggcattgacg ggctaccagg   1080
attggatcaa gaaggaatac ctcccaaccg cctgcgacag cttgggatac cccaagggtg   1140
acctgggctg cctgagcagc cacaacttct cagcccccct ctaccgtgac cagacagtat   1200
taaacccggg gaaccggcag tggttttggt tctttgcaa tgaaccgtga gtggcgacgg    1260
cagtgggctt tgatttaaac ttactactgt cttctttgt actgacacga gtttgcccat    1320
ccttcagctt caagttttgg caaaacggcg ccccaagggg cgagccgtcg attgtttcgc    1380
gtatcatagg cagcaaatac tttgagagcc agtgtgcgtt gtggttcccc gacgagccgc    1440
gtgaaggcga tggcgtttac acgtacggca tcgccgaggg caaggatgtc gccagtgtca    1500
acaaattcac cggtgggtgg gaccacaccg cacgaaacg acttcttttgg gtcaacggcc    1560
agtttgaccc atgctgcac gctacagtgt cgtcgccctc ccgccccgga ggtccccttc    1620
aatcgacaga caaggcacct gttctggtta cccgggtgg agtacactgc accgacttga   1680
ttatacgcaa cggagacgcc aacgagggcg cgcgcaaggt ccagagtcag gcacgcgaaa   1740
tcatcaagaa atgggtgtcc gagtttccca gagcggaaa gagcccttga              1790

SEQ ID NO: 13                moltype = AA  length = 542
FEATURE                      Location/Qualifiers
source                       1..542
                             mol_type = protein
                             organism = Magnaporthe oryzae
SEQUENCE: 13
MLFLSSLLLL ALSGAPAYAV RVGNLLEPPM PPPFAIEDIE DIDPKQLTKR KISSGFFDQY     60
IDHSNPSLGT FRQKFWWSDE FYKGPGSPVI LFNPGESRAD IYTGYLTNLT VPGMYAQAVG    120
AAVVMLEHRY WGESSPFANL STKNMQYLTL NNSISDTTRF ARQVKLPFDT SGATNAPNAP    180
WVFVGGSYPG ALAGWVESVA PGTFWAYHAS SAVVQDIGDY WRYFSPINEG MPKNCSADIG    240
RVVEHIDKVL GTGSDSDKSA LQTAFGLGSL EHDDFVETLA NGPYLWQGID FSTGYSDFFK    300
FCDYVENVPP KAATRVPPGV DGVGLEKALT GYQDWIKKEY LPTACDSLGY PKGDLGCLSS    360
HNFSAPFYRD QTVLNPGNRQ WFWFLCNEPF KFWQNGAPKG EPSIVSRIIG SKYFESQCAL    420
WFPDEPREGG GVYTYGIAEG KDVASVNKFT GGWDHTDTKR LLWVNGQFDP WLHATVSSPS    480
RPGGPLQSTD KAPVLVIPGG VHCTDLIIRN GDANEGARKV QSQAREIIKK WVSEFPKSGK    540
SP                                                                   542

SEQ ID NO: 14                moltype = AA  length = 523
FEATURE                      Location/Qualifiers
source                       1..523
                             mol_type = protein
                             organism = Magnaporthe oryzae
SEQUENCE: 14
VRVGNLLEPP MPPPFAIEDI EDIDPKQLTK RKISSGFFDQ YIDHSNPSLG TFRQKFWWSD     60
EFYKGPGSPV ILFNPGESRA DIYTGYLTNL TVPGMYAQAV GAAVVMLEHR YWGESSPFAN    120
LSTKNMQYLT LNNSISDTTR FARQVKLPFD TSGATNAPNA PWVFVGGSYP GALAGWVESV    180
APGTFWAYHA SSAVVQDIGD YWRYFSPINE GMPKNCSADI GRVVEHIDKV LGTGSDSDKS    240
ALQTAFGLGS LEHDDFVETL ANGPYLWQGI DFSTGYSDFF KFCDYVENVP PKAATRVPPG    300
VDGVGLEKAL TGYQDWIKKE YLPTACDSLG YPKGDLGCLS SHNFSAPFYR DQTVLNPGNR    360
QWFWFLCNEP FKFWQNGAPK GEPSIVSRII GSKYFESQCA LWFPDEPREG GVYTYGIAE    420
GKDVASVNKF TGGWDHTDTK RLLWVNGQFD PWLHATVSSP SRPGGPLQST DKAPVLVIPG    480
GVHCTDLIIR NGDANEGARK VQSQAREIIK KWVSEFPKSG KSP                      523

SEQ ID NO: 15                moltype = DNA  length = 1629
FEATURE                      Location/Qualifiers
misc_feature                 1..1629
                             note = Synthesized
source                       1..1629
                             mol_type = other DNA
                             organism = synthetic construct
SEQUENCE: 15
atgctcttc tgagctccct cctgctgctc gctctcagcg gcgctcccgc ctacgccgtt      60
cgagttggca aacctcctgga gcctcccatg cctcctcct ttgctattga ggacatcgaa    120
gacattgacc ctaagcagct caccaagcga aaaatcgca gcgtttctt cgaccagtac     180
atcgaccact ccaaccccag cctcggtact ttccgccaaa agttttggtg gtccgacgag    240
ttctacaagg gccccggttc cccgtcatc ctgttcaacc ctggcgaaag ccgcgctgat    300
atctacaccg gctatctgac taacctcacc gtccccggca tgtacgctca gccgtcggt    360
gctgccgttg tcatgctgga gcaccgctat tgggcgagt ccagccccctt cgccaatgca    420
tccaccaaga acatgcagta cctgaccctc aacaacagta ttagcgacac cacccgcttt    480
gcccgccagg tcaagctgcc cttttgacacc tccggcgcca ccaatgctcc taatgccccc    540
tgggtctttg tcggtggtag ctatcctggt gccctggccg gttgggtcga gagcgttgct    600
cctggcacct ctgggccta tcatgccagc tccgccgtct tcaagatat cggcgactat    660
tggcgctact ttagcccat caacgagggc atgcctaaaa actgcagcgc cgacatcggt    720
cgcgtcgtcg aacacatcga taaggtcctg ggtaccggtt ccgacagca taagagcgct    780
ctgcagaccg cttttcggcct cggcagcctg gaacacgacg acttcgtcga ccctcgcg    840
aacgcccct acctctggca gggcatcgac ttcagcactg gctacagcga cttcttcaag    900
ttctgcgact acgtcgagaa tgtccctccc aaggccgcca ctcgcgttcc tcccggcgtc    960
gacggcgtcg gcctggagaa ggccctgacc ggttaccagg actggatcaa gaaggagtac   1020
ctccccaccg cctgcgattc cctcggctac cccaaaggg atctcggttg cctgcagtcc   1080
```

```
cacaacttct ccgccccttt ctaccgcgat cagaccgtcc tcaacccgg taatcgccag      1140
tggttctggt tcctctgcaa cgagcccttc aagttctggc aaaacggcgc ccccaagggc     1200
gagcccagca tcgtcagccg cattattggc agcaagtact tcgagtccca gtgcgccctc    1260
tggtttcccg atgagcccg cgagggcggc ggtgtttata cttacggcat cgccgaaggt    1320
aaggatgtcg ccagcgtcaa taagtttact ggcggctggg accatactga caccaaacgc    1380
ctcctgtggg ttaacggcca gttcgacccc tggctccacg ccactgtcag cagccctagc    1440
cgacccggtg gcccctcca gagcactgac aaggccctg tcctcgttat tcccggcggc      1500
gtccactgca ccgatctcat catccgcaac ggcgacgcta acgaaggcgc tcgcaaggtt    1560
caaagccagg cccgcgagat cattaagaag tgggtcagcg agtttcctaa aagcggcaag    1620
tccccctaa                                                            1629

SEQ ID NO: 16         moltype = AA   length = 488
FEATURE               Location/Qualifiers
source                1..488
                      mol_type = protein
                      organism = Aspergillus niger
SEQUENCE: 16
KSAATTGEAY FEQLLDHHNP EKGTFSQRYW WSTEYWGGPG SPVVLFNPGE VSADGYEGYL      60
TNDTLTGVYA QEIQGAVILI EHRYWGDSSP YEVLNAETLQ YLTLDQSILD MTYFAETVKL     120
QFDNSSRSNA QNAPWVMVGG SYSGALTAWT ESIAPGTFWA YHATSAPVEA IYDFWQYFYP     180
IQQGMAQNCS KDVSLVAEYV DKIGKNGTAK EQQELKELFG LGAVEHYDDF AAVLPNGPYL     240
WQDNDFVTGY SSFFQFCDAV EGVEAGAAVT PGPEGVGLEK ALANYANWFN STILPNYCAS     300
YGYWTDEWSV ACFDSYNASS PIFTDTSVGN PVDRQWEWFL CNEPFFWWQD GAPEGTSTIV     360
PRLVSASYWQ RQCPLYFPEV NGYTYGSAKG KNSATVNSWT GGWDMTRNTT RLIWTNGQYD     420
PWRDSGVSST FRPGGPLVST ANEPVQIIPG GFHCSDLYME DYYANEGVRK VVDNEVKQIK     480
EWVEEYYA                                                              488
```

What is claimed is:

1. A method for the reduction or prevention of haze in a beverage comprising adding an endoprotease to the beverage, wherein said endoprotease is an enzyme having at least 98, 99 or 100% sequence identity to SEQ ID NO:16 or an endoprotease active fragment thereof such as a mature protein.

2. The method of claim 1 wherein the endoprotease active fragment is a mature protein.

3. The method of claim 2 wherein the beverage contains proteins.

4. The method of claim 3 wherein the beverage contains polyphenols.

5. The method of claim 4 wherein the beverage is a beer.

6. The method of claim 4 wherein the beverage is a wine.

7. The method of claim 4 wherein the beverage is a fruit juice.

8. The method of claim 5 wherein the endoprotease is added to a wort.

9. The method of claim 5 wherein the endoprotease is added to a beer after haze has been formed.

10. The method of claim 5 wherein the endoprotease is added to a beer before haze has been formed.

11. The method of claim 5 wherein the beer has an increased relative foam stability and an increased relative haze reduction.

12. The method of claim 11 wherein the increased relative foam stability is above 100, 101, 102, 103, 104, 105, 106, 107, 108, 109 or 110%.

13. The method of claim 11 wherein the increased relative haze reduction is above 73%, 74%, 75%, 76%, 77%, 78%, 79%, 80% as measured by 90° scattering.

14. The method of claim 8 wherein the endoprotease is present in the wort in an amount of 4 to 300 mg protease/hL wort, 10 to 250 mg protease/hL wort, 20 to 200 mg protease/hL wort, 30 to 150 mg protease/hL wort or 40 to 100 mg protease/hL wort.

15. The method of claim 1 further comprising adding one or more of an ALDC enzyme, a glucoamylase, a maltogenic alpha-amylase, a pullulanase, a catalase or a transglucosidase.

16. A method for increasing relative foam stability in a beer comprising adding an endoprotease to the beverage, wherein said endoprotease is an enzyme having at least 98, 99 or 100% sequence identity to SEQ ID NO:16 or an endoprotease active fragment thereof such as a mature protein.

17. The method of claim 16 wherein the increased relative foam stability is above 100, 101, 102, 103, 104, 105, 106, 107, 108, 109 or 110%.

18. The method of claim 16 wherein the endoprotease active fragment is a mature protein.

19. The method of claim 16 wherein the endoprotease is added to a wort.

20. The method of claim 19 wherein the endoprotease is present in the wort in an amount of 4 to 300 mg protease/hL wort, 10 to 250 mg protease/hL wort, 20 to 200 mg protease/hL wort, 30 to 150 mg protease/hL wort or 40 to 100 mg protease/hL wort.

21. The method of claim 16 wherein the endoprotease is added to a beer after haze has been formed.

22. The method of claim 16 wherein the endoprotease is added to a beer before haze has been formed.

23. The method of claim 16 wherein the beer has an increased relative foam stability and an increased relative haze reduction.

24. The method of claim 23 wherein the increased relative haze reduction is above 73%, 74%, 75%, 76%, 77%, 78%, 79%, 80% as measured by 90° scattering.

25. The method of claim 16 further comprising adding one or more of an ALDC enzyme, a glucoamylase, a maltogenic alpha-amylase, a pullulanase, a catalase or a transglucosidase.

\* \* \* \* \*